United States Patent [19]

Perreirra et al.

[11] Patent Number: 4,763,276

[45] Date of Patent: Aug. 9, 1988

[54] METHODS FOR REFINING ORIGINAL ROBOT COMMAND SIGNALS

[75] Inventors: Noel D. Perreirra, Allentown; Michael Tucker, Bethlehem, both of Pa.

[73] Assignee: Actel Partnership, Arlington, Tex.

[21] Appl. No.: 842,173

[22] Filed: Mar. 21, 1986

[51] Int. Cl.$^4$ ........................ G05B 19/18; G05B 19/42
[52] U.S. Cl. ..................................... 364/513; 364/170; 901/2; 901/15
[58] Field of Search ........ 364/513, 167, 170, 191–193, 364/474; 318/568; 901/2, 3, 15, 9

[56] References Cited

U.S. PATENT DOCUMENTS

| | | | |
|---|---|---|---|
| 4,362,977 | 12/1982 | Evans et al. | 364/513 |
| 4,453,085 | 6/1984 | Pryor | 250/203 R |
| 4,456,961 | 6/1984 | Price et al. | 364/513 |
| 4,547,858 | 10/1985 | Horak | 364/513 |
| 4,580,229 | 4/1986 | Kogama et al. | 364/513 |
| 4,581,566 | 4/1986 | Ekstrom et al. | 364/513 |
| 4,590,578 | 5/1986 | Barto, Jr. et al. | 364/513 |
| 4,594,670 | 6/1986 | Itoh | 364/513 |
| 4,604,716 | 8/1986 | Kato et al. | 364/513 |
| 4,670,849 | 6/1987 | Okada et al. | 364/513 |

OTHER PUBLICATIONS

Button, Rich, "Robot Spatial Location and Orientation Characteristics".
Colson, J. C., "Performance Measures for Robotic Systems" Masters Thesis, Univ. of Texas at Austin, Dec. 1984.
Colson, J. C. & Perreira, N. D., "Kinematic Arrangements Used in Industrial Robots", 13th Int. Conf. Proceedings, 20.1–20.18 Robotics Inter. of SME (Apr. 1983).
Colson, J. C. & Perreira, N. D., "The Need for Performance Measures for Robotic Systems and Some Qualitative Definitions", Workshop on Robot Standards*.
Colson, J. C. & Perreira, N. D., "Experimental Procedures and Statistics for Determining Performance Parameters of Robotic Systems", Workshop on Robot Standards, Detroit, Michigan, Jun. 6–7, 1985.
Colson, J. C. & Perreira, N. D., "Robotic System POSE Performance: Definitions and Analysis" International Computers and Engineering Conference and Exhibition, Aug. 4–8, 1985.
Colson, J. C. & Perreira, N. D., "POSE Measurement Device, POSE Error Determination and Robot Performance" SENSORS' 85, Detroit, Mich., Nov. 5–7, 1985.
Denavit, J. et al., "A Kinematic Notation for Lower-Pair Mechanisms Based on Matrices" J. of Applied Mechanics, vol. 22, Transactions of The American Society of Mechanical Engineers, vol. 77, 1955, pp. 215–221.
Dubowsky, S. et al., "A Parameter Identification Study of Kinematic Errors in Planar Mechanisms", J. of Engineering for Industry, May 1975, pp. 635–642.
Hayati, R., "Robot Arm Geometric Link Parameter Estimation" Proceedings of The 22nd IEEE Conf. on Decision and Control, Dec. 1983, pp. 1477–1483.

(List continued on next page.)

Primary Examiner—John R. Lastova
Attorney, Agent, or Firm—Finnegan, Henderson, Farabow, Garrett & Dunner

[57] ABSTRACT

A method for refining an original command signal which is intended to locate a robot at a desired position and orientation (pose) comprising the steps of identifying the actual system parameters of the robot; predicting, through utilization of those actual system parameters the anticipated pose of the robot which would actually be obtained as the result of the original command signal; calculating corrected command signals required to minimize the difference between the predicted anticipated pose and the desired pose; and employing the corrected command signals to place the robot. Preferably, a plurality of desired calibration pose command signals are used in the step of identifying the actual system parameters to place the robot in a plurality of actual calibration poses in the measuring range of at least one pose sensor. The differences between the desired calibration poses and the correponding actual poses are calculated and these differences are used to solve a set of equations which relates those differences to the actual system parameters of the robot, to thereby obtain the actual system parameters of the robot.

18 Claims, 14 Drawing Sheets

OTHER PUBLICATIONS

Hayati, S. et al., "Puma 600 Robot Arm Geometric Calibration" International Conf. on Robotics, Mar. 13-15, 1984, Atlanta Georgia.

Hsu, T. W. et al., "Identification of the Kinematic Parameters of a Robot Manipulator for Positional Accuracy Improvement" Computers in Engineering, Aug. 1985, pp. 263-267.

Ibarra, R. & Perreira, N. D., "Determination of Linkage Parameter and Pair Varable Errors in Open Chain Kinematic Linkages Using a Minimal Set of POSE Measurement Data" 1985 Design Automation Conf., Cincinnati, Ohio, Sep. 10-13, 1985.

Nanayakkara, S. A. & Perreira, N. D., "A Lease Squares Technique to Determine Linkage Parameter Errors in Open Kinematic Chains", SIAM Conf. on Geometric Modeling and Robotics, Albany, New York, Jul. 15-19, 1985.

Paul, R. P. et al., "Kinematic Control Equations for Simple Manipulators," IEEE Transactions on Systems, Man and Cybernetics, vol. SMC-11, No. 6, Jun. 1981, pp. 449-455.

Tucker, M. R., et al. "Robot Calibration Device and Usage", Dec. 1984.

Tucker, M. R. & N. D. Perreira, "A POSE Correction Algorithm", Proceedings of the ASME Transactions, Journal of Dynamics Systems Measurements and Control.

Tucker, M. R. & Perreira, N. D., "Inverse Kinematics Solutions for General Spatial Linkages", ASME Journal, on or about Aug. 30, 1985 for future publication.

Whitney, D. E. et al. "Short-Term and Long Term Radar Feedback", National Science Foundation under Grant No. MEA-82-07167, Apr. 1985.

Wu, C. "A Kinematic CAD Tool for the Design and Control of a Robot Manipulator", The International Journal of Robotics, vol. 3, No. 1, Spring 1984, pp. 58-67.

"The Determination of Robot Linkage Parameter and Pair Variable Errors Using a Minimal Set of Pose Measurement Data" by Randolph Ibarra and N. Duke Perreira, 1985, The University of Texas at Austin, pp. 1-127.

"Robot Test Station Equipment" (one page).

Button, Rick, "Robot Spatial Location and Orientation Characteristics".

Lau, K. et al. "Robot End Point Sensing Using Laser Tracking System", Workshop on Robot Standards, Detroit, Mich., Jun. 6-7, 1985.

McEntire, R. H., "Three Dimension Accuracy Measurement Method for Robots".

Phillips, N. et al. "The Measurement Capability of an Industrial Robot" 24th IMTDR Conference 1985.

Ranky, P. "Test Method and Software for Robot Qualification", The Industrial Robot, Jun. 1984, pp. 111-115.

Tucker, M. et al. "Motion Planning and Control for Improved Robot Performance" International Industrial Control Conf., Long Beach, CA, Sep. 16-21, 1985.

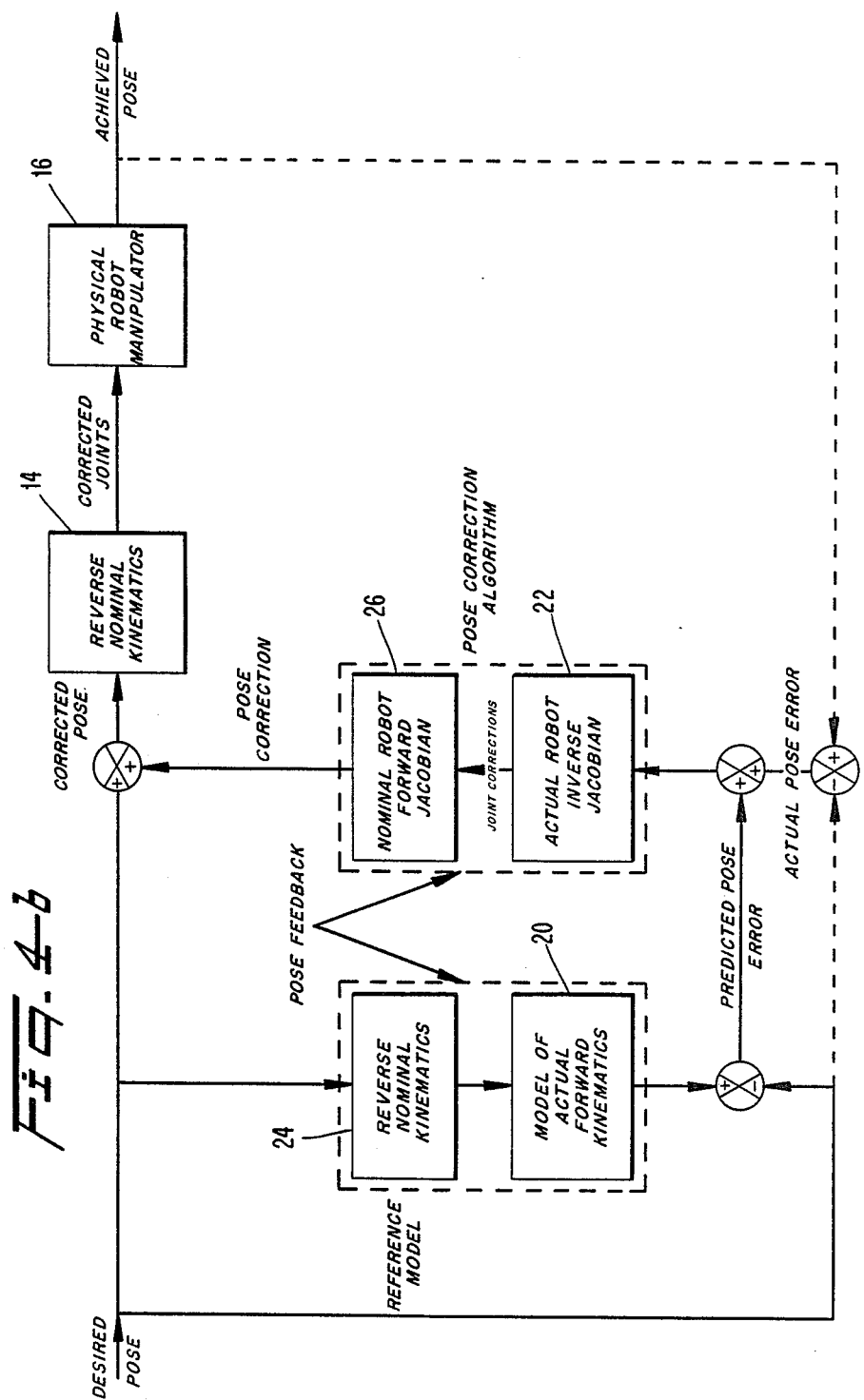
Fig. 4-b

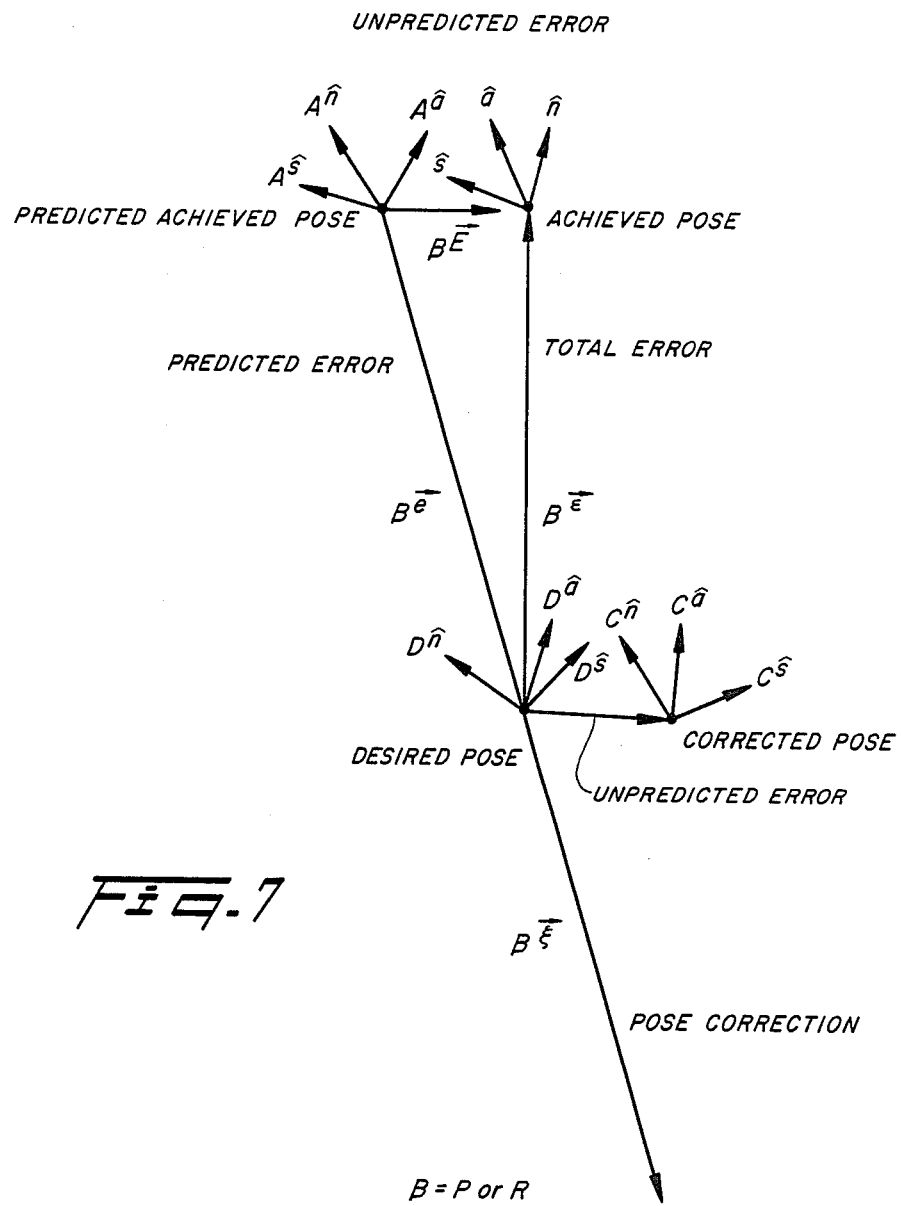

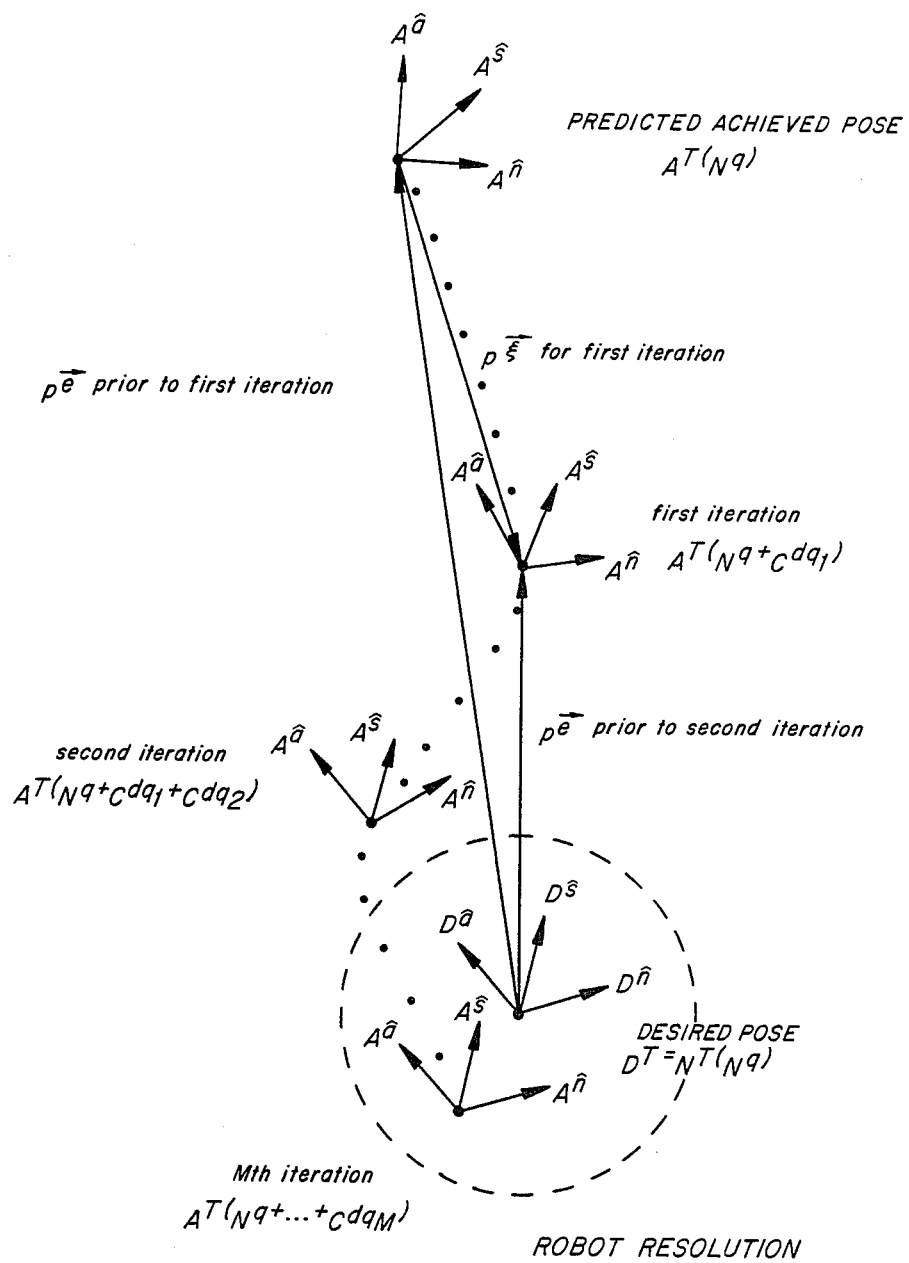

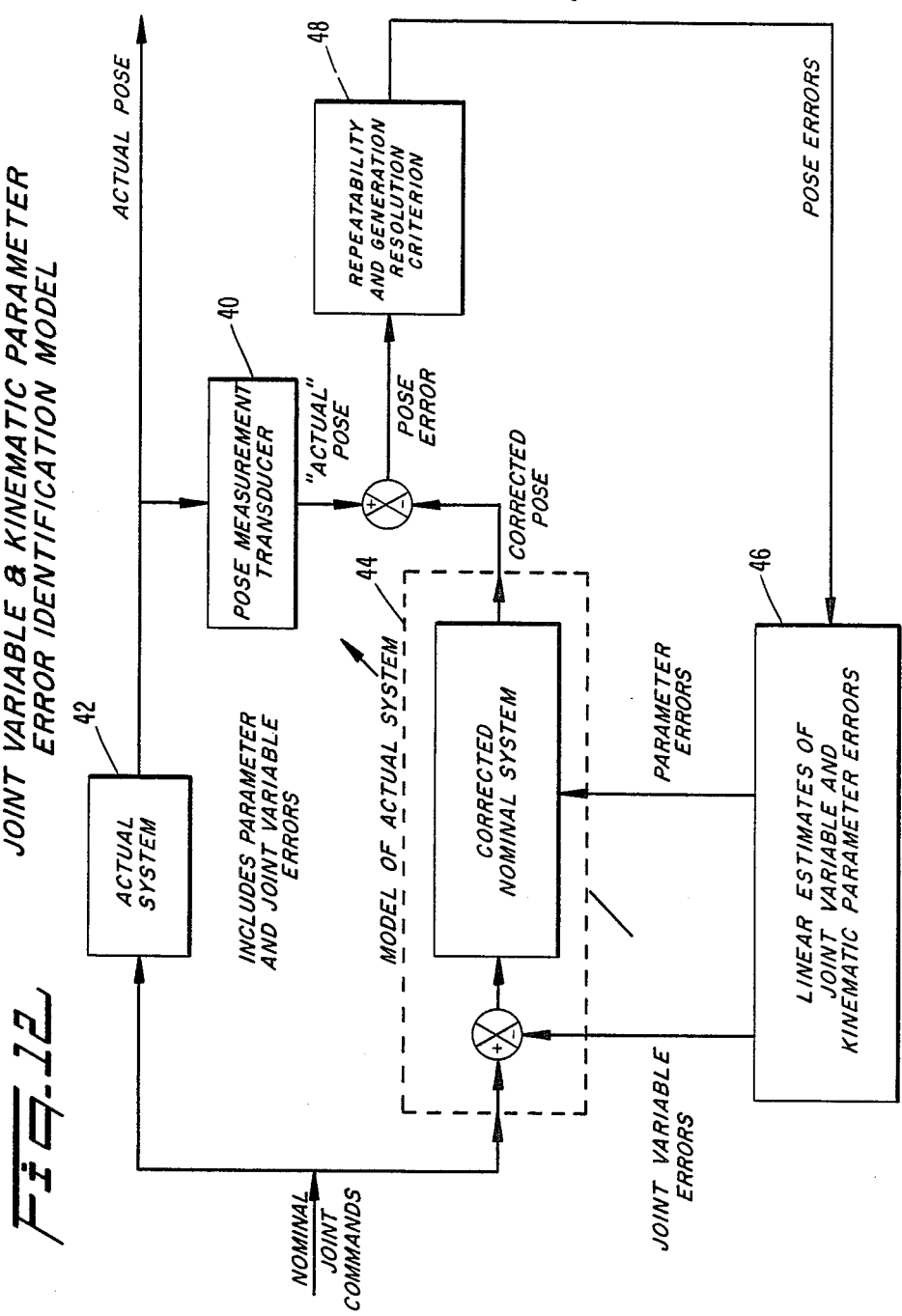

METHODS FOR REFINING ORIGINAL ROBOT COMMAND SIGNALS

BACKGROUND OF THE INVENTION

I. Field of the Invention

The present invention relates to methods and apparatus for improving robot accuracy and long-term repeatability by refining original robot command signals.

II. Background of the Invention

Most of today's robots are programmed online, that is in the actual environment where the robot is to be used. An operator "trains" the robot by moving it through a series of configurations and causing those configurations to be stored in memory. Online programming is a very inefficient way to program robots and robot manufacturers and users alike are presently trying to develop offline programmed systems. The inefficiencies relate to having a programmer spend his time to initially program the robot and to adjust the program on a regular basis. In addition if the task is to be transferred to a different robot, if the current robot requires maintenance, or if the task is to be slightly modified, the robot may require reprogramming. Each of these functions could be performed automatically if the robot could be programmed offline.

In offline programmed robot systems, a CAD/CAM (computer aided design/computer aided manufacturing) system generates the robot program. The programs are composed of commanded actions (REACH, GRASP, PALLETIZE), poses where the actions are to occur (at pose A, B) and sensory queries that are used for branching and program control. In future generations of offline programmed robotic systems, the offline generated program will be downloaded to the robot, eliminating much, if not all of the need for an operator to train the robot. The transition between online and offline programming has been going on for the last few years. For example, there are in some research facilities task level programs that can use retrieval, or in some limited cases, generative techniques to decompose high level tasks desired of robots (like assemble the Model #43 gearbox) to much lower level commands (such as place gear A on sprocket B). Although the transition to offline programming is moving at a continued but modest pace, there are a number of problems which must be solved.

Current robots are not accurate enough to be used in precision assembly tasks when they are programmed offline. A state-of-the-art robot manipulator is a repeatable but inaccurate device. If a manipulator is repeatably commanded to a desired position and orientation (pose), it will repeatably return to approximately the same achieved pose but the achieved pose will not be equal to the desired pose. The achieved poses are not equal to the desired poses because of a number of reasons which are discussed in Reference No. 4 listed below [Colson and Perreira, 1985-1]. A dominant source of pose errors is the machining, assembly and measurement errors in the mechanical linkages and joint actuators that make up the robot manipulator.

For an online programmed robot an operator "trains" the manipulator by placing it at a series of configurations and causing the configurations to be stored in memory. Because robots are repeatable, when they are commanded using the stored configurations they will behave adequately for some duration. The configurations can be stored as either a set of joint variables measured at the linkage joints or by a pose variable which is directly related to the joint variables through a set of preprogrammed forward kinematic equations. A preprogrammed set of reverse kinematic equations can convert the pose variable back into the original set of joint variables.

Storing joint configurations can cause inefficiencies for online programmed robots if the robot's characteristics change (through electrical and mechanical drifts) because the robot will move to the wrong pose when it is commanded to an original joint configuration. In addition, storing configurations as poses can cause similar problems because the preprogrammed forward kinematic equations used to convert the joint variables to a pose variable may no longer be correct.

In the prior art there have been no known real-time, automatic devices to determine the causes of the robot pose errors (the mechanical linkage errors and joint actuator errors) and to use the knowledge of those errors to both calibrate the robot and correct its trajectory. An object of the subject invention is effectively to determine the actual equations that describe the forward and inverse kinematics of the linkage at any point in time those equations are needed.

In the prior art, robots need to be frequently retaught because there are drifts in its electronics and mechanical linkages. These are no real time devices to correct the trajectory of a online programmed robot by converting the taught joint configurations to actual robot poses thus improving the long term repeatability. The forward kinematic equations used in robot controllers convert the taught joint configurations into an inaccurate description of the taught pose.

In the prior art, a robot task program created by teaching one robot, can not be used on other robots (even of the same type) due to the subtle kinematic differences between the robots. In the prior art a robot normally needs to be retaught its task after maintenance or after it has been moved. An other object of the subject invention is to adjust the joint and pose commands automatically so that the robot does not need to be retaught.

Additional objects and advantages of the invention will be set forth in part from the description that follows, and in part will be obvious from that description or may be learned in practice of that invention.

SUMMARY OF THE INVENTION

Our invention improves robot accuracy, thus greatly increasing the potential feasibility and uses for offline programmed robots. Both the position and orientation accuracy are improved. Manipulator accuracy is improved by first determining the actual linkage parameters of the robot and then correcting the pose errors of the end effector that would be caused by using the nominal as opposed to the actual linkage parameters in the robot controller. The actual linkage parameters are not used in present day controllers because they are not known and if they were known would require solving the general inverse kinematics problem; that is to determine the joint values which would cause a general linkage to achieve a desired pose. Present robot controllers are capable of solving the inverse kinematics problem for simple nominal linkages, but not the more complicated actual robot linkages. Our invention includes solutions to the general inverse kinematics problem. The anticipated pose of the end effector is corrected before the robot moves, which is critical for highly precise assembly operations where groping is not allowed. Groping should be minimized when the robot throughput is important. The linkage and joint actuator errors change with time and temperature. Thus, even if the parameters are known at a point in time, they may differ at a latter point. Our system allows the periodic recalibration of the robot in a simple and inexpensive manner, in its factory environment with minimal modifications to the robot work cell.

Our invention improves the long-term repeatability of online (as well as offline) programmed manipulators. Our invention will result in a decreased need for operator retraining of robot tasks, thus causing an increase in robot efficiency. Our invention makes robot task programs, which were taught on one robot, applicable to another robot of the same linkage arrangement or even a different arrangement. A discussion on linkage arrangements can be found in Reference No. 3 listed below [Colson and Perreira, 1983]. The robot will not need to be retaught its job after maintenance. Our invention works at all configurations of any linkage arrangement. It is not hindered by singularities.

Our invention advances the prior art in the manufacturer and construction of robot manipulators. The manufacturer can use our invention to determine the deviations from the nominal values of the mechanical linkages and joint actuators of his robot. Our invention can supply the robot manufacturer with information to improve both his control software and his manufacturing process.

Our invention advances the prior art in the design of robot manipulators. The robot designer can use data provided by these invention to determine expected errors in the manipulator linkages and to improve his design and its performance.

To achieve the foregoing objects, and in accordance with the purposes of the invention there is provided a method for refining an original command signal which is intended to place a robot at a desired position and orientation (pose), comprising the steps of: (a) identifying actual system parameters of the robot; (b) predicting, through the utilization of the actual system parameters and the original command signal, the anticipated pose of the robot which would actually be obtained as a result of the original command signal; (c) calculating corrected command signals required to minimize the difference between the predicted anticipated pose and the desired pose; and (d) employing the corrected command signals to place the robot in the desired pose.

Preferably, the step of identifying the actual system parameters of the robot includes the substeps of: (i) employing a plurality of calibration pose command signals, based upon nominal system parameters of the robot, to place the robot in a plurality of actual calibration poses, each of which actual calibration pose is within the measuring range of at least one pose sensor; (ii) measuring the actual calibration poses of the robot by operation of the pose sensors; (iii) calculating the differences between the plurality of desired calibration poses and the corresponding actual calibration poses; and (iv) solving a set of equations which relate those differences to the actual system parameters of the robot to thereby obtain the actual system parameters of the robot.

BRIEF DESCRIPTION OF THE DRAWINGS

FIG. 4a is a diagram of a system having joint input commands which incorporates the teachings of the subject invention;

FIG. 4b is a diagram of a system having pose input commands which incorporates the teachings of the subject invention;

FIG. 7 is a diagram showing desired, achieved and corrected poses;

FIG. 8 is a graphical depiction of a pose correction algorithm incorporating the teachings of the subject invention;

FIG. 12 is a flow diagram of a calibration procedure incorporating the teachings of the subject invention.

DESCRIPTION OF THE PREFERRED EMBODIMENT

Figure 1:
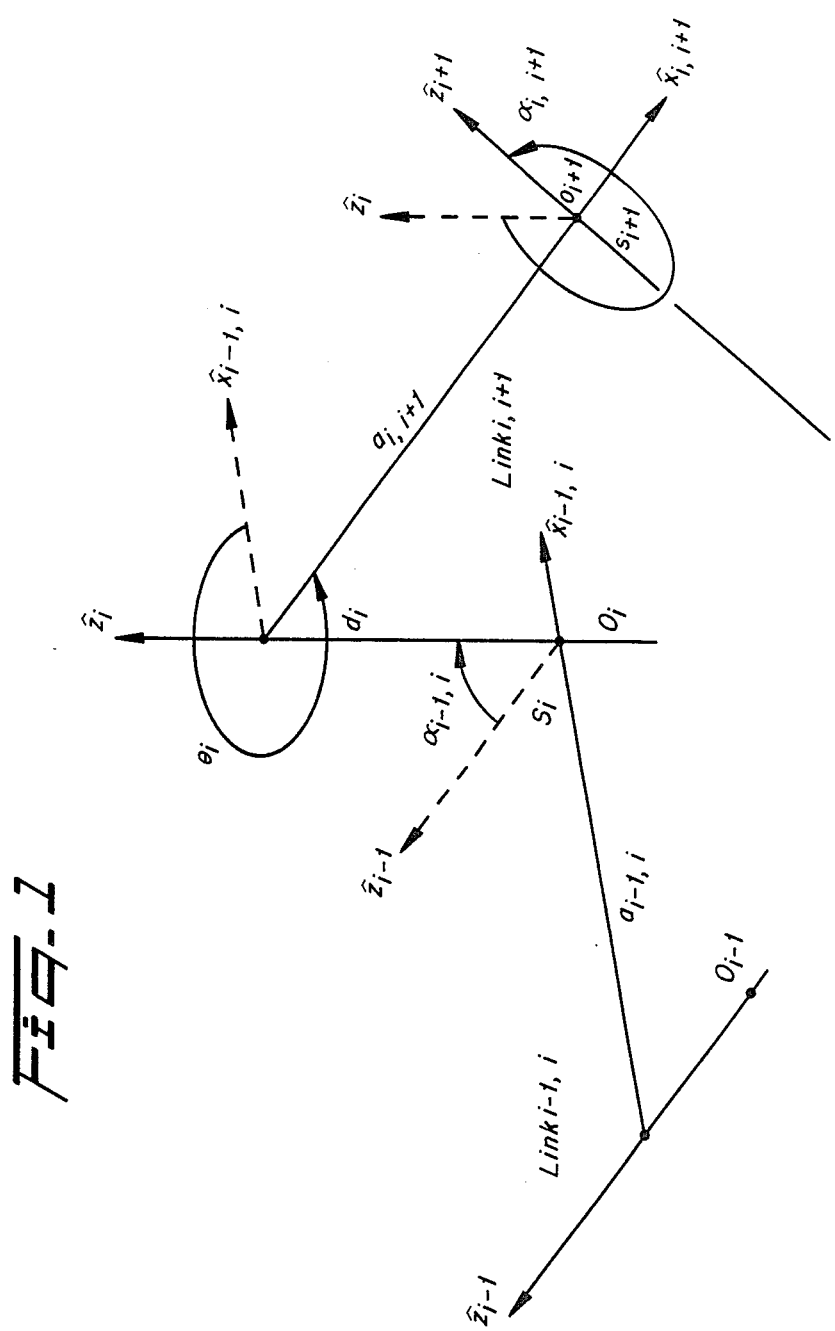
FIG. 1 is a diagram used to explain kinematic notations.

In order to program a manipulator offline, it is necessary to be able to command it to a specific pose within its workspace. In the prior art, online programming has been possible because the knowledge of a robot's particular system parameters are not needed when the robot is simply expected to achieve a set of joint parameters that it has been taught. As used throughout, the term system parameters comprises the robot's linkage (or kinematic) parameters which include: (1) d; (2) $\theta$; (3) a; and (4) $\alpha$, described in more detail below. In offline programming of robots, it is necessary to determine the required joint values to achieve the desired pose. If this is to be done analytically, the actual kinematic parameters of the manipulator must be known because the robot pose is a function of these actual parameters, not the manufacturer's specified parameters. If the wrong parameter values are used within the robot controller, errors in the pose of the manipulator end effector will occur. Our invention determines the kinematic parameter errors (ie, the difference between the actual and the manufacturer's specified kinematic parameters) and uses these kinematic parameter errors to generate commands to the manipulator joint actuators to correct (reduce) the pose placement errors of the manipulator end effector.

I. Pose Definitions

1. Desired Pose is the pose defined by task level control and is downloaded to the robot. In the prior art, the robot was commanded with this pose.
2. Achieved Pose is the pose that the robot actually achieves when it is commanded with a pose command.
3. Commanded Pose is the pose with which the robot is actually commanded. In most robots this is the same as the desired pose. In our invention, this is the desired pose plus a correction.
4. Test Pose is a pose within the measurement range of a pose sensor.
5. Measured Pose is the pose measured by a pose sensor. It is defined as the achieved pose plus a possible measurement error.
6. Pose Correction is determined by our invention. The invention determines a pose correction so that when the robot is commanded with the desired pose plus the pose correction, the robot will achieve the desired pose.
7. Anticipated Achieved Pose is the pose that the robot is predicted to achieve when commanded with the desired pose. Our invention predicts the anticipated achieved pose based on an accurate robot model calculated and stored by the invention. The anticipated achieved pose is used to determine the pose correction before the robot moves to the desired pose.

II. Linkage Kinematics

A serial link manipulator consists of a sequence of links connected together by actuated joints. These joints can be single degree of freedom revolute (rotating) or prismatic (sliding) joints, multiple degree of freedom joints such as cylindrical, flat, global or helixal joints, or compound joints such as a differential joint. In an N degree of freedom manipulator, there are N links and N joints (compound joints are considered as a number of joints with links of zero length between the joints). A link maintains a fixed relationship between the manipulator joints at the ends of the link.

There are four kinematic parameters that determine the relative pose of two sequential joints in a manipulator. In FIG. 1, the spatial relationship between the coordinate system $(x_{i-1,i}, y_{i-1,i}, z_i)$ at $O_i$ (the ith coordinate system) and $(x_{i,i+1}, y_{i,i+1}, z_i)$ at $O_{i+1}$ (the i+1th coordinate system) is shown. This relationship can be described in terms of four linkage or kinematic parameters $d_i$, $a_{i,i+1}$, $\theta_i$, and $\alpha_{i,i+1}$. One of the kinematic parameters is called the joint variable because it changes as the joint changes. For a revolute joint $\theta_i$ is the joint variable and for a prismatic joint $d_i$ is the joint variable. The remaining parameters remain fixed as the joint changes. The relationship between the ith coordinate system and the i+1th coordinate system can be described in terms of the matrix $T_{i,i+1}$:

$$T_{i,i+1} = \begin{vmatrix} c\theta_i & -s\theta_i c\alpha_{i,i+1} & s\theta_i s\alpha_{i,i+1} & a_{i,i+1} c\theta_i \\ s\theta_i & c\theta_i c\alpha_{i,i+1} & -c\theta_i s\alpha_{i,i+1} & a_{i,i+1} s\theta_i \\ 0 & s\alpha_{i,i+1} & c\alpha_{i,i+1} & d_i \\ 0 & 0 & 0 & 1 \end{vmatrix} \quad (2.1)$$

where:
$c\theta_i = \cosine \theta_i$
$s\theta_i = \sin \theta_i$
$c\alpha_{i,i+1} = \cosine \alpha_{i,i+1}$
$s\alpha_{i,i+1} = \sin \alpha_{i,i+1}$ From this matrix, the distance beteen the two origins ($O_i$ and $O_{i+1}$) can be determined as well as the orientation between the axes of the two coordinate systems. Also, as more links are added to the manipulator, the matrices corresponding to each link are multiplied together. Therefore the entire manipulator is described by the matrix:

$$T_{O,N+1} = T_{O,1} T_{1,2} T_{2,3} \ldots T_{N,N+1} \quad (2.2)$$

For a more detailed analysis and description of the mathematics of serial link manipulators see Reference No. 16 listed below [Paul, 1981].

In a typical robot work station, the robot base is placed in a "world" system. Part feeders and other fixtures are placed at known poses in the world coordinate system. In order to program a robot offline, it is necessary for the robot controller to accurately know both the achieved and desired pose of the robot end effector in the world coordinate system. From $T_{O,N+1}$, the achieved pose of the manipulator end effector relative to the world coordinate system can be determined for any configuraton of the manipulator joints, provided the actual kinematic parameters are known.

III. Functional Description of Typical Manipulator Software

Robot links and joints can not be manufactured and constructed perfectly and the placement of the base of the manipulator in the world coordinate system is not exactly known. Therefore, all of the kinematic parameters of each of the actual $T_{i,i+1}$ matrices will be slightly different than their nominal values. Thus, in the present art, robot controllers use $T_{i,i+1}$ matrices based on nominal kinematic parameters which are slightly in error. Therefore, if the manipulator controller commands the manipulator end effector to a certain desired pose in space, the actual pose obtained by the end effector will be different.

The software present in the controller of a typical robot manipulator is composed of routines called the forward and reverse kinematics and the forward and reverse Jacobians. Different manufacturers may have different names for these software routines, but functionally their routines can be subdivided into these groups. In the prior art, all of these routines are based on the nominal kinematic parameters and thus cause pose errors.

(1) Forward Kinematics Given the value of the joint variable for each joint of the manipulator, the forward kinematics determines the pose of the end effector.

(2) Reverse Kinematics Given the desired pose of the manipulator end effector, the reverse kinematics determines the value of each joint variable so that the manipulator end effector will be at the desired pose.

(3) Forward Jacobian Given incremental changes in the joint variables, the forward Jacobian determines the corresponding incremental changes in the end effector pose.

(4) Inverse Jacobian Given desired incremental changes in the pose of the end effector, the inverse Jacobian determines the incremental changes in the joint variables necessary to bring about the desired incremental changes in the end effector pose.

Figure 2:
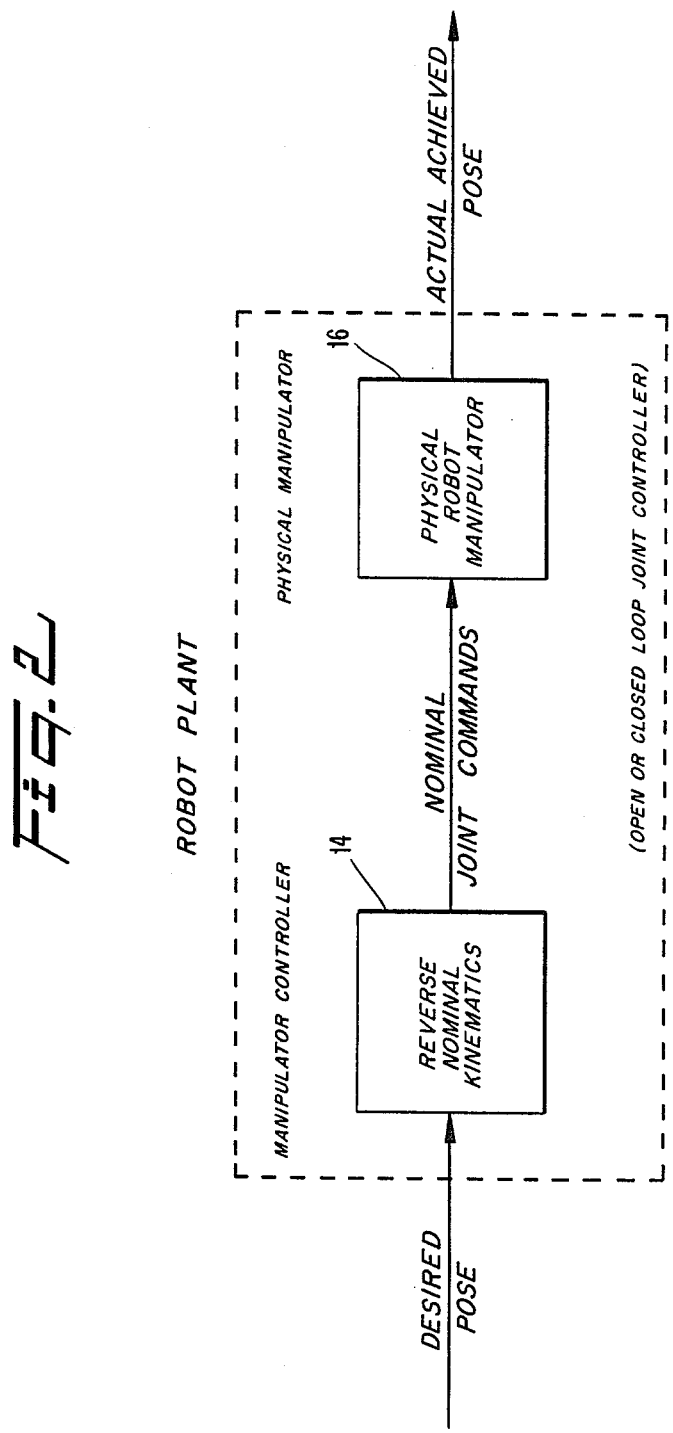
FIG. 2 is a diagram showing a standard robot command technique.

In the prior art, robots have been commanded using the technique shown in FIG. 2. The desired pose information is input to the robot and the nominal reverse kinematics is run to determine nominal joint commands. The robot is commanded with the nominal joint commands and an actual achieved pose results. The actual achieved pose is not equal to the desired pose because of the error sources previously discussed.

IV. Overview of the Operation of the Invention

Our calibration and control system improves robot accuracy by eliminating the effects of the kinematic parameter errors on pose placement. This is done by first determining a very accurate model of the robot which includes the exact kinematic parameters of the robot. Then, prior to commanding the robot to a desired pose, the model is used to generate joint variable (or pose) corrections which when added to the nominal commanded joint variables (or pose) to form new joint (or pose) commands will cause the actual achieved robot pose to be nearly equal to that desired.

The kinematic parameter model is created by a calibration process. In that process, the robot is commanded to a series of desired poses and the difference between the desired poses and those actually achieved is measured. The pose error data is then used to determine the accurate robot model as described below. The error between the desired and achieved poses can be measured using any of a variety of contact or non-contact pose measurement sensors such as the one described in co-pending U.S. patent application Ser. No. 794,798 filed Nov. 4, 1985 contents of which are expressly incorporated herein by reference. The measurement range of at least one sensor must include each of the poses where the error data used during the calibration process is to be obtained. The sensors will be mounted at poses surrounding the robot using a structure such as the one shown in FIG. 3, comprising a sensor base 10 and a plurality of sensors 12. During calibration, the robot is commanded to each of a plurality of sensor poses and the pose errors are measured. Sensors 12 are mounted very accurately in relation to each other, but they are not mounted accurately relative to the robot. The base fixture 10 of the sensors will establish a world coordinate system in which the robot will be made accurate. The base fixtures could be mounted relative to each other using a variety of measuring instruments including: a coordinate measuring machine, a laser interferometer, or a theodolite.

Prior to commanding the robot to a desired pose, the invention's pose correction algorithm uses the accurate robot model to predict the pose placement errors and to generate joint variable corrections which are then added to the joint variable solutions obtained by the nominal robot reverse kinematics to create corrected joint variable commands. The corrected commands cause the end effector pose to be nearly equal to the desired pose. The prediction and correction are preformed before the robot moves to the commanded pose. Thus there are no groping actions by the end effector which could cause catastrophic results in delicate assembly tasks. The pose correction algorithm is described below.

V. Operation of the Invention

The operation of the invention is as follows:

During an initial calibration operation, the actual forward kinematics 20 and the actual inverse Jacobian 22 of the robot are calculated by:

a. commanding the manipulator to a series of desired poses adjacent fixed sensors;

b. using the detected pose errors to determine kinematic parameter errors;

c. using the determined kinematic parameter errors to calculate a model of the actual forward kinematics for the manipulator; and d. taking the derivative of the determined actual forward kinematics with respect to each of the robot's joint variables to calculate the actual robot inverse Jacobian.

In the process of determining the kinematic parameter errors, a comparison is made between the achieved pose as measured by the sensors (measured pose) and the commanded pose. As will be explained below, by knowing the achieved (measured) pose, the commanded pose, and the nominal kinematic parameters, a model of the actual forward kinematics for the manipulator can be obtained.

The overall operation of the invention will now be explained for a robot controller which receives joint commands referring to FIG. 4a. The nominal reverse kinematics 14 and the robot manipulator 16 are as before in FIG. 2. However, the subject matter within dotted line 18, which includes a model of the actual forward kinematics 20 and the actual robot inverse Jacobian 22, has been added. The actual forward kinematics 20 is used to convert the nominal joint commands to an expected achieved pose. The difference between the desired pose and expected achieved pose comprises a predicted pose error. The predicted pose error is converted into joint correction commands by the actual robot inverse Jacobian 22. The nominal joint commands and the joint correction commands are combined and input to the physical robot manipulator 16 causing the robot to achieve the desired pose.

Figure 3:
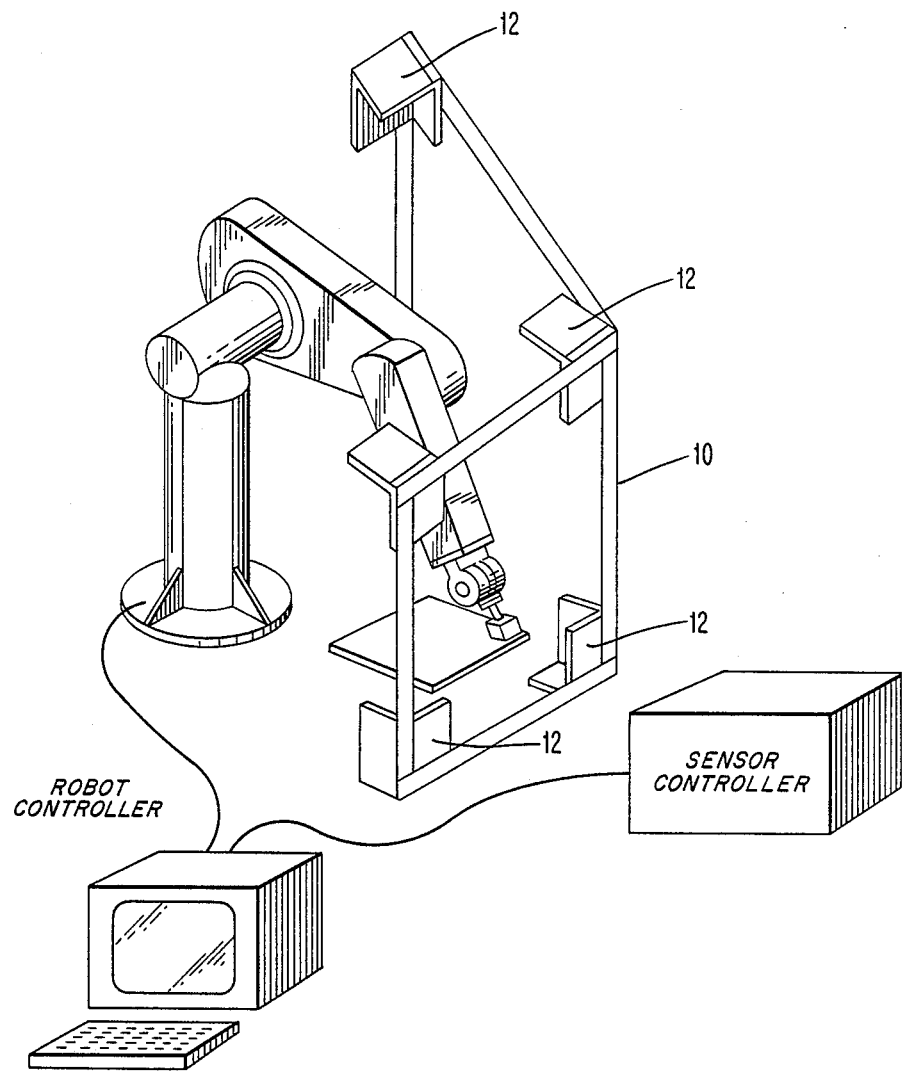
FIG. 3 is a perspective view of the interrelationship between a robot manipulator, a robot controller, a robot sensor, and a sensor controller.
Figures 2, 4:
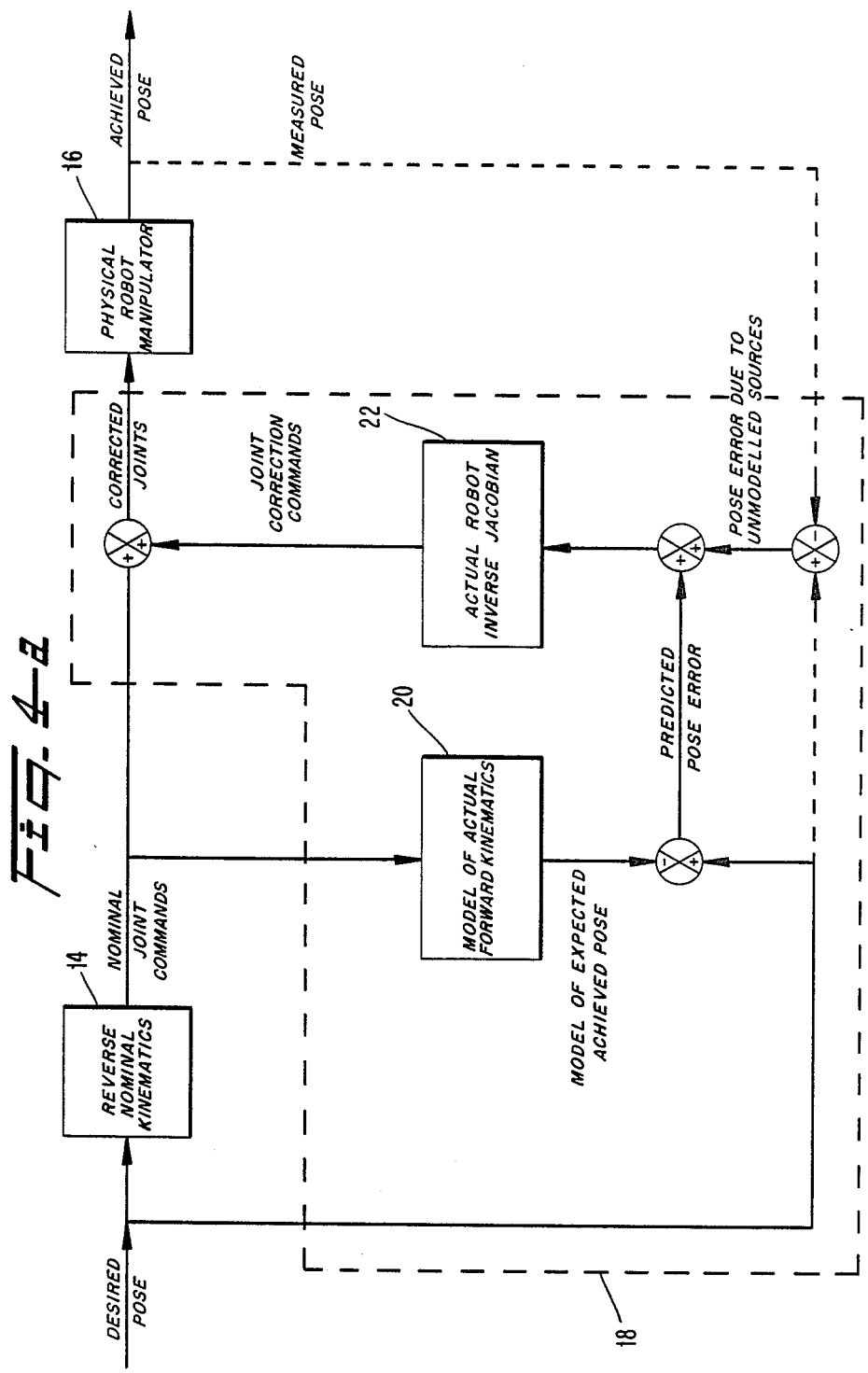
Figure 5A:
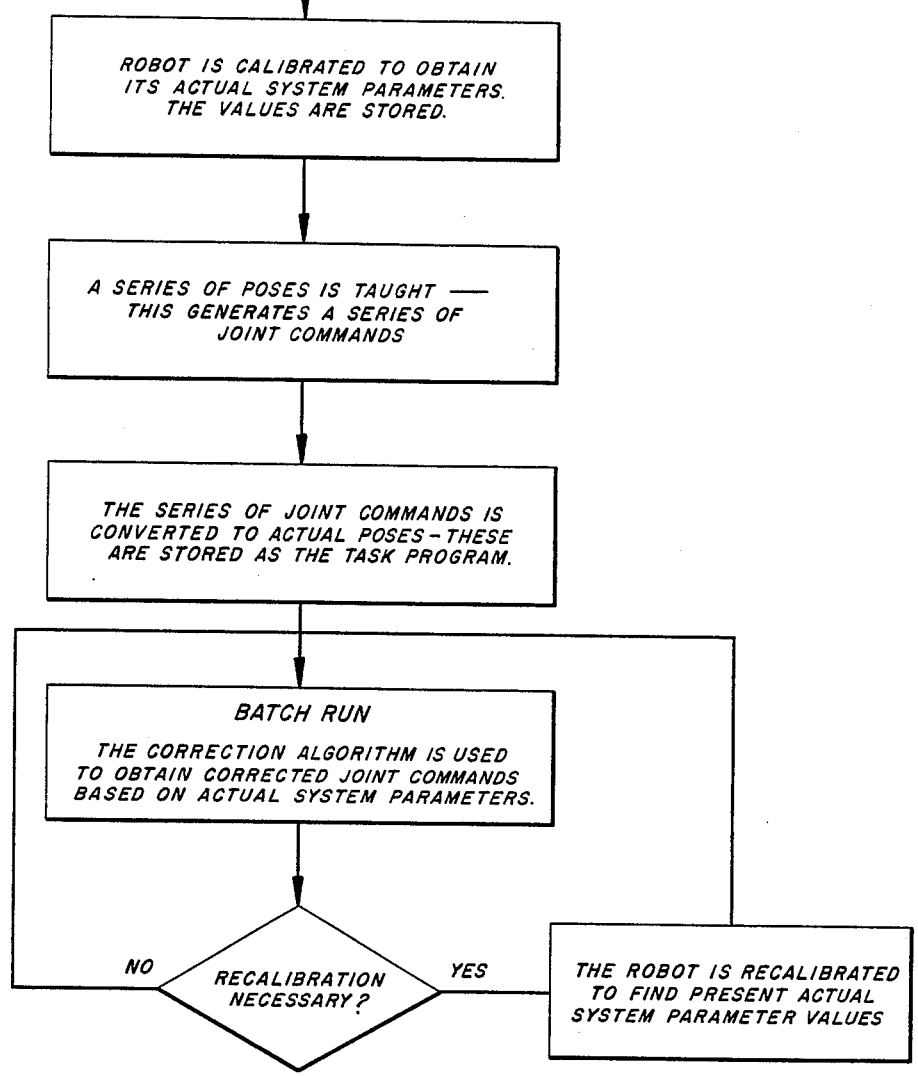
FIG. 5a is a flow diagram of process operations according to the subject invention for an online programmed robot.
Figure 5B:
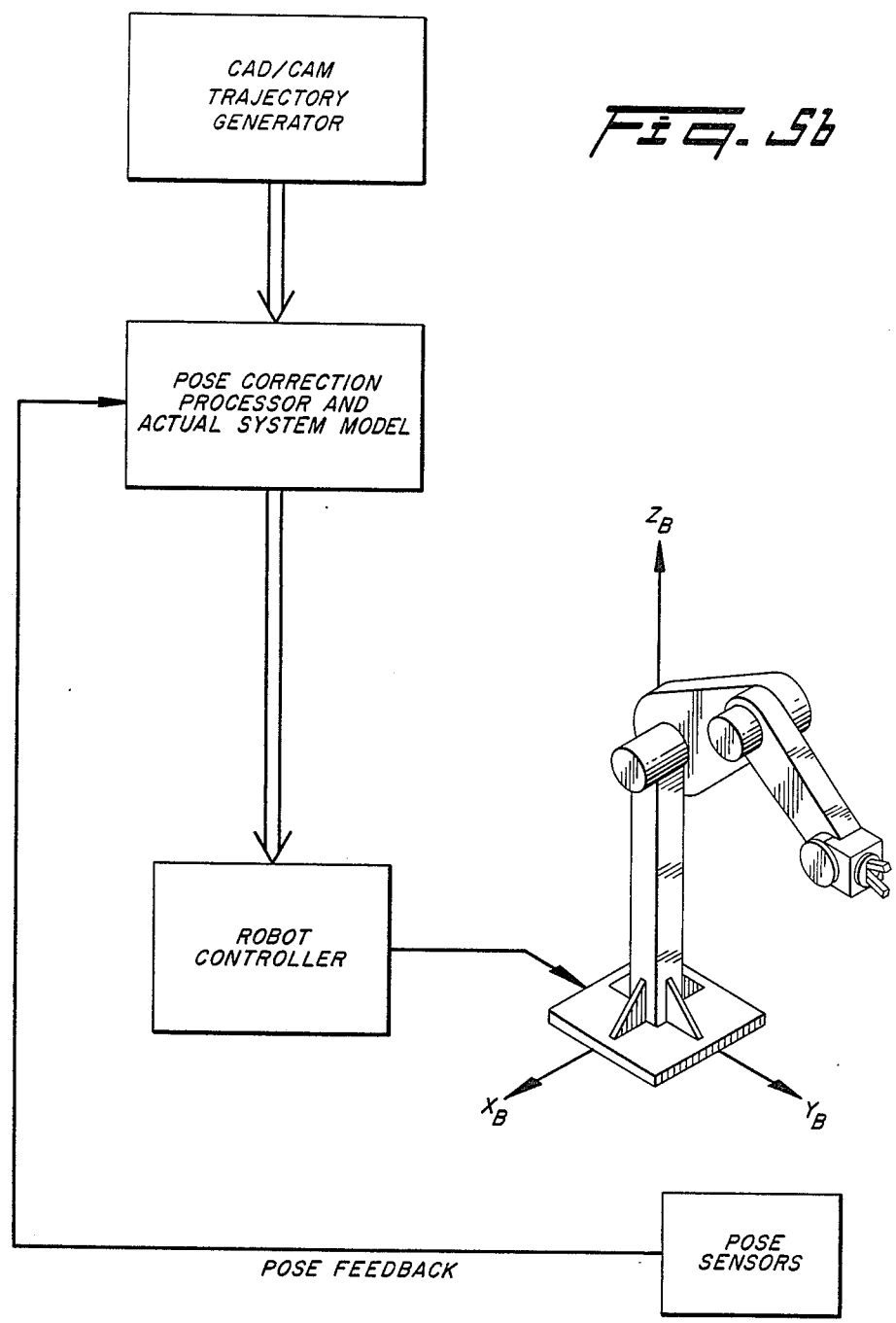
FIG. 5b is a flow diagram of process operations according to the subject invention for an offline programmed robot.

It is also possible, as shown in FIG. 4a to provide a closed loop system in which the achieved pose is in the area of a sensor 12 (FIG. 3) and the resultant measured pose is used to provide pose error data due to unmodelled sources.

Specifically, the invention can also be used in a direct feedback mode. In this mode, the robot operates within the work volume of one or more of the pose sensors 12. In addition to the joint correction signals resulting from the previously described modes of operation, the invention generates joint correction signals based on any difference between the desired pose and the actual pose. This direct feedback mode of operation still includes the calibration step to determine the robot's system parameters. The calibration step must be preformed because the robot is a very complicated structure which can only be modelled using non-linear equations. Simply measuring the difference between the desired and actual poses and determining joint correction signals using the nominal robot Jacobian will result in a "limit cycle" about the desired pose. The "limit cycle" results because the kinematic influences of small joint corrections on the hand pose corrections are slightly different for the actual robot than for the nominal robot. For highly accurate pose placement control, the actual Jacobian must be used rather than the nominal Jacobian because the actual Jacobian is based on the actual linkage parameters while the nominal Jacobian is based on the nominal kinematic parameters. The accurate model of the robot derived through the calibration procedure is used, as in the invention's other modes of operation, to determine the actual robot Jacobian.

In the system of FIG. 4b, the corrections provided by the invention are combined with the desired pose commands and input to the robot controller's nominal reverse kinematics 14. The system in FIG. 4b is used when the robot controller accepts only desired pose commands as its input. Thus the nominal robot forward Jacobian 26 is used to convert the joint correction commands to pose correction commands.

In either embodiment, the actual pose that the end effector would achieve if it were commanded by the inputted nominal joint commands is calculated using an actual forward kinematics routine stored a data processor memory of the invention. This forward kinematics uses the actual kinematic parameters determined earlier in time by our calibration process. To understand the invention, it is important to distinguish between the following two poses:

(i) The desired pose of the end effector, which is the pose commanded by the traditional manipulator controller. This is the pose which the manipulator software "thinks" that the end effector will go to if the nominal joint commands determined by the (flawed) manipulator reverse kinematics were input to the manipulator joints.

(ii) The anticipated achieved pose which the end effector will go to if commanded by the nominal joint commands determined by the (flawed) manipulator software. The anticipated actual pose is determined by the (correct) software in the invention which takes into account the actual manipulator kinematic parameters.

The difference between the desired end effector pose (i) and the anticipated actual end effector pose (ii) is determined by software in the invention. The kinematic parameter errors cause the differences between the anticipated actual pose and the desired pose, and therefore, result in the need for an incremental correction in the end effector pose to be made. The manipulator actual inverse Jacobian based on the actual kinematic parameters is executed to determine the incremental changes in the joints necessary to make the correction between the desired end effector pose and the anticipated actual pose. The nominal inverse Jacobian cannot be used in this step because it will lead to a limit cycle about the desired pose.

The incremental joint corrections are added to the joint commands obtained above to obtain the corrected joint commands. The corrected joint commands constitute the output of the invention. The manipulator is commanded using the corrected joint commands and will therefore move to the desired pose.

Note that calibration is not required before every pose command. Calibration is required only once to obtain the pose error data and the actual kinematic parameters and thereafter when the robot preformance has changed for some reason. During a robot's operation calibration may be re-preformed automatically, such as between manufacturing batches. The procedure above is the basic operation of the invention. As described below, operation can be enhanced by looping through the pose correction procedure until a minimum error criterion has been met.

As noted above, the invention is implemented in two slightly different ways depending on the type of robot controller which with it is used. FIG. 4a shows the first implementation. In this case, the robot controller has an input port which accepts joint commands. Our invention determines joint command corrections, adds them to the nominal joint commands to create the corrected joint commands, and then commands the robot with the corrected joint commands. FIG. 4b shows the implementation for the case where the robot accepts only pose commands. In this implementation, our invention first determines the joint corrections as before, but then converts the joint corrections into a pose correction by multiplying them by the nominal forward Jacobian. The pose correction is added to the desired pose to create a corrected pose command which is input to the robot.

VI. Process Operation

The pose correction process operates in either of two ways. If all of the required poses for an assembly task have been predetermined (for example, a batch job), then the joint variable corrections may be computed for all of the poses before the task begins. In this case, the system does not have to operate in real time. In the alternative operation, the pose corrections and corresponding joint variable corrections are computed by a fast processor between poses, and sent to the controller as needed.

Functional descriptions of the process operation are shown in FIG. (5a) for an online programmed robot, and in FIG. (5b) for an offline programmed robot. The two algorithms used to obtain the actual linkage model and the pose correction algorithm may be written so that they can be applied to any robot or robot type with any number of degrees of freedom.

The process operation for an online programmed robot is as follows. The operator moves the robot's hand to each of the test poses where sensors are located and the pose error is measured. The operator can move the robot to the sensor using either a teach pendant or by a preprogrammed routine. The operator then trains the robot to do its task and stores the joint positions for each pose. Again he moves the hand to each sensor to verify that the performance of the robot has not changed. Using the pose error data, the data processor determines the exact linkage model of the robot and uses the model to convert the joint positions stored for each of the task into the actual task pose. These actual poses are stored by the data processor as the task program data. The robot is then allowed to perform the desired tasks as required. Periodically, the robot is recalibrated by moving its hand to each of the sensor test poses and determining its actual linkage model. If the actual robot model has changed (due to drift or wear) then the actual poses are converted to new corrected joint positions and the task continues. By storing the task program as actual taught poses, rather than joint positions, the task program has been made independent of the performance of the robot and even the particular robot or robot kinematic arrangement used. If the robot requires maintenance, or if the same task is to be performed by a different robot, the task does not need to be retaught. The recalibration can be done automatically without requiring human intervention.

The process operation for an offline programmed robot is as follows. A CAD system is used, offline, to develop a sequence of desired poses which are stored as a task program. The task program and task program data are then downloaded to the robot which is to complete the task. Before the robot is to preform the task program, it is commanded to each of the test poses within the measurement range of the pose sensors. The pose error is measured at each sensor and the data processor determines the actual linkage model. The data processor uses the model to convert the desired poses of the task (which were generated offline) to the commanded poses necessary to make the actual poses of the robot equal to those desired. Periodically, as the performance of the robot changes, the robot is recalibrated by commanding it to each of the sensor test poses and then redetermining the actual linkage model. This is done with no operator intervention. By using our process, an offline generated task program is made independent of the robot's performance and of the particular robot or robot kinematic arrangement used.

DETAILED DESCRIPTION OF POSE CORRECTION ALGORITHM

I. Error Vector and Parameter Definitions

Figure 6A:
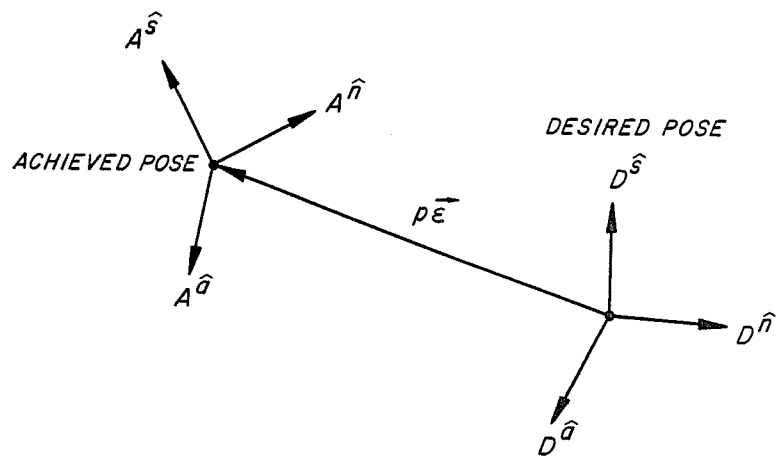
FIG. 6a is a diagram showing a position error vector.
Figure 6B:
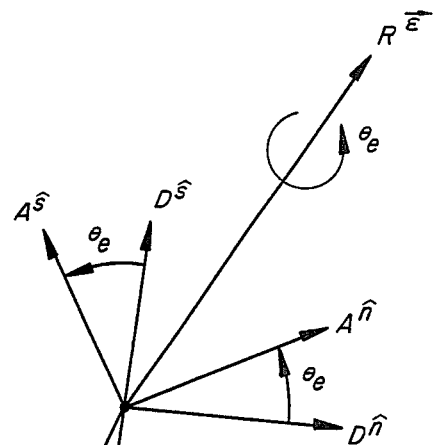
FIG. 6b is a diagram showing an orientation error vector.

The error between an achieved pose and a desired pose is described by two error vectors, the position error vector, $\vec{p\epsilon}$, and the orientation error vector, $\vec{R\epsilon}$. The position error vector defines the distance and the direction of the achieved origin of a body relative to the desired origin of the body. The orientation error vector describes the orientation of a frame fixed in a body at its achieved pose relative to the orientation of the same frame at the desired pose of the body. The magnitude of the orientation vector describes the amount that the desired pose must be rotated about the direction of the orientation error vector to obtain the achieved orientation. Typical position and orientation error vectors are shown in FIGS. 6a and 6b as they relate to a desired and achieved pose.

The pose error vectors, $\vec{p\epsilon}$ and $\vec{R\epsilon}$, are separated into those that are predicted, $\vec{p\bar{e}}$ and $\vec{R\bar{e}}$, and those which are not, $_p\vec{E}$ and $_R\vec{E}$, as given below and shown in FIG. 7

$$\vec{R\epsilon} = \vec{R\bar{e}} + \vec{_RE} \quad (4.1a)$$

$$\vec{p\epsilon} = \vec{p\bar{e}} + \vec{_pE} \quad (4.1b)$$

The predicted errors are due to the kinematic (linkage) parameter and joint variable errors and are correctable by proper selection of pose corrections $\vec{p\xi}$ and $\vec{R\xi}$. The unpredicted errors are due to other error sources such as backlash and link compliance. This pose correction technique can be expanded to include these other error sources within the predicted pose error vectors.

There are three distinguishable sets of kinematic (linkage) parameters used in the software of this invention: the sets of nominal, actual and corrected kinematic parameters. The nominal set of kinematic parameters are specified by the manufacturer. In the prior art, the robot motion planning and control software is based on the nominal kinematic parameters. The nominal kinematic parameters are denoted by $_Nd_i$, $_N\theta_i$, $_Na_{i,i+1}$, and $_N\alpha_{i,i+1}$. Linkage transformations based on the nominal kinematic parameters are $_NT_{i,i+1}$, and $_NT_{0,n+1}$. The actual kinematic parameters, including the actual joint variable, are denoted by $_Ad_i$, $_A\theta_i$, $_Aa_{i,i+1}$, and $_A\alpha_{i,i+1}$, where:

$$_Ad_i = {}_Nd_i + {}_Add_i \quad {}_Aa_{i,i+1} = {}_Na_{i,i+1} + {}_Ada_{i,i+1} \quad (4.4a,d)$$

$$_A\theta_i = {}_N\theta_i + {}_Ad\theta_i \quad {}_A\alpha_{i,i+1} = {}_N\alpha_{i,i+1} + {}_Ad\alpha_{i,i+1}$$

The actual errors in the nominal kinematic parameters, including the joint variable error, are $_Add_i$, $_Ad\theta_i$, $_Ada_{i,i+1}$, and $_Ad\alpha_{i,i+1}$. Estimates of these errors can be found using the calibration algorithms to be described below. Depending on whether joint i is prismatic or revolute, $d_i$ or $\theta_i$ is the joint variable $q_i$, respectively. Thus the following equation is used to replace either Eq. (4.4a) or (4.4c).

$$_Aq = {}_Nq + {}_Adq \quad (4.5)$$

The link transformations based on the actual kinematic parameters are $_AT_{i,i+1}$, and $_AT_{0,n+1}$. A corrected set of joint variables are used to make the achieved pose of the end effector close to that desired. The corrected kinematic parameters are equal to the actual kinematic parameters for the kinematic parameters which cannot be actively modified. But for the joint variable, which can be modified, the corrected kinematic parameter is different than the actual kinematic parameter. For a prismatic joint and revolute joint, respectively:

$$_Cd_i = {}_Ad_i + {}_Cdd_i \quad (4.6a)$$

$$_C\theta_i = {}_A\theta_i + {}_Cd\theta_i \quad (4.6b)$$

Or more generally:

$$_Cq_i = {}_Aq_i + {}_Cdq_i \quad (4.7)$$

The linkage transformation based on the corrected kinematic parameters are $_CT_{i,i+1}$, and $_CT_{0,n+1}$.

II. The Pose Correction Algorithm

A higher level motion planning and control algorithm is used in the prior art to generate the desired pose, $_DT_{0,n+1}$, of the end effector or tool. In online systems the higher level algorithms can be based on human experience, while in offline systems the algorithms can be based on either retrieval or generative techniques. The nominal joint variables, $_Nq$, which would cause the nominal robot to go to the desired pose, are determined by solving the nominal robot inverse kinematics.

$$_NT_{0,n+1}(_Nq) = {}_DT_{0,n+1} \quad (4.8)$$

If the robot joints were commanded to achieve the nominal joint variables, $_Nq$, the robot will not go to the desired pose, $_DT_{0,n+1}$, but will end up at a different achieved pose which is predicted by the invention once the actual kinematic parameters are known. To compensate for the predicted pose errors, in accordance with the present invention, the predicted pose is to be corrected in an iterative manner as shown in FIG. 8. The pose corrections when added to the predicted pose errors will cause the actual error between the desired pose and the predicted achieved pose to be zero and the difference between the desired pose and the pose actually achieved to be minimized. The pose corrections are used to determine the required joint variable corrections, $_Cdq$. The joint variable corrections are added to the nominal joint variables to obtain the corrected joint variables. The corrected joint variables are then used to predict the robot pose which would be achieved if the actual robot were commanded with the corrected joint variables. This pose is called the corrected pose. The corrected pose is compared to the desired pose to determine if it is within the robot resolution of the desired pose (a discussion on robot resolution can be found in Reference No. 6 listed below [Colson and Perreira, 1985; 1-31]). If the corrected pose is within the robot resolution of the desired pose, the robot is commanded to the corrected pose. If the corrected pose is not within the robot resolution of the desired pose, the nominal joint variables are set equal to the corrected joint variables and the procedure is repeated until the corrected pose is within the pose resolution of the desired pose.

The procedure used to determine the joint variable corrections can be implemented in either of two ways.

If all of the required poses for an assembly task have been predetermined (for example, a batch job), then the joint variable corrections can be computed for all of the poses before the task begins. In this case, the pose correction algorithm does not have to operate in real time. Alternatively, the pose corrections and corresponding joint variable corrections can be computed by a fast processor between poses, and sent to the robot controller as needed.

A property of this algorithm is that it treats the joint variable corrections and the kinematic parameter errors in exactly the same way. Therefore, the end effector pose will be corrected to the same "accuracy" to which the kinematic parameter errors were determined.

PREDICTED POSE ERRORS AND THE REQUIRED POSE CORRECTION

If the robot joints are commanded to achieve the nominal joint variables, $_Nq$, the robot will not go to the desired pose, $_DT_{1,n+1}$, but will end up at a different achieved pose and a pose error results. Before the robot is commanded, the pose correction algorithm determines a pose correction so that the sum of the pose correction and the predicted pose error will be zero:

$$\vec{_R e} + \vec{_R \xi} = 0 \qquad (4.9a)$$

$$\vec{_R e} + \vec{_R \xi} = 0 \qquad (4.9b)$$

The pose correction, $_{Cd}T_{1,n+1}$, the difference between the desired pose and predicted achieved pose, is found from, $$_{Cd}T_{1,n+1} = {_D}T_{1,n+1} - {_A}T_{1,n+1} \qquad (4.10)$$

where $_AT_{1,n+1}$ is the predicted achieved pose due to the kinematic parameter errors. The differential homogeneous transformation given in Eq. (4.10) is written in terms of the product of the predicted achieved pose and an infinitesimal screw rotation matrix, $^{n+1}{_C}\Delta$.

$$_{Cd}T_{1,n+1} = {_A}T_{1,n+1} \, {}^{n+1}{_C}\Delta \qquad (4.11)$$

where $$^{n+1}{_C}\Delta = \begin{vmatrix} 0 & -{}^{n+1}{_C}\delta z & {}^{n+1}{_C}\delta y & {}^{n+1}{_C}dx \\ {}^{n+1}{_C}\delta z & 0 & -{}^{n+1}{_C}\delta x & {}^{n+1}{_C}dy \\ -{}^{n+1}{_C}\delta y & {}^{n+1}{_C}\delta x & 0 & {}^{n+1}{_C}dz \\ 0 & 0 & 0 & 0 \end{vmatrix} \qquad (4.12)$$

Figure 9:
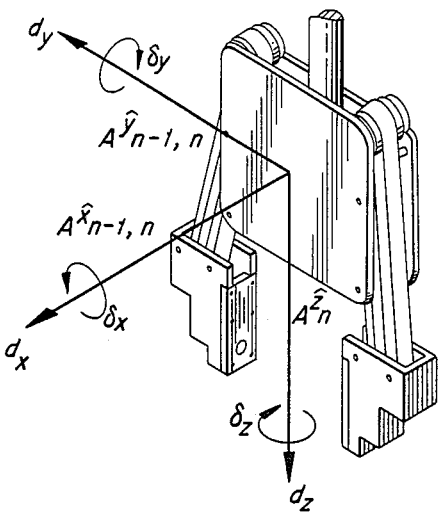
FIG. 9 is a diagram showing differential displacements and rotations along and about the n+1th frame.

Equation (4.11) is valid only if the required pose correction is small. In cases where the pose correction is not small, either a finite screw rotation matrix or an iterative form of the procedure described here must be used. If the pose corrections are not small, the diagonal terms will not be zero, and a nonskew symmetric rotation submatrix will occur. In the algorithm presented below, the values required for $^{n+1}{_C}\delta x$, $^{n+1}{_C}\delta y$ and $^{n+1}{_C}\delta z$ are taken to be the average of the appropriate elements of $^{n+1}{_C}\Delta$. The upper left 3×3 skew symmetric submatrix deals with orientation errors, while the 3×1 submatrix in the upper right deals with the position errors. The differential displacements and rotations $^{n+1}{_C}dx$, $^{n+1}{_C}dy$, $^{n+1}{_C}dz$, $^{n+1}{_C}\delta x$, $^{n+1}{_C}\delta y$ and $^{n+1}{_C}\delta z$ are along and about the n+1th frame as shown in FIG. 9.

The relationship between the screw rotation matrix and the orientation correction vector, $\vec{_R\xi}$, and the position correction vector, $\vec{_P\xi}$ is determined by first combining Eqs. (4.10) and (4.11) to yield:

$$^{n+1}{_C}\Delta = {_A}T^{-1}{_{1,n+1}}{_D}T_{1,n+1} - I \qquad (4.13)$$

The differential translation and rotation matrix is made up of components of the two pose correction vectors, which are written in the n+1th basis as:

$$^{n+1}\vec{_R\xi} = {}^{n+1}{_C}\delta x \, \hat{_A x}_{n,n+1} + {}^{n+1}{_C}\delta y \, \hat{_A y}_{n,n+1} + {}^{n+1}{_C}\delta z \, \hat{_A z}_{n+1} \qquad (4.14a\text{-}b)$$

$$^{n+1}\vec{_P\xi} = {}^{n+1}{_C}dx \, \hat{_A x}_{n,n+1} + {}^{n+1}{_C}dy \, \hat{_A y}_{n,n+1} + {}^{n+1}{_C}dz \, \hat{_A z}_{n+1}$$

The components of the correction vectors are determined by first recalling the following general rules of homogeneous transformations and their inverses, and then substituting these expressions into Eq. (4.13). A homogeneous trasformation between the i and j frames is written as:

$$T_{i,j} = \begin{vmatrix} n_{xi,j} & s_{xi,j} & a_{xi,j} & p_{xi,j} \\ n_{yi,j} & s_{yi,j} & a_{yi,j} & p_{yi,j} \\ n_{zi,j} & s_{zi,j} & a_{zi,j} & p_{zi,j} \\ 0 & 0 & 0 & 1 \end{vmatrix} \qquad (4.15)$$

where the first three columns of $T_{i,j}$ represent the components of j frame unit vectors ($\hat{x}_{j-1,j}$, $\hat{y}_{j-1,j}$, and $\hat{z}_j$) written in terms of the i frame unit vectors ($\hat{x}_{i-1,i}$, $\hat{y}_{i-1,i}$, and $\hat{z}_i$). The fourth column of $T_{i,j}$ represents the vector, $\vec{r}_{i,j}$, from $O_i$ to $O_j$ written in terms of the i frame unit vectors. The unit vectors and reference frames are shown in FIG. 1. Whenever we wish to describe the jth frame unit vectors and the position vector from $O_i$ to $O_j$ in terms of the ith frame directions, we will indicate their use by $\hat{n}_{i,j}$, $\hat{s}_{i,j}$, $\hat{a}_{i,j}$, and $\vec{p}_{i,j}$, respectively, where:

$$\hat{x}_{j-1,j} = n_{xi,j} \hat{x}_{i-1,i} + n_{yi,j} \hat{y}_{i-1,i} + n_{zi,j} \hat{z}_i = \hat{n}_{i,j} \qquad (4.16a\text{-}d)$$

$$\hat{y}_{j-1,j} = s_{xi,j} \hat{x}_{i-1,i} + s_{yi,j} \hat{y}_{i-1,i} + s_{zi,j} \hat{z}_i = \hat{s}_{i,j}$$

$$\hat{z}_j = a_{xi,j} \hat{x}_{i-1,i} + a_{yi,j} \hat{y}_{i-1,i} + a_{zi,j} \hat{z}_i = \hat{a}_{i,j}$$

$$\vec{r}_{i,j} = p_{xi,j} \hat{x}_{i-1,i} + p_{yi,j} \hat{y}_{i-1,i} + p_{zi,j} \hat{z}_i = \vec{p}_{i,j}$$

The inverse of the transformation $T_{i,j}$ is:

$$T_{i,j}^{-1} = \begin{vmatrix} n_{xi,j} & n_{yi,j} & n_{zi,j} & -\vec{p}_{i,j} \cdot \hat{n}_{i,j} \\ s_{xi,j} & s_{yi,j} & s_{zi,j} & -\vec{p}_{i,j} \cdot \hat{s}_{i,j} \\ a_{xi,j} & a_{yi,j} & a_{zi,j} & -\vec{p}_{i,j} \cdot \hat{a}_{i,j} \\ 0 & 0 & 0 & 1 \end{vmatrix} \qquad (4.17)$$

$$= \begin{vmatrix} n_{xj,i} & s_{xj,i} & a_{xj,i} & p_{xj,i} \\ n_{yj,i} & s_{yj,i} & a_{yj,i} & p_{yj,i} \\ n_{zj,i} & s_{zj,i} & a_{zj,i} & p_{zj,i} \\ 0 & 0 & 0 & 1 \end{vmatrix}$$

Equations used to evaluate the pose correction vectors are determined by first substituting Eqs. (4.15) and (4.17) into Eq. (4.13), followed by simplifying the results using Eqs. (4.12), (4.14), and (4.16). The results of the simplification are:

$$_R\vec{\xi} = \{_A\hat{x}_{n,n+1} \times _D\hat{x}_{n,n+1} + _A\hat{y}_{n,n+1} \times _D\hat{y}_{n,n+1} + \quad (4.18a)$$
$$_A\hat{z}_{n+1} \times _D\hat{z}_{n+1}\}$$

$$_P\vec{\xi} = (_D\vec{r}_{1,n+1} - _A\vec{r}_{1,n+1}) \quad (4.18b)$$

Thus, both correction vectors are based on known quantities.

POSE AND JOINT VARIABLE CORRECTIONS

The relationship between the pose correction vectors and the required joint variable corrections is found by first taking the total derivative of Eq. (4.3) (when the $T_{i,i+1}$'s are based on the actual linkage parameters), and writing the resulting expression in terms of the individual link differential transformations. It is assumed that the joint variable corrections are very small and higher order terms can be neglected. This assumption will not reduce the generality of this pose correction algorithm when the required joint variable corrections are large since this is an iterative procedure as shown in FIG. 8.

$$_CdT_{1,n+1} = \sum_{i=1}^{n} {_AT_{1,i}} \, _CdT_{i,i+1} \, _AT_{i+1,n+1} \quad (4.19)$$

Equation (4.19) expresses the pose correction transformation, $_CdT_{1,n+1}$, in terms of the joint variable corrections. Each joint transformations, $_AT_{i,i+1}$, has an associated correction transformation, $_CdT_{i,i+1}$, due to the joint variable correction, $dq_i$.

$$_CdT_{i,i+1} = {^i_C}\Delta_{\theta d} \, _AT_{i,i+1} \quad (4.20)$$

The expression for ${^i_C}\Delta_{\theta d}$ is very similar to Eq. (4.12). It can have either non-zero $_C\delta z_i$ or non-zero $_C\delta z_i$, since joint i is either a prismatic or a revolute.

$$^i_C\Delta_{\theta d} = \begin{vmatrix} 0 & _C-\delta z_i & 0 & 0 \\ _C\delta z_i & 0 & 0 & 0 \\ 0 & 0 & 0 & _Cdz_i \\ 0 & 0 & 0 & 0 \end{vmatrix} \begin{array}{l} _Cd\theta_i \approx _C\delta z_i \\ _Cdd_i \approx _Cdz_i \end{array} \quad (4.21)$$

Substitution of Eqs. (4.21) and (4.20) into Eq. (4.19) results in an expression that directly relates the pose correction transformation to the joint variable corrections.

$$_CdT_{1,n+1} = \sum_{i=1}^{n} {_AT_{1,i}} \, {^i_C}\Delta_{\theta d} \, _AT_{i,n+1} \quad (4.22)$$

The relationship between the pose correction vectors, $_P\vec{\xi}$ and $_R\vec{\xi}$, and the joint variable corrections is determined by first substituting Eq. (4.11) into Eq. (4.22), and then multiplying the result by the inverse of $_AT_{1,n+1}$.

$$^{n+1}_C\Delta = \sum_{i=1}^{n} {_AT_{n+1,i}} \, {^i_C}\Delta_{\theta d} \, _AT_{i,n+1} \quad (4.23)$$

Equations (4.14a-b) are then used with Eq. (4.23) to obtain the pose correction vectors in terms of the joint variable corrections.

$$_R\vec{\xi} = \sum_{i=1}^{n} {_A\hat{z}_i} \, _C\delta z_i \quad (4.24a)$$

$$_P\vec{\xi} = \sum_{i=1}^{n} (_A\vec{r}_{n+1,i} \times _A\hat{z}_i) \, _C\delta z_i + _A\hat{z}_i \, _Cdz_i \quad (4.24b)$$

Figure 10:
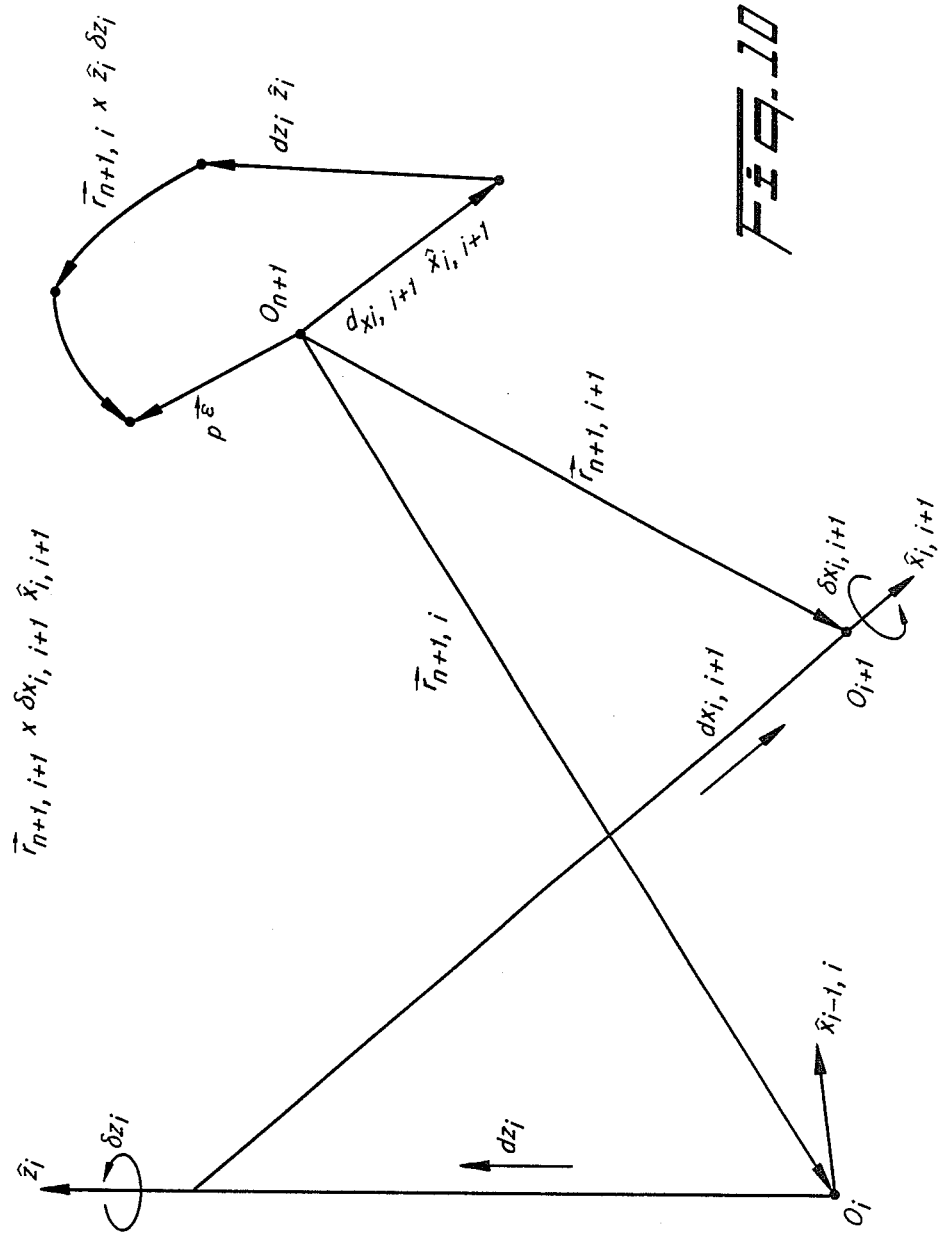
FIG. 10 illustrates the effect of parameter and joint variable errors in the i,i+1 link on the hand pose.

Equations (4.18a-b) have been used so that the resulting expression can be written independently of the coordinate system. The effect of each of the two types of joint variable corrections, $dz_i$ or $d\theta_i$, in the i,i+1 link on the position of the hand pose is shown in FIG. 10.

SYSTEM EQUATIONS

Equations (4.24a-b) result in a system of n equations in n unknowns that are used to determine the joint variable corrections. The form of the system of equations is examined in this section. Two matrix equations are written, one for each type of pose correction. These equations are, $$_C\delta X = {_AR_1} \, _C\delta q \quad (4.25a)$$

$$_CdX = {_AP} \, _C\delta q + {_AR_2} \, _Cdq \quad (4.25b)$$

The system equations include only n unknowns, since a joint is either a prismatic or a revolute; either $_Cd\theta_i$ or $_Cdd_i$ is zero. The joint variable corrections due to revolute joints are represented by $_C\delta q$, while the joint variable corrections due to prismatic joints are represented by $_Cdq$. The pose orientation corrections are represented by $_C\delta X$, while the pose position corrections are represented by $_CdX$.

$$_C\delta X = \begin{vmatrix} ^{n+1}_C\delta x \\ ^{n+1}_C\delta y \\ ^{n+1}_C\delta z \end{vmatrix} \quad _CdX = \begin{vmatrix} ^{n+1}_Cdx \\ ^{n+1}_Cdy \\ ^{n+1}_Cdz \end{vmatrix} \quad (4.26a\text{-}b)$$

$$_C\delta q = \begin{vmatrix} _Cd\theta_i \\ _Cd\theta_j \\ \cdot \\ \cdot \\ \cdot \\ _Cd\theta_k \end{vmatrix} \quad _Cdq = \begin{vmatrix} _Cdd_l \\ _Cdd_m \\ \cdot \\ \cdot \\ \cdot \\ _Cdd_r \end{vmatrix} \quad (4.26c\text{-}d)$$

The matrices $_AR_1$, $_AR_2$ and $_AP$ are given by, $$_AR_1 = \begin{vmatrix} _A a_{x,n+1,i} \cdots _A a_{x,n+1,j} \cdots _A a_{x,n+1,k} \\ _A a_{y,n+1,i} \cdots _A a_{y,n+1,j} \cdots _A a_{y,n+1,k} \\ _A a_{z,n+1,i} \cdots _A a_{z,n+1,j} \cdots _A a_{z,n+1,k} \end{vmatrix} \quad (4.27a)$$

-continued $$_AR_2 = \begin{vmatrix} A^a_{x,n+1,1} & \cdots & A^a_{x,n+1,m} & \cdots & A^a_{x,n+1,r} \\ A^a_{y,n+1,1} & \cdots & A^a_{y,n+1,m} & \cdots & A^a_{y,n+1,r} \\ A^a_{z,n+1,1} & \cdots & A^a_{z,n+1,m} & \cdots & A^a_{z,n+1,r} \end{vmatrix} \quad (4.27b)$$

$$_AP = \begin{vmatrix} (\vec{AP}_{n+1,i} \times A\hat{a}_{n+1,i})_x & \cdots & (\vec{AP}_{n+1,j} \times A\hat{a}_{n+1,j})_x & \cdots & (\vec{AP}_{n+1,k} \times A\hat{a}_{n+1,k})_x \\ (\vec{AP}_{n+1,i} \times A\hat{a}_{n+1,i})_y & \cdots & (\vec{AP}_{n+1,j} \times A\hat{a}_{n+1,j})_y & \cdots & (\vec{AP}_{n+1,k} \times A\hat{a}_{n+1,k})_y \\ (\vec{AP}_{n+1,i} \times A\hat{a}_{n+1,i})_z & \cdots & (\vec{AP}_{n+1,j} \times A\hat{a}_{n+1,j})_z & \cdots & (\vec{AP}_{n+1,k} \times A\hat{a}_{n+1,k})_z \end{vmatrix} \quad (4.27c)$$

The indices $i, \ldots, j, \ldots, k$ represent the indices of the revolute joints of the robot. If there are $l$ revolute joints, then $_AR_1$ is of dimension $3 \times l$. The indices $1, \ldots, m, \ldots, r$ represent the indices of the prismatic joints of the robot. If there are $\kappa$ prismatic joints, then $_AR_2$ is of dimension $3 \times \kappa$. Note that $\kappa + l = n$. The equations are written in terms of a single matrix, the actual Jacobian, $$_CDX = \begin{Bmatrix} _cdX \\ _c\delta X \end{Bmatrix} = \begin{bmatrix} _AR_2 & _AP \\ 0 & _AR_1 \end{bmatrix} \begin{Bmatrix} _cdq \\ _c\delta q \end{Bmatrix} = _AJ_cDq \quad (4.28)$$

SOLUTION TECHNIQUES

The joint variable corrections are determined using the system of scaler equations resulting from Eq. (4.28). The corrections are solved for, and the joint variables are updated. The system of equations could be non-singular, singular, square or non-square. Particular methods to determine the joint variable corrections for each of these cases are given below.

When the actual Jacobian is square and non-singular, the solution is straightforward. $_AJ$ is square when the robot has six degrees of freedom. When $_AJ$ is square and non-singular the solution is given by, $$\begin{vmatrix} _cdq \\ _c\delta q \end{vmatrix} = _AJ^{-1} \begin{vmatrix} _cdX \\ _c\delta X \end{vmatrix} \quad (4.29)$$

In the special case when $_AR_1$, $_AR_2$, and $_AP$ are also square, as for a particular robot, the IBM 7565, Eq. (4.29) reduces to, $$_c\delta q = {_AR_1}^{-1} {_c\delta X} \quad (4.30a)$$

$$_cdq = {_AR_2}^{-1}[_cdX - {_AP}{_AR_1}^{-1}{_c\delta q}] \quad (4.30b)$$

There are three additional important cases, which commonly occur among industrial manipulators. In these cases the actual Jacobian is not square or singular and the technique given above can not be used. The three cases and the descriptions of the methods to solve for the joint variable corrections are given below.

(1) When the robot has six degrees of freedom, $_AJ$ is square but also singular. This occurs in two situations. In the first situation, at least two different $_cd\theta_i$'s exert the same influence over the orientation corrections, $^{n+1}{_c\delta x}$, $^{n+1}{_c\delta y}$, $^{n+1}{_c\delta z}$, and the position corrections, $^{n+1}{_cd x}$, $^{n+1}{_cd y}$ and $^{n+1}{_cd z}$. In the second situation, two different $_cdd_i$'s exert the same influence over the position corrections, $^{n+1}{_cd x}$, $^{n+1}{_cd y}$ and $^{n+1}{_cd z}$. In both cases two columns of the $_AJ$ matrix are multiples of each other and the robot has "lost" a degree of freedom. Equation (4.28) no longer represents a set of six equations in six unknowns, but a reduced system of equations that is still square. In many industrial manipulators this occurs when two wrist joint axes are coincident. In this regard, see Reference No. 3 listed below [Colson and Perreira, 1983]. For a Puma 560, for example, this results in columns 4 and 6 of the Jacobian being identical.

(2) When a robot has less than six degrees of freedom, all poses within the work volume can not be achieved. It may not be possible for the robot to make the correction from the achieved to the desired pose because $_AJ$ is of rank less than six. The "best" correction possible is determined using a least squares approach.

(3) When the robot has more than six degrees of freedom, there are an infinite number of combinations of joint variable corrections which will correct the pose from the achieved to the desired. A minimum norm of the joint variable corrections is used to obtain the "best" solution.

When the Jacobian cannot be inverted using standard techniques, the invention's software uses generalized inverse methods to obtain the joint corrections necessary to cause the desired pose correction. Robots can be classified by their number of degrees of freedom; less than, equal to, or greater than six degrees of freedom. Singularities of six degree of freedom manipulators are due to the causes listed above as cause number 1. In addition to cause number 2, a linkage of less than six degrees of freedom could also have singular points due to causes listed in cause number 1. A careful survey of kinematic arrangements used in industrial manipulators reveals that no such arrangement currently exists (see Reference No. 3 listed below [Colson and Perreira, 1983]). Robots with more than six degrees of freedom have singular points due to the causes listed in causes number 1 and 3. Methods for finding the generalized inverse Jacobian for each of these three classes of robots are given below.

III. Generalized Inverses

Generalized inverse techniques are used to find the inverse of the Jacobian for the three classes of robots when any of the above mentioned causes of singularity hold. The Moore-Penrose inverse may be used in these cases (see Reference No. 1 listed below [Ben-Israel and Greville, 1974]). The unique matrix X is called the Moore-Penrose inverse of matrix J if it satisfies one or more of the following conditions.

(1) $JXJ = J$     (4.31a)

(2) $XJX = X$     (4.31b)

(3) $(JX)^T = JX$     (4.31c)

(4) $(XJ)^T = XJ$     (4.31d)

A generalized inverse is symbolized with a superscript (+), so $X = J^+$. A generalized inverse of a matrix J which satisfies only the ith and jth Moore-Penrose conditions is symbolized by $J^{\{i,j\}}$. The Moore-Penrose inverse satisfying all four conditions is termed the complete Moore-Penrose inverse. The complete Moore-Penrose inverse gives the minimal least squares solution to a set of equations. The least squares solution to Equation (4.28) is the vector Dq which minimizes $\|DX-J\,Dq\|$. The minimal solution to Eq. (4.28) is the solution vector DX that minimizes $\|DX\|$. In both cases $\|\cdot\|$ is the Euclidean norm.

IV. Application of Generalized Inverse Techniques

An inverse satisfying the four Moore-Penrose conditions is always a sufficient way of obtaining the solution for the joint corrections; but it is not always necessary that all four conditions (4.31a–4.31d) be met. For each of the three classes of robots, less than, equal to, or more than six degrees of freedom, the use of the Moore-Penrose inverse which satisfies all four conditions will result in the solution to the joint corrections. Although it is not necessary to use the Moore-Penrose inverse on any particular robot, the Moore-Penrose inverse can be used to obtain generic inverses for general purpose applications. Less general methods of obtaining the joint corrections are also presented below.

ROBOTS WITH SIX DEGREES OF FREEDOM

Figure 11:
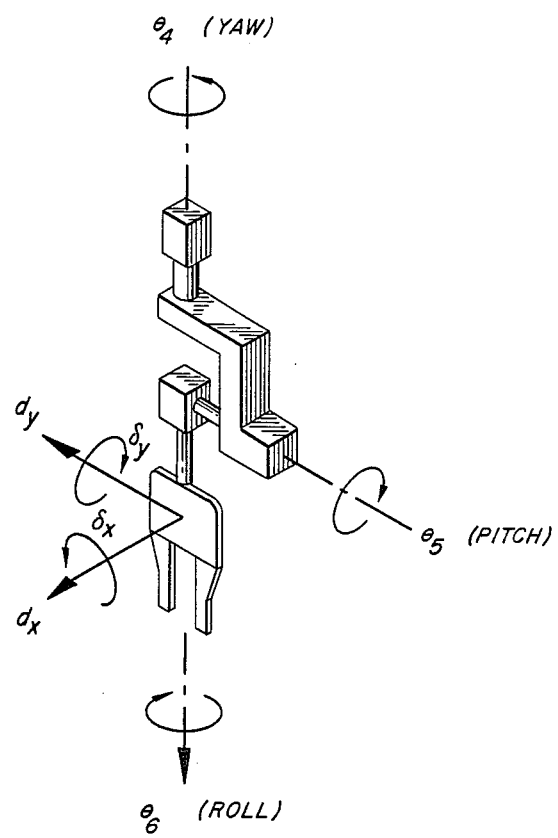
FIG. 11 demonstrates a cause of a singular Jacobian for a known robot.

Robots with six degrees of freedom will always have Jacobians that are square. In many cases, the Jacobian can be inverted using standard techniques. When the causes listed above in cause number 1 for a singular Jacobian arise, the joint variable corrections cannot be solved by standard matrix inversion. Only the first cause listed in cause number 1 is of practical significance. Examples of this singularity are in the wrist axes of most six degree of freedom robots. In the case of a robot such as the the nominal IBM 7565, as shown in FIG. 11, the Jacobian becomes singular when the pitch angle, $\theta_5$, is zero and the illustrated hand points straight down. When $\theta_5$ is zero, the yaw, $\theta_4$, and the roll, $\theta_6$, angles exert exactly the same kinematic influence over each of the six differential motions of the hand, $d_x$, $d_y$, $d_z$, $\delta_x$, $\delta_y$ and $\delta_z$. This is because the 4th and 6th joint axes are coincident. In this event, two columns of the Jacobian become multiples of each other and thus are not independent. At a singular point due to causes listed in cause number 1 above, a robot loses a degree of freedom. In the case of the IBM 7565, no joint correction can cause a hand pose correction in the $\delta_x$ direction.

JOINT VARIABLE CORRECTIONS OBTAINED USING MOORE-PENROSE INVERSE

The Moore-Penrose inverse satisfying all four conditions results in the minimal least squares solution for the joint corrections necessary to cause the desired hand pose corrections. When the Jacobian is singular, the least squares solution is required because the range of the Jacobian is not the entire differential motion space. For the IBM 7565 example, when the desired set of hand pose corrections includes motion in the $\delta_x$ direction, the correction cannot be made. The joint corrections which cause the hand pose corrections to be as close as possible, in a least square sense, to the desired are determined. The projection of the desired correction onto the range of J is equivalent to the closest least squares correction (see Reference No. 1 [Ben-Israel and Greville, 1974 pg. 104]). There are an infinite number of joint correction vectors which will cause the hand corrections to satisfy the least squares solution. The minimal solution is needed so that a unique solution results. Any vector in the differential correction space may be written as a direct sum of its projection onto $R(J)^p$ and its projection onto $R(J)$ (see Reference No. 13 listed below [Kreyszig, 1978]). When the nominal IBM 7565, for example, is singular, the least squares property of the Moore-Penrose inverse will result in the following mapping.

$$DX = \begin{vmatrix} \delta_x \\ 0 \\ 0 \\ 0 \\ 0 \\ 0 \end{vmatrix} + \begin{vmatrix} 0 \\ \delta_y \\ \delta_z \\ d_x \\ d_y \\ d_z \end{vmatrix} \quad (4.32)$$

↑ The projection of $DX$ onto $R(J)^p$ is mapped to $\{0\}$ by $J^+$

↑ The projection of $DX$ onto $R(J)$ is mapped to a vector in $N(J)^p$ by $J^+$

The minimal property of the Moore-Penrose inverse is needed because the negative rotation of the yaw joint $\theta_4$ and positive rotation of the roll joint $\theta_6$ have exactly the same effect on the hand when the Jacobian is singular. Thus, whenever $\theta_4 = \theta_6$ $$\begin{vmatrix} 0 \\ 0 \\ 0 \\ 0 \\ 0 \\ 0 \end{vmatrix} = J \begin{vmatrix} 0 \\ 0 \\ 0 \\ \theta_4 \\ 0 \\ \theta_6 \end{vmatrix} \quad (4.33)$$

Because there exists non-zero vectors in $N(J)$, an infinite number of solutions will cause any desired hand pose correction. The minimal property of the Moore-Penrose inverse will result in a unique solution.

IMPLEMENTATION

A procedure which preforms the same mappings as the complete Moore-Penrose inverse but which is specific to the particular linkage is given here. For clarity, an IBM 7565 linkage arrangement is used. Similar techniques can be used for other robots of this class. This implementation is choosen because it is computationally more efficient than computing the singular value decomposition. The IBM 7565 loses a degree of freedom at the singularity. The reduced set of 5 equations and 5 unknowns are solved.

$$\begin{vmatrix} dd_1 \\ dd_2 \\ dd_3 \\ \theta_5 \\ \theta_{46} = \theta_6 - \theta_4 \end{vmatrix} = J^+ \begin{vmatrix} \delta_y \\ \delta_z \\ d_x \\ d_y \\ d_z \end{vmatrix} \quad (4.34)$$

The solutions for $\theta_6$ and $\theta_4$ are then determined from $$\theta_6 = \frac{\theta_{46}}{2} \quad \theta_4 = -\frac{\theta_{46}}{2} \qquad (4.35)$$

The inverse given in Eq. (4.34) and the procedure given above maps the vectors in R(J)$^p$ to the $\{\vec{O}\}$ vector, and finds the minimum norm solution for the projection of DX onto R(J) just as the complete Moore-Penrose inverse.

If this procedure is used, as an alternative to the complete Moore-Penrose inverse, the Jacobian must be checked for singularity. In the nominal IBM 7565, it is easy to determine that a singular Jacobian exists, because it is singular whenever $\theta_5$ is zero; this is because the 4th and 6th joint axes are coincident. When the robot's kinematic parameter errors are taken into account, the joint variable values that result in a singular Jacobian are harder to determine. The 4th and 6th revolute joint axes may not be coincident when $\theta_5$ is zero. Conversely, when $\theta_5$ is not zero, the 4th and 6th axes may be coincident. Physical insight into the causes of robot singularities are used to develop efficient algorithms that detect the singular nature of the Jacobian and the required reduction in the system equations. A procedure which checks if the 4th and 6th axes are coincident is required.

One approach is to compare the entire first row of the Jacobian, the row that contains the kinematic influence of the joint variables on motion in the $\delta_x$ direction, to a threshold value which is close to zero. The threshold value is dependent on the particular computer on which the invention is implemented and the accuracy required. If every element of the first row is less than the threshold, no motion in the $\delta_x$ direction is considered possible, and the reduced system of equations is solved. Alternatively, the Euclidean norm of the first row of the Jacobian can be compared to a threshold.

ROBOTS WITH LESS THAN SIX DEGREES OF FREEDOM

The Jacobian of a robot with less than six degrees of freedom is not square and therefore cannot be inverted using standard procedures. For example, a SCARA (Selective Compliance Robot Arm for Assembly) robot with 4 degrees of freedom has a Jacobian of dimension 6×4 and Eq. (4.28) becomes, $$\begin{vmatrix} \delta_x \\ \delta_y \\ \delta_z \\ d_x \\ d_y \\ d_z \end{vmatrix} = J \begin{vmatrix} dq_1 \\ dq_2 \\ dq_3 \\ dq_4 \end{vmatrix} \qquad (4.36)$$

When a robot has less than six degrees of freedom, the range of J is not the entire differential correction space. There is no guarantee that a desired set of differential corrections can be made by the end effector. The best least squares correction is the projection of the desired differential correction vector onto R(J). The complete Moore-Penrose inverse gives the solution to $$P_{R(J)} \begin{vmatrix} \delta_x \\ \delta_y \\ \delta_z \\ d_x \\ d_y \\ d_z \end{vmatrix} = J \begin{vmatrix} dq_1 \\ dq_2 \\ dq_3 \\ dq_4 \end{vmatrix} \qquad (4.37)$$

IMPLEMENTATION

Either the complete Moore-Penrose inverse or a robot specific pseudo-inverse can be used to obtain the least squares solution. A pseudo-inverse which satisfies only the 1st and 3rd Moore-Penrose conditions is sufficient to determine these joint corrections (see Reference No. 1 listed below [Ben-Israel and Greville, 1974 pg. 104]). One, of a number of inverses that satisfies these conditions, is $$J^+ = J^{\{1,3\}} = (J^T J)^{-1} J^T \qquad (4.38)$$

This pseudo-inverse is valid only if the Jacobian J is of rank n. It cannot be used if the robot has a singularity caused by one the reasons listed above in cause number 1. Since no industrial robots with less than six degrees of freedom that meet either of these conditions have been found, the pseudo-inverse given in Eq. (4.38) is sufficient. If a linkage of less than six degrees of freedom did have a singular point due to one of the reasons listed above in cause number 1, the cause of the singularity should be removed using the method presented in the implementation of the technique for robots with six degrees of freedom. The pseudo-inverse of Eq. (4.38) can then be used on the reduced system of equations.

ROBOTS WITH MORE THAN SIX DEGREES OF FREEDOM

Robots with more than six degrees of freedom have non-square Jacobians. These Jacobians cannot be inverted using standard techniques. For example, a seven degree of freedom robot has a Jacobian which is 6×7.

$$\begin{vmatrix} \delta_x \\ \delta_y \\ \delta_z \\ d_x \\ d_y \\ d_z \end{vmatrix} = J \begin{vmatrix} dq_1 \\ dq_2 \\ dq_3 \\ dq_4 \\ dq_5 \\ dq_6 \\ dq_7 \end{vmatrix} \qquad (4.39)$$

Although the range of J, for these robots, is the entire differential correction space, the null space of J contains an infinite number of vectors other than the null vector. There are an infinite number of joint correction vectors which will cause the desired hand pose correction. The minimal property of the Moore-Penrose inverse is needed to determine a unique solution.

IMPLEMENTATION

Either the complete Moore-Penrose inverse or a robot specific pseudo-inverse can be used to obtain the minimal solution. A pseudo-inverse which satisfies only the 1st and 4th Moore-Penrose conditions is sufficient to determine these joint corrections when the robot is not at a singular point due to one of the reasons listed above in cause number 1 (see Reference No. 1 listed below [Ben-Israel and Greville, 1974 pg. 114]). One pseudo-inverse which satisfies these conditions is $$J^+ = J^{\{1,4\}} = J^T(JJ^T)^{-1} \qquad (4.40)$$

At a singular point, due to one of the reasons listed above in cause number 1, the cause of the singularity should be removed using the method presented in the implementation of the technique for robots with six degrees of freedom. The pseudo-inverse of Eq. (4.40) is then used on the reduced system of equations.

CALIBRATION PROCEDURE

In accordance with the present invention, a calibration procedure, is used to determine the actual kinematic parameters of the robot. As shown in FIG. 12 by way of example and not limitation, this calibration procedure consists of the following steps:

(1) Placing one or more pose measuring sensors at locations within the workspace of the robot. If more than one sensor is employed, each is placed at a known location relative to one sensor, called the reference sensor. A number of calibration poses, each of which is within the measuring range of at least one pose measuring sensor, comprise the first input to the calibration process.

(2) Commanding the actual robot system 42 to move to each of the calibration poses. The difference between each commanded calibration pose and the pose actually achieved is measured. The resultant measured pose errors constitute the second input to the calibration process.

(3) Solving a set of linear equations 44, which model the actual robot by relating the pose errors to the errors in the kinematic parameters, to obtain the kinematic parameter errors, 46. The set of equations is derived by linearizing the robot's kinematic equations at the linkage configuration which gives the desired calibration pose. The output of the calibration process consists of the kinematic parameter errors. These errors are used to determine the actual system model 44.

We use one of two methods to solve for the kinematic parameter errors. The first we call the deterministic method. In this method, the number of equations is the same as the number of unknown kinematic parameters. The second method we call the least squares method. In this method, the number of equations is more than the number of unknown kinematic parameter errors. The equations are solved in a standard least squares technique for the kinematic parameter errors. In the deterministic method, the pose errors are made exactly zero at the locations of the sensors. In the least squares method, the pose errors at the sensor locations are minimized. The least squares method is less sensitive to measurement errors and other sources of pose errors.

I. Deterministic Method

Recent publications present methods for determining the linkage parameter and joint variable errors in some ways similar to that presented here, (see References Nos. 25, 10, 11 listed below [Wu 1983, 1984; Hayati 1983; and Hayati and Mirmirani 1984]). A number of small yet meaningful improvements to these techniques are presented below. These improvements concern the singular nature of the resulting system equations and procedures for large pose errors. The approach presented here can be used on all modern day robots, as it incorporates techniques to take modified inverses of the Jacobians or of the matrices of first order kinematic influence coefficients that typically occur. A particular method of parameter identification, known as a learning model technique, is used here. A complete, unsummarized version of the technique discussed here is given in Reference No. 12 listed below [Ibarra and Perreira, 1985].

DETERMINISTIC ERROR

In this derivation, the measured pose errors, $\vec{p\tilde{e}^m}$ and $\vec{R\tilde{e}^m}$, are related to predicted pose errors, $\vec{pe^m}$ and $\vec{Re^m}$, using $$\vec{R\tilde{e}^m} = \vec{Re^m} + \vec{R\tilde{E}^m} \qquad (5.1a)$$

$$m = 1, 2, 3, \ldots M$$

$$\vec{p\tilde{e}^m} = \vec{pe^m} + \vec{p\tilde{E}^m} \qquad (5.1b)$$

where $\vec{p\tilde{E}^m}$ and $\vec{R\tilde{E}^m}$, are non-predicted pose errors.

Pose placement errors are due to a number of mechanical sources. Error sources include those associated with sensing, machining, and assembly of the linkage. Errors from a second group of sources can be analyzed using generalizations of the procedures described here; these sources are associated with the affect of linkage weight, payload, and dynamics on both the servo controller error and the linkage deformation. The second group also includes errors due to mechanical backlash and thermal affects.

It may be assumed for purpose of illustration and not limitation, that all pose errors are only due to errors between the actual and nominal linkage parameters and joint variables and that all pose measurements are exact and the non-predicted pose errors are identically zero. An alternative algorithm included in the invention, is based on minimizing the least square of the non-predicted pose errors. This algorithm is given in detail in Reference No. 15 listed below [Nanayakkara and Perreira, 1985]. This latter algorithm, which is described below, is less sensitive to unmodeled pose error sources and pose measurement errors but requires more computations. Thus, in applications of the invention where speed of operation is more important than very high accuracy, the deterministic algorithm is used, while in applications where high accuracy is more important than speed or when a very fast processor is available, the least squares algorithm is used.

COORDINATE FRAMES AND HOMOGENEOUS TRANSFORMATIONS

Figure 13:
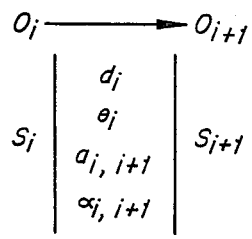
FIG. 13 illustrates the Hartenburg Link Transformation Notation.

Kinematic chains are composed of a number of links interconnected by joints which allow relative motion. For all kinematic chains composed of these lower order pair connectors, it has been determined (see Reference No. 8 [Denavit and Hartenburg, 1955]) that homogeneous transformations could be used to define the relative pose of frames fixed to each of the links. The placement of the required reference coordinate systems on the individual links is not arbitrary and allows only four parameters to define the relative pose between two interconnected bodies. The approach typically used is to associate with each link a joint, S, and a Z axis (see References Nos. 8, 16, 9 [Denavit and Hartenburg 1955, Paul 1981, and Duffy 1977]). The joint must be either revolute, R, or prismatic, P. The common perpendicular between Z axes associated with two neighboring or interconnecting links is identified as a X axis. The selection made here and in Duffy's Unified System is shown in FIG. 1. The i frame and joint $S_i$ are situated at $O_i$. The i frame is associated with the $\hat{x}_{i-1,i}$, $\hat{y}_{i-1,i}$ and $\hat{z}_i$ unit vectors and $X_{i-1,i}$, $Y_{i-1,i}$, and $Z_i$ axes. In order to traverse the kinematic chain from the origin $O_i$ to the origin $O_{i+1}$, four sequential steps are used. In each step a new coordinate axis is defined. The following description is summarized by the 4×1 link description matrix, known as the Hartenburg's Link Transformation Notation, shown in the upper left hand corner of FIG. 13. First, move along $\hat{z}_i$ a positive distance $d_i$; this move defines the $\hat{x}_{i-1,i}$, $\hat{y}_{i-1,i}$, and $\hat{z}_{i,i+1}$ unit vectors ($\hat{z}_i = \hat{z}_{i,i+1}$). Secondly, rotate the $\hat{x}_{i-1,i}$, $\hat{y}_{i-1,i}$, and $\hat{z}_{i,i+1}$ unit vectors about $\hat{z}_{i,i+1}$ using a right hand rotation of magnitude $\theta_i$. The resulting unit vectors are $\hat{x}_i$, $\hat{y}_i$, and $\hat{z}_{i,i+1}$. Next, move a positive distance $a_{i,i+1}$ along $\hat{x}_i$; this move defines the $\hat{x}_{i,i+1}$, $\hat{y}_i$, and $\hat{z}_{i,i+1}$ unit vectors ($\hat{x}_i = \hat{x}_{i,i+1}$). Rotate the $\hat{x}_{i,i+1}$, $\hat{y}_i$, and $\hat{z}_{i,i+1}$ unit vectors by the angle $\alpha_{i,i+1}$ about $\hat{x}_{i,i+1}$ in a right hand fashion. The resulting unit vectors are $\hat{x}_{i,i+1}$, $\hat{y}_{i,i+1}$ and $\hat{z}_{i+1}$.

The origins $O_i$ and $O_{i+1}$ define the two ends of link i,i+1. The vector from $O_i$ to $O_{i+1}$ is $\vec{r}_{i,i+1}$. The i,i+1 link is described kinematically by the parameters; $d_i$, $\theta_i$, $a_{i,i+1}$ and $\alpha_{i,i+1}$ and the unit vectors noted above. Three of these kinematic link identifiers are typically taken to be constant parameters, while the fourth identifier, known as a joint or pair variable, is usually associated with relative link motion. If joint i is prismatic ($S_i = P_i$), $d_i$ is the joint variable, while if joint i is a revolute ($S_i = R_i$), $\theta_i$ is the joint variable. The relative pose of the i+1 frame to the i frame is described by the homogeneous transformation matrix $$T_{i,i+1} = \begin{vmatrix} c\theta_i & -s\theta_i c\alpha_{i,i+1} & s\theta_i s\alpha_{i,i+1} & a_{i,i+1}c\theta_i \\ s\theta_i & c\theta_i s\alpha_{i,i+1} & -c\theta_i s\alpha_{i,i+1} & a_{i,i+1}s\theta_i \\ 0 & s\alpha_{i,i+1} & c\alpha_{i,i+1} & d_i \\ 0 & 0 & 0 & 1 \end{vmatrix} \quad (5.2)$$

The origin $O_1$ is placed on the $\hat{z}_1$ connection axis between the reference body and the first moving link. $O_0$ is placed at an arbitrary location in the reference body. The transformation for the robot base relative to the world, $T_{0,1}$, and the transformation of a tool relative to the robot hand, $T_{n+1,n+2}$, are assumed to be known and constant and thus do not contribute to the pose placement error of the robot's end effector. The technique discussed here can be easily modified to include the case where these assumptions are not valid.

The pose of the hand frame relative to the ground reference frame is determined by evaluating the expression $$\begin{aligned} T_{1,n+1} &= T_{1,2}T_{2,3}\ldots T_{i-1,i}T_{i,i+1}T_{i+1,i+2}\ldots \\ & \quad T_{n-1,n}T_{n,n+1} \\ &= T_{1,i}T_{i,i+1}T_{i+1,n+1} \end{aligned} \quad (5.3)$$

The evaluation of Eqs. (5.2) and (5.3) require the use of either nominal or actual linkage parameters and joint variables. The nominal kinematic parameters are donated by $_Nd_i$, $_N\theta_i$, $_Na_{i,i+1}$, and $_N\alpha_{i,i+1}$. The linkage transformations based on the nominal kinematic parameters are $_NT_{i,i+1}$, and $_NT_{1,n+1}$. The actual kinematic parameters and joint variables are donated by $_Ad_i$, $_A\theta_i$, $_Aa_{i,i+1}$, and $_A\alpha_{i,i+1}$, where $$_Ad_i = {_Nd_i} + dd_i \qquad _A\theta_i = {_N\theta_i} + d\theta_i$$
$$_Aa_{i,i+1} = {_Na_{i,i+1}} + da_{i,i+1} \quad _A\alpha_{i,i+1} = {_N\alpha_{i,i+1}} + d\alpha_{i,i+1}$$

The errors in the nominal kinematic parameters and joint variables are, $dd_i$, $d\theta_i$, $da_{i,i+1}$, and $d\alpha_{i,i+1}$. The link transformations, based on the actual kinematic parameters are $_AT_{i,i+1}$, and $_AT_{1,n+1}$.

DIFFERENTIAL TRANSFORMATIONS AND POSE ERRORS

When moving a manipulator, based on offline generated code, it is typically assumed that the measured joint variables and the nominally specified kinematic linkage parameters are the actual values. In reality, the actual and the nominal values differ. Thus, the actual and the nominal manipulator hand pose will also differ. The difference is given by $$dT^m{}_{1,n+1} = {_AT^m{}_{1,n+1}} - {_NT^m{}_{1,n+1}} \quad (5.4)$$

The nominal transformations are computed, while the actual transformations are based on measured pose data. The superscript m is used to identify particular pose placements where the pose error is to be described.

The pose error can be determined by using either experimental data or from a predictive model. The pose error can also be expressed in a number of reference frames. In this description, the hand or n+1th frame is used. This frame is selected because it minimizes the errors that result from using pose measurement devices. In addition, characterizing manipulator performance in the hand frame results in information required in manufacturing operations. Thus, the algorithm can be used by the robot designer to relate the manufacturing and assembly tolerance of the robot linkage to pose error predictions and required robot performance.

The differential homogeneous transformation given in Eq. (5.4) is related to a differential screw rotation or translation and rotation transformation, $^{n+1}\Delta^m$ as in References Nos. 18 and 16 [Suh and Radcliff, 1978; Paul 1983].

$$dT^m{}_{1,n+1} = {_NT^m{}_{1,n+1}}{}^{n+1}\Delta^m \quad (5.5a)$$

where $$^{n+1}\Delta^m = \begin{vmatrix} 0 & -{}^{n+1}\delta z^m & {}^{n+1}\delta y^m & {}^{n+1}dx^m \\ {}^{n+1}\delta z^m & 0 & -{}^{n+1}\delta x^m & {}^{n+1}dy^m \\ -{}^{n+1}\delta y^m & {}^{n+1}\delta x^m & 0 & {}^{n+1}dz^m \\ 0 & 0 & 0 & 0 \end{vmatrix} \quad (5.5b)$$

Equation (5.5) is valid only if the pose error is small. In cases where the pose error is not small either a finite screw rotation matrix or an iterative form of the procedure described here must be used. The pose error vectors can be determined in the latter case using the procedures outlined either in Reference No. 2 [Colson, 1984] or Reference No. 12 [Ibarra and Perreira, 1985].

MEASURED POSE PLACEMENT ERRORS

Conventional procedures and devices are used to measure the actual pose achieved by a manipulator, $_NT^m{}_{1,n+1}$. The relationship between this transformation and the orientation error vector, $\vec{R\epsilon}^m$, and the position error vector, $\vec{P\epsilon}^m$ is determined by first combining Eqs. (5.4) and (5.5) to yield.

$$^{n+1}\Delta^m = {}_NT^{m-1}{}_{1,n+1}\, AT^m{}_{1,n+1} - I \qquad (5.6)$$

The differential translation and rotation matrix is made up of components of the two pose error vectors which are written in the $n+1$ basis as, $$^{n+1}\vec{R\epsilon}^m = {}^{n+1}\delta x^m\, \hat{x}_{n,n+1} + {}^{n+1}\delta y^m\, \hat{y}_{n,n+1} + {}^{n+1}\delta z^m\, \hat{z}_{n+1} \qquad (5.7a)$$

$$^{n+1}\vec{P\epsilon}^m = {}^{n+1}dx^m\, \hat{x}_{n,n+1} + {}^{n+1}dy^m\, \hat{y}_{n,n+1} + {}^{n+1}dz^m\, \hat{z}_{n+1} \qquad (5.7b)$$

The components of the error vectors are determined by first recalling the following general rules of homogeneous transformations and their inverses and then substituting these expressions into Eq. (5.6). A homogeneous transformation between the i and j frames is written as, $$T_{i,j} = \begin{vmatrix} n_{xi,j} & s_{xi,j} & a_{xi,j} & p_{xi,j} \\ n_{yi,j} & s_{yi,j} & a_{yi,j} & p_{yi,j} \\ n_{zi,j} & s_{zi,j} & a_{zi,j} & p_{zi,j} \\ 0 & 0 & 0 & 1 \end{vmatrix} = \begin{vmatrix} A_{i,j} & p_{i,j} \\ 0 & 1 \end{vmatrix} \qquad (5.8)$$

where the first three columns of $T_{i,j}$ represent the components of j frame unit vectors ($\hat{x}_{j-1,j}$, $\hat{y}_{j-1,j}$, and $\hat{z}_j$) written in terms of the i frame unit vectors ($\hat{x}_{i-1,i}$, $\hat{y}_{i-1,i}$, and $\hat{z}_i$). The fourth column of $T_{i,j}$ represents the vector, $\vec{r}_{i,j}$, from $O_i$ to $O_j$ written in terms of the i frame unit vectors. The unit vectors and reference frames are shown in FIG. 1. Whenever we wish to describe the jth frame unit vectors and the position vector from $O_i$ to $O_j$ in terms of the ith frame directions, we will indicate their use by $\hat{n}_{i,j}$, $\hat{s}_{i,j}$, $\hat{a}_{i,j}$, and $\vec{p}_{i,j}$ respectively, where, $$\hat{x}_{j-1,j} = n_{xi,j}\hat{x}_{i-1,i} + n_{yi,j}\hat{y}_{i-1,i} + n_{zi,j}\hat{z}_i = \hat{n}_{i,j} \qquad (5.9a)$$

$$\hat{y}_{j-1,j} = s_{xi,j}\hat{x}_{i-1,i} + s_{yi,j}\hat{y}_{i-1,i} + s_{zi,j}\hat{z}_i = \hat{s}_{i,j} \qquad (5.9b)$$

$$\hat{z}_j = a_{xi,j}\hat{x}_{i-1,i} + a_{yi,j}\hat{y}_{i-1,i} + a_{zi,j}\hat{z}_i = \hat{a}_{i,j} \qquad (5.9c)$$

$$\vec{r}_{i,j} = p_{xi,j}\hat{x}_{i-1,i} + p_{yi,j}\hat{y}_{i-1,i} + p_{zi,j}\hat{z}_i = \vec{p}_{i,j} \qquad (5.9d)$$

The inverse of the transformation $T_{i,j}$ is, $$T_{i,j}^{-1} = \begin{vmatrix} n_{xi,j} & n_{zi,j} & n_{zi,j} & -\vec{p}_{i,j}\cdot\hat{n}_{i,j} \\ s_{xi,j} & s_{yi,j} & s_{zi,j} & -\vec{p}_{i,j}\cdot\hat{s}_{i,j} \\ a_{xi,j} & a_{yi,j} & a_{zi,j} & -\vec{p}_{i,j}\cdot\hat{a}_{i,j} \\ 0 & 0 & 0 & 1 \end{vmatrix} = \begin{vmatrix} n_{xj,i} & s_{xj,i} & a_{xj,i} & p_{xj,i} \\ n_{yj,i} & s_{yj,i} & a_{yj,i} & p_{yj,i} \\ n_{zj,i} & s_{zj,i} & a_{zj,i} & p_{xj,i} \\ 0 & 0 & 0 & 1 \end{vmatrix} \qquad (5.10)$$

Equations used to evaluate the measured pose error vectors are determined by first substituting Eqs. (5.8) and (5.10) into Eq. (5.6) followed by simplifying the results by using Eqs. (5.5b), (5.7), and (5.9). The results of the simplification are $$\vec{R\epsilon}^m = \{\hat{Nx}^m_{n,n+1} \times \hat{Ax}^m_{n,n+1} + \hat{Ny}^m_{n,n+1} \times \hat{Ay}^m_{n,n+1} + \hat{Nz}^m_{n+1} \times \hat{Az}^m_{n+1}\}/2 \qquad (5.11a)$$

and $$\vec{P\epsilon}^m = (\vec{Ar}^m_{1,n+1} - \vec{Nr}^m_{1,n+1}) \qquad (5.11b)$$

Both error vectors are thus based on known quantities. Typical pose error vectors are shown in FIG. 3.

POSE PLACEMENT ERRORS DUE TO KINEMATIC PARAMETER AND JOINT VARIABLE ERRORS

The relationship between the pose error vectors and the errors in the nominal linkage parameter and joint variables is found by first taking the total derivative of Eq. (5.3) and writing the resulting expression in terms of the individual link differential transformations. It is assumed that the linkage parameters and joint variables errors are very small and thus higher order terms can be neglected, $$dT_{1,n+1} = \sum_{i=1}^{n} T_{1,i}\, dT_{i,i+1}\, T_{i+1,n+1}$$

The individual link homogeneous transformation errors are the result of errors in the link parameters and joint variables, $$dT_{i,i+1} = {}^i\Delta_{\theta d}\, T_{i,i+1} + T_{i,i+1}\,{}^{i+1}\Delta_{aa} \qquad (5.13)$$

where the infinitesimal translation and rotation matrices about $z_i$ and $x_{i,i+1}$ respectively, are $$^i\Delta_{\theta d} = \begin{vmatrix} 0 & -\delta z_i & 0 & 0 \\ \delta z_i & 0 & 0 & 0 \\ 0 & 0 & 0 & dz_i \\ 0 & 0 & 0 & 0 \end{vmatrix} \quad ^{i+1}\Delta_{aa} = \qquad (5.14a,b)$$

$$\begin{vmatrix} 0 & 0 & 0 & dx_{i,i+1} \\ 0 & 0 & -\delta x_{i,i+1} & 0 \\ 0 & \delta x_{i,i+1} & 0 & 0 \\ 0 & 0 & 0 & 0 \end{vmatrix}$$

The substitutions $$d\theta_i = \delta z_i \quad da_{i,i+1} = dx_{i,i+1}$$
$$dd_i = dz_i \quad d\alpha_{i,i+1} = \delta x_{i,i+1}$$

have been made to enumerate that each of the parameter and joint variable errors is associated with a particular axis and coordinate system. Substitution of Eq. (5.13) into Eq. (5.12) results in an expression that directly relates the pose transformation error to the nominal linkage parameters and joint variables and their errors.

$$dT^m_{1,n+1} = \sum_{i=1}^{n} \{_NT^m_{1,i}\,{}^i\Delta_{\theta d}\,{}_NT^m_{i,n+1} + \qquad (5.15)$$

-continued
$$NT^m_{1,i+1}{}^{i+1}\Delta_{\alpha a} NT^m_{i+1,n+1}\}$$

The relationship between the predicted pose error vectors, $\vec{pe}^m$ and $\vec{Re}^m$, and linkage parameter and joint variable errors is determined by first substituting Eq. (5.5a) into Eq. (5.15) and multiplying the result by the inverse of $_NT^m_{1,n+1}$ resulting in $$^{n+1}\Delta^m = \sum_{i=1}^{n} \{_NT^m_{n+1,i}{}^i\Delta_{\theta d} NT^m_{i,n+1} + \tag{5.16}$$

$$NT^m_{n+1,i+1}{}^{i+1}\Delta_{\alpha a} NT^m_{i+1,n+1}\}$$

Expressions similar to those given by Eqs. (5.5b) and (5.7) can be written to relate the predicted pose error vectors to the differential error transformation matrix defined in Eq. (5.16). Substitution of Eqs. (5.8) and (5.10) into Eq. (5.16) result in, $$\vec{Re}^m = \sum_{i=1}^{n} (_N\hat{z}_i^m \delta z_i + _N\hat{x}_{i,i+1}^m \delta x_{i,i+1}); \tag{5.17a}$$

$$m = 1, 2, 3, \ldots M$$

and $$\vec{pe}^m = \sum_{i=1}^{n} (_N\vec{r}_{n+1,i}^m \times _N\hat{z}_i^m \delta z_i + _N\vec{r}_{n+1,i+1}^m \times \tag{5.17b}$$

$$_N\hat{x}_{i,i+1}^m \delta x_{i,i+1} + _N\hat{z}_i^m dz_i + _N\hat{x}_{i,i+1}^m dx_{i,i+1});$$

$$m = 1, 2, 3, \ldots M$$

Equations Eqs. (5.9a) through (5.9b) have been used so that the resulting expression can be written independent of the coordinate system. The effect of the parameter and joint variable errors in the i,i+1 link on the position of the hand pose is shown in FIG. 10.

SYSTEM EQUATIONS

The substitution of Eqs. (5.11a and b) and Eqs. (5.17a and b) into Eqs. (5.1a and b) result in a set of system equations that can be used to determine the linkage parameter and joint variable errors. The substitution results in 2M vector equations or 6M scalar equations in the 4n unknowns $dz_i$, $\delta z_i$, $dx_{i,i+1}$, and $\delta x_{i,i+1}$ where i equals 1 through n (m equals 1 through M).

$$\vec{Re}^m = \sum_{i=1}^{n} \vec{RA}_i^m \delta z_i + \sum_{i=1}^{n} \vec{RB}_{i+1}^m \delta x_{i,i+1} \tag{5.18a}$$

and $$\vec{pe}^m = \sum_{i=1}^{n} \vec{RA}_i^m dz_i + \sum_{i=1}^{n} \vec{RB}_{i+1}^m dx_{i,i+1} + \tag{5.18b}$$

$$\sum_{i=1}^{n} \vec{pA}_i^m \delta z_i + \sum_{i=1}^{n} \vec{pB}_{i+1}^m \delta x_{i,i+1}$$

where $$\vec{pe}^m = \{_N\hat{n}_{1,n+1}^m \cdot (\vec{ap}_{1,n+1}^m - \vec{NP}_{1,n+1}^m)\}_N\hat{x}_{n,n+1}^m$$

$$\{_N\hat{s}_{1,n+1}^m \cdot (\vec{ap}_{1,n+1}^m - \vec{NP}_{1,n+1}^m)\}_N\hat{y}_{n,n+1}^m$$

$$\{_N\hat{a}_{1,n+1}^m \cdot (\vec{ap}_{1,n+1}^m - \vec{NP}_{1,n+1}^m)\}_N\hat{z}_{n+1}^m$$

$$\vec{Re}^m = \{(_A\hat{s}_{1,n+1}^m \cdot _N\hat{a}_{1,n+1}^m - _A\hat{a}_{1,n+1}^m \cdot _N\hat{s}_{1,n+1}^m)/2\}_N\hat{x}_{n,n+1}^m +$$

$$\{(_A\hat{a}_{1,n+1}^m \cdot _N\hat{n}_{1,n+1}^m - _A\hat{n}_{1,n+1}^m \cdot _N\hat{a}_{1,n+1}^m)/2\}_N\hat{y}_{n,n+1}^m +$$

$$\{(_A\hat{n}_{1,n+1}^m \cdot _N\hat{s}_{1,n+1}^m - _A\hat{s}_{1,n+1}^m \cdot _N\hat{n}_{1,n+1}^m)/2\}_N\hat{z}_{n+1}^m$$

$$\vec{RA}_i^m = _N\hat{z}_i^m = _N\hat{a}_{n+1,i}^m$$

$$\vec{pA}_i^m = \vec{Nr}_{n+1,i}^m \times _N\hat{z}_i^m = \vec{NP}_{n+1,i}^m \times _N\hat{a}_{n+1,i}^m$$

$$\vec{RB}_{i+1}^m = _N\hat{x}_{i,i+1}^m = _N\hat{n}_{n+1,i+1}^m$$

$$\vec{pB}_{i+1}^m = \vec{Nr}_{n+1,i+1}^m \times _N\hat{x}_{i,i+1}^m = \vec{NP}_{n+1,i+1}^m \times _N\hat{n}_{n+1,i+1}^m$$

Each of the known vectors used in Eqs. (5.18a and b) have been written in terms of the n,n+1 vector basis for the reasons identified earlier. The components of the rotation error vector are taken to be the average of the differences of off-diagonal terms of the infinitesimal screw rotation matrix defined in Eq. (5.6). The average is used to reduce the error caused by employing the infinitesimal screw rotation matrix to approximate the finite screw rotation matrix.

CANONICAL FORM

Two matrix equations can be written, one for each type of pose errors. These equations are $$\delta X = R \delta q \tag{5.19a}$$

$$dX = P \delta q + R\, dq \tag{5.19b}$$

The linkage parameter and joint variable orientation errors are represented by $\delta q$ while the linkage parameter and joint variable position errors are represented by $dq$. The measured pose orientation errors are represented by $\delta X$ while the measured pose position errors are represented by $dX$. Where, $$\delta X = \begin{Bmatrix} \delta x^1 \\ \vdots \\ \delta x^M \\ \delta y^1 \\ \vdots \\ \delta y^M \\ \delta z^1 \\ \vdots \\ \delta z^M \end{Bmatrix} \quad dx = \begin{Bmatrix} dx^1 \\ \vdots \\ dx^M \\ dy^1 \\ \vdots \\ dy^M \\ dz^1 \\ \vdots \\ dz^M \end{Bmatrix}$$

-continued $$\delta q = \begin{Bmatrix} \delta z_1 \\ \cdot \\ \cdot \\ \delta z_n \\ \delta x_{1,2} \\ \cdot \\ \cdot \\ \delta x_{n,n+1} \end{Bmatrix} \quad dq = \begin{Bmatrix} dz_1 \\ \cdot \\ \cdot \\ dz_n \\ dx_{1,2} \\ \cdot \\ \cdot \\ dx_{n,n+1} \end{Bmatrix}$$

The R matrix is based on known quantities and is of dimension $3M \times 2n$, where $$R = \begin{bmatrix} RA^1_{1x} \cdots RA^1_{nx} & RB^1_{2x} \cdots & RB^1_{n+1x} \\ \cdot & RA^m_{ix} \cdot & \cdot & RB^m_{i+1x} \cdot \\ RA^M_{1x} \cdots RA^M_{nx} & RB^M_{2x} \cdots & RB^M_{n+1x} \\ RA^1_{1y} \cdots RA^1_{ny} & RB^1_{2y} \cdots & RB^1_{n+1y} \\ \cdot & RA^m_{iy} \cdot & \cdot & RB^m_{i+1y} \cdot \\ RA^M_{1y} \cdots RA^M_{ny} & RB^M_{2y} \cdots & RB^M_{n+1y} \\ RA^1_{1z} \cdots RA^1_{nz} & RB^1_{2z} \cdots & RB^1_{n+1z} \\ \cdot & RA^m_{iz} \cdot & \cdot & RB^m_{i+1z} \cdot \\ RA^M_{1z} \cdots RA^M_{nz} & RB^M_{2z} \cdots & RB^M_{n+1z} \end{bmatrix}$$

$$\overset{M}{n+1y}$$

The P matrix which is of dimension $3M \times 2n$ is also based on known quantities, where $$P = \begin{bmatrix} PA^1_{1x} \cdots PA^1_{nx} & PB^1_{2x} \cdots & PB^1_{n+1x} \\ \cdot & PA^m_{ix} \cdot & \cdot & PB^m_{i+1x} \cdot \\ PA^M_{1x} \cdots PA^M_{nx} & PB^M_{2x} \cdots & PB^M_{n+1x} \\ PA^1_{1y} \cdots PA^1_{ny} & PB^1_{2y} \cdots & PB^1_{n+1y} \\ \cdot & PA^m_{iy} \cdot & \cdot & PB^m_{i+1y} \cdot \\ PA^M_{1y} \cdots PA^M_{ny} & PB^M_{2y} \cdots & PB^M_{n+1y} \\ PA^1_{1z} \cdots PA^1_{nz} & PB^1_{2z} \cdots & PB^1_{n+1z} \\ \cdot & PA^m_{iz} \cdot & \cdot & PB^m_{i+1z} \cdot \\ PA^M_{1z} \cdots PA^M_{nz} & PB^M_{2z} \cdots & PB^M_{n+1z} \end{bmatrix}$$

Equation (5.19) can be further simplified to yield $$DX = \left\{ \frac{dX}{\delta X} \right\} = \begin{bmatrix} R & P \\ 0 & R \end{bmatrix} \left\{ \frac{dq}{\delta q} \right\} = J\,Dq \quad (5.20)$$

A similar form results when using the least squares approach shown below and listed in Reference No. 15 [Nanayakkara and Perreira, 1985] and in a pose correction algorithm shown above and listed in Reference No. 23 [Tucker and Perreira, 1985-3].

SOLUTION METHOD

In the case where R is not square (singular or non-singular) the solution techniques presented in Reference No. 21 [Tucker and Perreira, 1985-2] should be used. The following solution technique assumes that R is square ($3m=2n$).

NONSINGULAR CASE

Equation (5.19a) is first used to determine the 2n linkage parameter and joint variable errors that effect the orientation of the hand frame. The resulting solutions are then used in Eq. (5.19b) to determine the linkage parameter and joint variable errors that only effect the position of the hand.

$$\delta q = R^{-1} \delta X \quad (5.21a)$$

$$dq = R^{-1}[dX - P\delta q] \quad (5.21b)$$

The inverse matrix can be found by a number of computational techniques; one of the most practical being the use of a maximum pivot strategy and applying the Gauss Jordan approach, either with an augmented matrix or in place.

CHECK FOR SINGULARITY

The solution technique given by Eqs. (5.21a and b) cannot be used when R is singular. For R to be singular, (1) two nominal joint axes, (2) two common perpendiculars between joint axes, or (3) a joint axis and a common perpendicular between two joint axes must be parallel at all of the selected measurement poses. That is for some value of j and k ($j \neq k$) and for all values of m $$N\hat{z}_j^m = N\hat{z}_k^m \text{ or } N\hat{x}^m_{j,j+1} = N\hat{x}^m_{k,k+1} \text{ or } N\hat{z}_j = N\hat{x}_{k,k+1} \quad (5.22\text{a-c})$$

In the normal operation of the invention, several iterations of this calibration algorithm are used. The iterations are terminated when the values obtained for actual system parameters converge (ie the values obtained at an iteration are the same or approximately the same as the ones obtained at the previous iteration). The check for singularity is preformed at the start of each iteration resulting in a significant advantage over the methods listed in References Nos. 10 and 11 [Hayati, 1983, Hayati and Mirmirani, 1984] because in most cases our method will result in solutions for the linkage parameter errors which cause singularities in the nominal robot. Although a nominal robot may have parallel axes, when the actual linkage parameters are taken into account, the axes may not be exactly parallel. In most cases, only during the first iteration of the algorithm with the Jacobian be singular; during successive iterations the axes will "move away from being parallel" as the actual linkage parameters are updated, and the Jacobian will become non-singular.

SINGULAR CASE

When R is singular, an alternative solution procedure, also based on Eqs. (5.19a) and (5.19b), is used. A similar approach can be used when taking the inverse of any square singular robotic system Jacobian.

Let us assume that, in the particular robot being examined, the j th and the j+1 th $\hat{z}$ axes always remain parallel. We then define a matrix *R, where, $$*R^{-1} = *I \tag{5.23a}$$

and $$*I = \begin{bmatrix} 1 & & & & & & & & & & \\ & 1 & & & & & & & & & \\ & & \cdot & & & & & & & & \\ & & & \cdot & & & & & & & \\ & & & & 1 & & & & & & \\ & & & & & 1 & 1 & & & & \\ & & & & & 0 & 0 & & & & \\ & & & & & & & 1 & & & \\ & & & & & & & & 1 & & \\ & & & & & & & & & 1 & \\ & & & & & & & & & & 1 \\ & & & & & & & & & & & 1 \\ & & & & & & & & & & & & 1 \end{bmatrix} \tag{5.23b}$$

The use of the modified inverse in Eq. (5.21a) results in $$*I\delta q = *R^{-1}\delta X \tag{5.24}$$

and will directly determine the solution for $\delta z_1$ through $\delta z_{j-1}$; $\delta z_{j+2}$ through $\delta z_n$; and $\delta x_{1,2}$ through $\delta x_{n,n+1}$. In addition, expressions of the form $$\delta z_j + \delta z_{j+1} = \sum_{k=1}^{2n} (*R^{-1})_{j,k} \delta X_k \tag{5.25a}$$

and $$0 = \sum_{k=1}^{2n} (*R^{-1})_{j+1,k} \delta X_k \tag{5.25b}$$

result from the j and j+1 rows of Eq. (5.24). Note that $\delta z_j = \delta q_j$ and $\delta z_{j+1} = \delta q_{j+1}$. Although the right hand side of Eq. (5.21b) should equal zero identically, it will not if there are errors in the pose orientation measurements or if the orientation errors of the linkage is other than infinitesimal.

Equation (5.21b) becomes $$*Idq = *R^{-1}[dX - P\delta q] \tag{5.26}$$

To solve Eq. (5.26), $\delta z_j$ and $\delta z_{j+1}$ must first be determined. This is done with the aid of the j+1 row of Eq. (5.26), which is $$0 = \sum_{k=1}^{2n} (*R^{-1})_{j+1,k} dX_k - \sum_{k=1}^{2n} (*R^{-1}P)_{j+1,k}\delta q_k \tag{5.27}$$

Equation (5.27) is rewritten so that only known quantities appear on the right hand side.

$$(*R^{-1}P)_{j+1,j}\delta z_j + (*R^{-1}P)_{j+1,j+1}\delta z_{j+1} = \tag{5.28}$$

-continued $$\sum_{k=1}^{2n} (*R^{-1})_{j+1,k} dX_k - \sum_{\substack{k=1 \\ k \neq j, j+1}}^{2n} (*R^{-1}P)_{j+1,k}\delta q_k$$

Equations (5.25a) and (5.28) are then used to solve for $\delta z_j$ and $\delta z_{j+1}$.

Upon determining $\delta z_j$ and $\delta z_{j+1}$, the column vector $\delta q$ and all terms on the right hand side of Eq. (5.26) are known, and solutions for $dz_1$ through $dz_{j-1}$, $dz_{j+2}$ through $dz_n$, and $dx_{1,2}$ through $dx_{n,n+1}$ can be determined. The jth row of Eq. (5.26) results in $$dz_j + dz_{j+1} = \sum_{k=1}^{2n} (*R^{-1})_{j,k} dX_k - \sum_{k=1}^{2n} (*R^{-1}P)_{j,k} \delta q_k \tag{5.29}$$

where $dz_j = dq_j$ and $dz_{j+1} = dq_{j+1}$. Because the jth and j+1th Z axes are parallel, it is impossible to discriminate between $dz_j$ and $dz_{j+1}$.

II. Least Squares Method

The second calibration algorithm included in this invention, is the least squares algorithm. This algorithm is based on minimizing the least square of the non-predicted pose errors. This algorithm is less sensitive to unmodeled pose errors sources and pose measurement errors than is the deterministic algorithm, but it requires more computations and therefore will not execute as fast. Thus, as stated above, there are some applications of the invention where the deterministic algorithm is used and some applications where the least squares algorithm is used.

LEAST SQUARE ERROR

The pose placement errors, $\vec{\beta\epsilon}$, are due to kinematic parameter errors, $\vec{\beta e}$ and to a number of other sources, $\vec{\beta E}$. A thorough discussion of these error sources is given in Reference No. 5 [Colson and Perreira. 1985-1,2]. Therefore, $$\vec{\beta\epsilon^m} = \vec{\beta e^m} + \vec{\beta E^m}; \beta = P, R \tag{6.1}$$

as shown in FIG. 7.

The standard deviation, s, of the sampled set of errors is determined from, $$\sum_{m=1}^{M} (\vec{\beta\epsilon}^m - \overline{\vec{\beta e}^m})^2 = \sum_{m=1}^{M} \vec{\beta E}^{m2} = (m-1)\beta s^2; \beta = P, R \quad (6.2)$$

We would like to minimize the variance of the sample by proper choice of the independent variable, $dq_j$, equal to each of the linkage kinematic errors $\delta z_j$, $dz_j$, $\delta x_{j,j+1}$, and $dx_{j,j+1}$. The resulting minimization requires, $$(m-1)\frac{\partial \beta s^2}{\partial dq_i} = \frac{\partial}{\partial dq_i}\left(\sum_{m=1}^{M}(\vec{\beta\epsilon}^m - \overline{\vec{\beta e}^m})^2\right) \quad (6.3)$$

$$= 2\sum_{m=1}^{M}(\vec{\beta\epsilon}^m - \overline{\vec{\beta e}^m}) \cdot \frac{\partial \vec{\beta e}^m}{\partial dq_i} = 0;$$

$$\beta = P, R \quad i = 1, \ldots, n$$

Where it has been noted that $\overline{\vec{\beta e}^m}$ is not an explicit function of the $dq_j$'s. Equation (6.3) results in the required system equations.

$$\sum_{m=1}^{M}\vec{\beta\epsilon}^m \cdot \frac{\partial \vec{\beta e}^m}{\partial dq_i} = \sum_{m=1}^{M}\overline{\vec{\beta e}^m} \cdot \frac{\partial \vec{\beta e}^m}{\partial dq_i}; \quad (6.4)$$

$$\beta = P, R \quad i = 1, \ldots, n$$

The orientation error vector, $\vec{Re}^m$, as given by Eq. (5.17a), is a function of 2n kinematic error variables, $\delta z_i$, and $\delta x_{i,i+1}$. Thus, the use of $\beta=R$ in Eq. (6.4) results in 2n equations which are used in determining the 2n unknowns $\delta z_i$, and $\delta x_{i,i+1}$ by the the technique described below. Substitution of $\beta=P$ into Eq. (6.4) results in 2n equations in the 2n unknowns, $dz_i$, and $dx_{i,i+1}$. Although the position error vector, $\vec{pe}^m$, as given by Eq. (5.17b), is a function of 4n kinematic error variables, $\delta z_i$, $dz_i$, $\delta x_{i,i+1}$, and $dx_{i,i+1}$ only 2n of these variables remain unknown. Thus, Eq. (6.4) represents 4n scalar equations in 4n unknowns.

CANONICAL FORM

The system equations given above are next rewritten in canonical form. We have found this form to apply to a number of differential kinematic problems in robotic manipulators. Equations (6.4) are reduced by first noting that $$\frac{\partial \vec{Re}^m}{\partial \delta z_i} = N\hat{z}_i^m = \frac{\partial \vec{pe}^m}{\partial dz_i} \quad (6.5a)$$

and $$\frac{\partial \vec{Re}^m}{\partial \delta x_{i,i+1}} = N\hat{x}_{i,i+1}^m = \frac{\partial \vec{pe}^m}{\partial dx_{i,i+1}} \quad (6.5b)$$

Substitution of Eqs. (5.12), (5.176), and (5.21) into Eq. (6.4) with $\beta=R$, and using Eqs. (5.8a) through (5.8d) and (5.110) to simplify the results gives;

$$z\delta X_i = \sum_{j=1}^{n} RA_{ij}\delta z_j + \sum_{j=1}^{n} RB_{ij}\delta x_{j,j+1} \quad (6.6a)$$

$$i = 1, \ldots, n$$

-continued $$x\delta X_i = \sum_{j=1}^{n} RC_{ij}\delta z_j + \sum_{j=1}^{n} RD_{ij}\delta x_{j,j+1} \quad (6.6b)$$

where $$RA_{ij} = \sum_{m=1}^{M}(N\hat{z}_j^m \cdot N\hat{z}_i^m) = \sum_{m=1}^{M} Na_{zi,j}^m = \sum_{m=1}^{M} Na_{zj,i}^m$$

$$RB_{ij} = \sum_{m=1}^{M}(N\hat{x}_{j,j+1}^m \cdot N\hat{z}_i^m) = \sum_{m=1}^{M} Nn_{zi,j+1}^m = \sum_{m=1}^{M} Na_{xj+1,i}^m$$

$$RC_{ij} = \sum_{m=1}^{M}(N\hat{z}_j^m \cdot N\hat{x}_{i,i+1}^m) = \sum_{m=1}^{M} Na_{xi+1,j}^m = \sum_{m=1}^{M} Nn_{zj,i+1}^m$$

$$RD_{ij} = \sum_{m=1}^{M}(N\hat{x}_{j,j+1}^m \cdot N\hat{x}_{i,i+1}^m) = \sum_{m=1}^{M} Nn_{xi+1,j+1}^m =$$

$$\sum_{m=1}^{M} Nn_{xj+1,i+1}^m$$

and $$z\delta X_i = \sum_{m=1}^{M}(\vec{Re}^m \cdot N\hat{z}_i^m) =$$

$$\sum_{m=1}^{M}\{N\hat{n}_{1,n+1}^m \times A\hat{n}_{1,n+1}^m + N\hat{s}_{1,n+1}^m \times A\hat{s}_{1,n+1}^m +$$

$$N\hat{a}_{1,n+1}^m \times A\hat{a}_{1,n+1}^m\} \cdot N\hat{a}_{1,i}^m/2 = \sum_{m=1}^{M}(^{n+1}\delta x^m Nn_{zi,n+1}^m +$$

$$^{n+1}\delta y^m Ns_{zi,n+1}^m + ^{n+1}\delta z^m Na_{zi,n+1}^m)$$

$$x\delta X_i = \sum_{m=1}^{M}(\vec{Re}^m \cdot N\hat{x}_{i,i+1}^m) = \sum_{m=1}^{M}\{N\hat{n}_{1,n+1}^m \times A\hat{n}_{1,n+1}^m +$$

$$N\hat{s}_{1,n+1}^m \times A\hat{s}_{1,n+1}^m + N\hat{a}_{1,n+1}^m \times A\hat{a}_{1,n+1}^m\} \cdot N\hat{x}_{1,i+1}^m/2 =$$

$$\sum_{m=1}^{M}(^{n+1}\delta x^m Nn_{xi+1,n+1}^m + ^{n+1}\delta y^m Ns_{xi+1,n+1}^m +$$

$$^{n+1}\delta z^m Na_{xi+1,n+1}^m)$$

where $$^{n+1}\delta\hat{x}^m = \{A\hat{s}_{1,n+1}^m \cdot N\hat{a}_{1,n+1}^m - A\hat{a}_{1,n+1}^m \cdot N\hat{s}_{1,n+1}^m\}/2$$

$$^{n+1}\delta y^m = \{A\hat{a}_{1,n+1}^m \cdot N\hat{n}_{1,n+1}^m - A\hat{n}_{1,n+1}^m \cdot N\hat{a}_{1,n+1}^m\}/2$$

$$^{n+1}\delta z^m = \{A\hat{n}_{1,n+1}^m \cdot N\hat{s}_{1,n+1}^m - A\hat{s}_{1,n+1}^m \cdot N\hat{n}_{1,n+1}^m\}/2$$

Substitution of Eqs. (5.12), (5.17), and (5.21) into Eq. (6.4) with $\beta=P$ and using Eqs. (5.10a) through (5.10d) to simplify the results gives:

$$zdX_i = \sum_{j=1}^{n} RA_{ij}dz_j + \sum_{j=1}^{n} RB_{ij}dx_{j,j+1} + \sum_{j=1}^{n} pA_{ij}\delta z_j + \quad (6.7a)$$

$$\sum_{j=1}^{n} pB_{ij}\delta x_{j,j+1}$$

$$xdX_i = \sum_{j=1}^{n} RC_{ij}dz_j + \sum_{j=1}^{n} RD_{ij}dx_{j,j+1} + \sum_{j=1}^{n} pC_{ij}\delta z_j + \quad (6.7b)$$

-continued $$\sum_{j=1}^{n} {}_{P}D_{ij}\delta x_{j,j+1}$$

where ${}_{P}A_{ij} = \sum_{m=1}^{M} (\vec{Nr}_{n+1,j}^{m} \times \hat{Nz}_{j}^{m} \cdot \hat{Nz}_{i}^{m}) =$ $$\sum_{m=1}^{M} (Np_{xj,n+1}^{m} Na_{yj,i}^{m} - Np_{yj,n+1}^{m} Na_{xj,i}^{m})$$

${}_{P}B_{ij} = \sum_{m=1}^{M} (\vec{Nr}_{n+1,j+1}^{m} \times \hat{Nx}_{j,j+1}^{m} \cdot \hat{Nz}_{i}^{m}) =$ $$\sum_{m=1}^{M} (Np_{yj+1,n+1}^{m} Na_{zj+1,i}^{m} - Np_{zj+1,n+1}^{m} Na_{yj+1,i}^{m})$$

${}_{P}C_{ij} = \sum_{m=1}^{M} (\vec{Nr}_{n+1,j}^{m} \times \hat{Nz}_{j}^{m} \cdot \hat{Nx}_{i,i+1}^{m}) =$ $$\sum_{m=1}^{M} (Np_{xj,n+1}^{m} Nn_{yj,i+1}^{m} - Np_{yj,n+1}^{m} Nn_{xj,i+1}^{m})$$

${}_{P}D_{ij} = \sum_{m=1}^{M} (\vec{Nr}_{n+1,j}^{m} \times \hat{Nx}_{j,j+1}^{m} \cdot \hat{Nx}_{i,i+1}^{m}) =$ $$\sum_{m=1}^{M} (Np_{yj+1,n+1}^{m} Nn_{zj+1,i+1}^{m} - Np_{zj+1,n+1}^{m} Nn_{yj+1,i+1}^{m}) \text{ and}$$

$${}_{z}dX_{i} = \sum_{m=1}^{M} (\vec{P\epsilon}^{m} \cdot \hat{Nz}_{i}^{m}) = \sum_{m=1}^{M} ((\vec{Ap}_{1,n+1}^{m} - \vec{Np}_{1,n+1}^{m}) \cdot \hat{Na}_{1,i}^{m}) =$$

$$\sum_{m=1}^{M} ({}^{n+1}dx^{m} Nn_{zi,n+1}^{m} + {}^{n+1}dy^{m} Ns_{zi,n+1}^{m} + {}^{n+1}dz^{m} Na_{zi,n+1}^{m})$$

$${}_{x}dX_{i} = \sum_{m=1}^{M} (\vec{P\epsilon}^{m} \cdot \hat{Nx}_{i,i+1}^{m}) =$$

$$\sum_{m=1}^{M} ((\vec{Ap}_{1,n+1}^{m} - \vec{Np}_{1,n+1}^{m}) \cdot \hat{Nn}_{i,i+1}^{m}) =$$

$$\sum_{m=1}^{M} ({}^{n+1}dx^{m} Nn_{xi+1,n+1}^{m} + {}^{n+1}dy^{m} Ns_{xi+1,n+1}^{m} + {}^{n+1}dz^{m} Na_{xi+1,n+1}^{m})$$

where
$${}^{n+1}dx^{m} = \hat{Nn}_{1,n+1}^{m} \cdot (\vec{Ap}_{1,n+1}^{m} - \vec{Np}_{1,n+1}^{m})$$
$${}^{n+1}dy^{m} = \hat{Ns}_{1,n+1}^{m} \cdot (\vec{Ap}_{1,n+1}^{m} - \vec{Np}_{1,n+1}^{m})$$
$${}^{n+1}dz^{m} = \hat{Na}_{1,n+1}^{m} \cdot (\vec{Ap}_{1,n+1}^{m} - \vec{Np}_{1,n+1}^{m})$$

The resulting Eqs. (6.7a), (6.7b), (6.8a) and (6.8b) can be further reduced to yield, $$\delta X = R\delta q \quad (6.9a)$$
$$dX = P\delta q + Rdq \quad (6.9b)$$

The pose orientation error matrix, $\delta X$, and the pose position error matrix, $dX$, are defined by $$\delta X = \begin{Bmatrix} {}_{z}\delta X_{1} \\ \cdot \\ \cdot \\ {}_{z}\delta X_{n} \\ {}_{x}\delta X_{1} \\ \cdot \\ \cdot \\ {}_{x}\delta X_{n} \end{Bmatrix} \qquad dX = \begin{Bmatrix} {}_{z}dX_{1} \\ \cdot \\ \cdot \\ {}_{z}dX_{n} \\ {}_{x}dX_{1} \\ \cdot \\ \cdot \\ {}_{x}dX_{n} \end{Bmatrix}$$

The linkage parameter and joint variable orientation errors are represented by $\delta q$, the rotation solution vector. The linkage parameter and joint variable position errors are represented by $dq$, the position solution vector, where $$\delta q = \begin{Bmatrix} \delta z_{1} \\ \cdot \\ \cdot \\ \delta z_{n} \\ \delta x_{1,2} \\ \cdot \\ \cdot \\ \delta x_{n,n+1} \end{Bmatrix}, \quad dq = \begin{Bmatrix} dz_{1} \\ \cdot \\ \cdot \\ dz_{n} \\ dx_{1,2} \\ \cdot \\ \cdot \\ dx_{n,n+1} \end{Bmatrix}$$

The R matrix is of dimension $2n \times 2n$, where $$R = \begin{bmatrix} R^{A}{}_{11} & \ldots & R^{A}{}_{1n} & R^{B}{}_{11} & \ldots & R^{B}{}_{1n} \\ \cdot & R^{A}{}_{ij} & \cdot & \cdot & R^{Bm}{}_{ij} & \cdot \\ R^{AM}{}_{n1} & \ldots & R^{A}{}_{nn} & R^{B}{}_{n1} & \ldots & R^{BM}{}_{nn} \\ R^{C}{}_{11} & \ldots & R^{C}{}_{1n} & R^{D}{}_{11} & \ldots & R^{D}{}_{1n} \\ \cdot & R^{C}{}_{ij} & \cdot & \cdot & R^{D}{}_{ij} & \cdot \\ R^{C}{}_{n1} & \ldots & R^{C}{}_{nn} & R^{D}{}_{1n} & \ldots & R^{D}{}_{nn} \end{bmatrix}$$

The R matrix is symmetric because ${}_{R}A_{ij} = {}_{R}A_{ji}$, ${}_{R}B_{ij} = {}_{R}C_{ji}$, and ${}_{R}D_{ij} = {}_{R}D_{ji}$. The P matrix is also of dimension $2n \times 2n$, where $$P = \begin{bmatrix} P^{A}{}_{11} & \ldots & P^{A}{}_{1n} & P^{B}{}_{11} & \ldots & P^{B}{}_{1n} \\ \cdot & P^{A}{}_{ij} & \cdot & \cdot & P^{B}{}_{ij} & \cdot \\ P^{A}{}_{n1} & \ldots & P^{A}{}_{nn} & P^{B}{}_{n1} & \ldots & P^{B}{}_{nn} \\ P^{C}{}_{11} & \ldots & P^{C}{}_{1n} & P^{D}{}_{11} & \ldots & P^{D}{}_{1n} \\ \cdot & P^{C}{}_{ij} & \cdot & \cdot & P^{D}{}_{ij} & \cdot \\ P^{C}{}_{n1} & \ldots & P^{C}{}_{nn} & P^{D}{}_{1n} & \ldots & P^{D}{}_{nn} \end{bmatrix}$$

Equations (6.9a) and (6.9b) can be further condensed to yield $$DX = \left\{ \begin{array}{c} dX \\ \delta X \end{array} \right\} = \begin{bmatrix} R & P \\ O & R \end{bmatrix} \left\{ \begin{array}{c} dq \\ \delta q \end{array} \right\} = J\, Dq \quad (6.10)$$

Where J is the Least Square Jacobian.

SOLUTION

The solution of Eqs. (6.9a) and (6.9b) is rather simple, since both R and P are square matrices. When R is singular, either a modification of the solution technique derived in Reference No. 12 [Ibarra and Perreira, 1985] or a generalized inverse solution technique given in Reference No. 20 [Tucker and Perreira, 1985-1] should be used. In the case that R is not singular the following approach is adequate;

$$\delta q = R^{-1} \delta X \quad (6.11a)$$

$$dq = R^{-1}[dX - P\delta q] \quad (6.11b)$$

The inverse matrix can be found by a number of computational techniques; one of the most practical being the use of a maximum pivot strategy and applying the Gauss Jordan approach, either with an augmented matrix or in place.

REFERENCES

Each of the following materials, which may or may not be prior art, are expressly incorporated herein by reference:

1. Ben-Israel, A., and Greville, N. E., *Generalized Inverses: Theory and Applications*, Wiley, New York, N.Y., 1974.
2. Colson, J. C., "Performance Measures for Robotic Systems," *Masters Thesis*, University of Texas at Austin, December 1984.
3. Colson, J. C., and N. D. Perreira, "Kinematic Arrangements Used In Industrial Robots," 13*th International Conference Proceedings*, 20.1-20.18, Robotics International of SME (April 1983); also appearing in Lee, G. C. S., R. C. Gonzalez, and K. S. Fu, Ed., *Tutorial on Robotics*, Institute of Electronics and Electrical Engineering, 1983, 1985.
4. Colson, J. C., and N. D. Perreira, "The Need for Performance Measures for Robotic Systems and Some Qualitative Definitions," presented at and published in the conference proceedings of the *Workshop on Robot Standards*, cosponsored by NBS, ASTM, ANSI, IEEE and EIQ, Detroit, Mich., June 6-7, 1985.
5. Colson, J. C., and N. D. Perreira, "Statistics and Experimental Procedures for Determining Performance Parameters of Robotic Systems," presented at and published in the conference proceedings of the *Workshop on Robot Standards*, cosponsored by NBS, ASTM, ANSI, IEEE and EIQ, Detroit, Mich., June 6-7, 1985.
6. Colson, J., and N. D. Perreira, "Robot System Pose Performance: Definitions and Analysis," presented at and published in the conference proceedings of the *International Computers in Engineering Conference and Exhibition*, sponsored by ASME, Boston, Mass., Aug. 4-8, 1985.
7. Colson, J. C., and N. D. Perreira, "Pose Measurement Devices, Pose Error Determination and Robot Performance," presented at and published in the conference proceedings of *Sensors'* 85, sponsored by SME, Detroit, Mich., Nov. 4-7, 1985.
8. Denavit, J., and R. S. Hartenburg, "A Kinematic Notation for Lower-Pair Mechanisms Based On Matrices," *Journal of Applied Mechanics*, Vol. 22, Transactions of the American Society of Mechanical Engineers, Vol 77, 1955, pp. 215-221.
9. Duffy, J., *Analysis of Mechanisms and Robot Manipulators*, John Wiley & Sons: New York, N.Y., 1979.
10. Hayati, R., "Robot Arm Geometric Link Parameter Estimation," *Proceedings of the 22nd IEEE Conference on Decision and Control*, December 1983, pp. 1477-1483.
11. Hayati, S., and M. Mirmirani, "Puma 600 Robot Arm Geometric Calibration," *International Conference on Robotics*, Atlanta, Ga., Mar. 13-15, 1984 (supplemental pages).
12. Ibarra, R., and N. D. Perreira, "Determination of Linkage Parameter and Pair Variable Errors in Open Chain Kinematic Linkages Using a Minimal Set of Pose Measurement Data", presented at the 1985 *Design Automation Conference*, Cincinnati, Ohio, Sept. 10-13, 1985, and to be published in the ASME Transactions, *Journal of Mechanisms, Transmissions, and Automation in Design*.
13. Kreyszig, E., *Introductory Functional Analysis with Applications*, New York, Wiley, 1978.
14. Lau, K., L. Haynes and R. Hocken, "Robot End Point Sensing Using Laser Tracking System", presented at and published in the conference proceedings of the *Workshop on Robot Standards*, cosponsored by NBS, ASTM, ANSI, IEEE and EIQ, Detroit, Mich., June 6-7, 1985.
15. Nanayakkara, S. A., and N. D. Perreira, "A Least Square Technique to Determine Linkage Parameter and Pair Variable Errors in Open Kinematic Chains," presented at and to be published in the conference proceedings of the *SIAM Conference on Geometric Modeling and Robotics*, Albany, N.Y., July 15-18, 1985.
16. Paul, R., *Robot Manipulators: Mathematics, Programming and Control*, MIT Press, Cambridge Mass., 1981.
17. Phillips, N., J. R. Cowell, R. Bell, "The Measurement Capability of an Industrial Robot", 24th IMTDR Conference, 1985.
18. Suh, C. H., and C. W. Radcliffe, *Kinematics and Mechanism Design*, John Wiley and Sons, New York, N.Y., 1978.
19. Tucker, M. and N. D. Perreira, "Robot Calibration Device and Usage," *Working Paper*, Computer Integrated Manufacturing Systems Engineering Program, University of Nevada-Reno, December, 1984.
20. Tucker, M., and N. D. Perreira, "A Device to Measure the Pose of a Robot," *Working Paper*, Computer Integrated Manufacturing Systems Engineering Program, University of Nevada-Reno, March 1985.
21. Tucker, M., and N. D. Perreira, "Generalized Inverses for Robot Manipulators," presented at and to be published in the conference proceedings of the *SIAM Conference on Geometric Modeling and Robotics*, Albany, N.Y., July 15-18, 1985.
22. Tucker, M., and N. D. Perreira, "Motion Planning and Control for Improved Robot Performance," presented at the *International Industrial Control Conference*, Long Beach, Calif., Sept. 16-21, 1985.
23. Tucker, M., and N. D. Perreira, "A Pose Correction Algorithm," *Proceedings of the ASME 1985 Winter*

*Annula Meeting,* Miami Beach, Fla., Nov. 17-22, 1985, and submitted for publication in the ASME Transactions, *Journal of Dynamic Systems, Measurements, and Control.*

24. Whitney, D. E., et al, "Short-Term and Long Term Robot Feedback," Prepared for the *National Science Foundation* under Grant No. MEA-82-07167, April, 1985.

25. Wu, C., "A Kinematic CAD Tool for the Design and Control of a Robot Manipulator," *The International Journal of Robotics Research,* Vol. 3, No. 1, Spring 1984, pp. 58-67.

The following represents one illustrative program embodying the teachings of the invention:

```
program slcalp

FILE  SLCALP.FOR
This program does the Least Squares solution for a manipulator with World - Base
and Hand - Cube Transformations.  Checks for parallelness between two specified
axes and does the Modified Inverse or the Regular Inverse accordingly.  Linked
with files SLCAL1.FOR,  SLCAL2.FOR,  and  SLCAL3.FOR common/prnt/iprint
      common/pn/npose,iter,itern
      common/s2/sum2(20),sum4(20)
      common/qma/qmeas(10), qact(10)
      common/qmat/qms(10,7), qct(10,7)
      common/tn/jtype(10), numlink, numpose
      common/parax/jpar, jparpl
      common/paral/crosprd, jlpar, jlparpl
      open (4,file='puma.dat',status='old')
      open (5,file='con')
      open (6,file='con')
      open (7,file='puma.out',status='new')
      iter = 1
      theta = 0.5589425e-03
      eps = 40.0 * theta
      call specs
      call nomknpr
      call error
      call actknpr
      call qactmes
      do 20 i =1, 2*(numlink+2)-1
      sum2(i) = 0.0
      sum4(i) = 0.0
20    continue
      jlpar = jpar
      jlparpl = jparpl
6     crosprd = 0.0
      call initial
      do 10 npose = 1, numpose
      do 11 jj = 2, numlink+1
      qmeas(jj) = qms(jj,npose)
      qact(jj) = qct(jj,npose)
11    continue
      if (iprint .eq. 1) write (6,100) npose
      if (iprint .eq. 1) write (7,100) npose
100   format(1h1, 18x, 'P O S E   N U M B E R ', i1,/)
      call tmesnom
      if (iprint .eq. 1) write(6,100) npose
      if (iprint .eq. 1) write(7,100) npose
      call tact
      call delvec
      call fsub1
      call fsub3
```

```
10   continue
     if (iprint .eq. 0) write(6,250) iter
     if (iprint .eq. 0) write(7,250) iter
250  format(//,22x,'POSE  ERROR  BEFORE  ITERATION  ',i2)
     if (iprint .eq. 0) call pserror
     crosprd = crosprd / float(numpose)
     if (crosprd .ge. eps) then
        jpar = -1
     else
        jpar = jlpar
     endif
     write(6,200) iter, crosprd, jpar
     write(7,200) iter, crosprd, jpar
200  format(/,2x,'Iteration # : ',i2,8x,'(z2 x z3) = ',e14.7,8x,
    *  'jpar = ',i2)
     call vecsoln
     call algoerr
     if (iter .eq. itern) go to 1
     iter = iter + 1
     go to 6
1    write(6,260) itern
     write(7,260) itern
260  format(//,22x,'POSE  ERROR  AFTER  ITERATION  ',i2)
     call pserror
     close(4)
     close(7)
     stop
     end subroutine specs common/prnt/iprint
     common/pn/npose,iter,itern
     common/parax/jpar,jparpl
     character*20 a
89   write(6,90)
     write(7,90)
90   format(' do you want print outs of everything 1=yes, 0=no ? ')
     read (5,91) iprint
91   format(i1)
     if ((iprint .ne. 1) .and. (iprint .ne. 0)) go to 89
     write (6,92)
     write (7,92)
92   format(' how many iterations do you want?  enter 000-999 .. ')
     read (5,93) itern
93   format(i3)
     write (6,100)
     write (7,100)
100  format(/, ' specify name of robot ... ')
     read (5,110) a
110  format(a20)
     write (6,200) a
     write (7,200) a
200  format(//, ' robot name : ', a20)
     write (6,300)
```

```
      write (7,300)
300 format(/, ' specify parallel axes numbers ... ')
    read (5,*) jpar, jpar1
    write(6,400) jpar, jpar1
    write(7,400) jpar, jpar1
400 format(/, 30x, 'z - ', i2,5x, 'z - ', i2)
    if (jpar .eq. -1) return
    jpar = jpar + 1
    jpar1 = jpar1 + 1
    return
    end subroutine error common/prnt/iprint
    common/change/dd(10), dthi(10), da(10), dalpha(10)
    common/tn/jtype(10), numlink, numpose
    write (6,100)
    write (7,100)
100 format(1h1,//, 1x, 'A C T U A L   E R R O R S   I N   P A R A M E',
   * 'T E R S   A N D   V A R I A B L E S',/, 25x,
   * '(Lengths in mm.  Angeles in degrees)',/)
    write (6,200)
    write (7,200)
200 format(17x, 'link 1-2', 3x, 'link 2-3', 3x, 'link 3-4', 3x,
   * 'link 4-5', 3x, 'link 5-6', 3x, 'link 6-7',/)
    do 30 i = 1, numlink+1
    read (4,*) dd(i), dthi(i), da(i), dalpha(i)
 30 continue
    read (4,*) dd(numlink+2), dthi(numlink+2)
    da(numlink+2) = 0.0
    dalpha(numlink+2) = 0.0
    write (6,300) (dthi(i), i=2,numlink+1)
    write (7,300) (dthi(i), i=2,numlink+1)
300 format(5x, 'd theta', 1x, 6(1x, f10.4))
    write(6,400) (dd(i), i=2,numlink+1)
    write(7,400) (dd(i), i=2,numlink+1)
400 format(5x, 'd d    ',1x, 6(1x, f10.4))
    write (6,500) (dalpha(i), i=2,numlink+1)
    write (7,500) (dalpha(i), i=2,numlink+1)
500 format(5x, 'd alpha' 1x, 6(1x, f10.4))
    write (6,600) (da(i), i=2,numlink+1)
    write (7,600) (da(i), i=2,numlink+1)
600 format(5x, 'd a    ', 1x, 6(1x, f10.4))
    write (6,10)
    write (7,10)
 10 format(/,16x,'World-Base   Hand-Cube',/)
    write (6,350) dthi(1), dthi(numlink+2)
    write (7,350) dthi(1), dthi(numlink+2)
350 format(5x,'d theta', 1x, 2(1x, f10.4))
    write (6,450) dd(1), dd(numlink+2)
    write (7,450) dd(1), dd(numlink+2)
450 format(5x,'d d    ', 1x, 2(1x, f10.4))
    write (6,550) dalpha(1), dalpha(numlink+2)
    write (7,550) dalpha(1), dalpha(numlink+2)
550 format(5x,'d alpha', 1x, 2(1x, f10.4))
```

```
        write (6,650) da(1), da(numlink+2)
        write (7,650) da(1), da(numlink+2)
650  format(5x,'d a    ', 1x, 2(1x, f10.4))
     return
     end subroutine nomknpr common/prnt/iprint
     common/pn/npose,iter,itern
     common/nom/thi(10), di(10), aiipl(10), alpiipl(10)
     common/tn/jtype(10), numlink, numpose
     write (6,100)
     write (7,100)
100  format(1h1, //, 5x, 'N O M I N A L   K I N E M A T I C  ',
    * 'P A R A M E T E R S',/,16x,'(lengths in mm.,',
    * ' angles in degrees)',//
    * 8x, 'Joint',
    * 3x, ' Link', 4x, 'theta or d', 4x, ' alpha   ', 4x,
    * '    a    ')
c    input number of links
     read (4,*) numlink
c    input number of pose measurements
     read (4,*) numpose read (4,*) di(1), thi(1), aiipl(1), alpiipl(1)
     do 40 j = 2, numlink+1
c        input joint type
     read(4,*) jtype(j)
     if (jtype(j) .eq. 0) then
c        input di(j), aiipl(j), alpiipl(j)
         read (4,*) di(j), aiipl(j), alpiipl(j)
         write (6,610) j-1, j, di(j), alpiipl(j), aiipl(j)
         write (7,610) j-1, j, di(j), alpiipl(j), aiipl(j)
610      format(/,7x, 'Revolute', 2x, i1,'-',i1,3x, f10.4,
    *    3x, f10.4, 3x, f10.4)
     else
c        input thi(j), aiipl(j), alpiipl(j)
         read (4,*) thi(j), aiipl(j), alpiipl(j)
         write (6,620) j-1, j, thi(j), alpiipl(j), aiipl(j)
         write (7,620) j-1, j, thi(j), alpiipl(j), aiipl(j)
620      format(/,7x, 'Prismatic', 1x, i1, '-', i1, 3x, f10.4,
    *    3x, f10.4, 3x, f10.4)
     endif
40   continue
     read (4,*) di(numlink+2), thi(numlink+2)
     aiipl(numlink+2) = 0.0
     alpiipl(numlink+2) = 0.0
     write (6,615)
     write (7,615)
615  format(//,25x,'d            theta        alpha            a',/)
     write(6,617) di(1), thi(1), alpiipl(1), aiipl(1)
     write(7,617) di(1), thi(1), alpiipl(1), aiipl(1)
617  format(3x,'World - Base ',4(3x, f10.4), /)
     write(6,618) di(numlink+2), thi(numlink+2), aiipl(numlink+2),
    *             alpiipl(numlink+2)
```

```fortran
            write(7,618) di(numlink+2), thi(numlink+2), aiipl(numlink+2),
     *            alpiipl(numlink+2)
618     format(3x,'Hand - Cube ',4(3x, f10.4))
        return
        end subroutine actknpr common/prnt/iprint
        common/pn/npose, iter, itern
        common/act/ athi(10), adi(10), aaiipl(10), aalpipl(10)
        common/nom/ thi(10), di(10), aiipl(10), alpiipl(10)
        common/tn/ jtype(10), numlink, numpose
        common/change/ dd(10), dthi(10), da(10), dalpha(10)
        write (6,100)
        write (7,100)
100     format(1h1,//, 6x, 'A C T U A L   K I N E M A T I C ',
     *  'P A R A M E T E R S',/,16x, '(lengths in mm.,',
     *  ' angeles in degrees)',//, 8x, 'Joint',
     *  3x, ' Link', 4x, 'theta or d', 4x, ' alpha    ', 4x,
     *  '    a      ')
        do 40 j = 2, numlink+1
        if (jtype(j) .eq. 0) then
             adi(j) = di(j) + dd(j)
             aaiipl(j) = aiipl(j) + da(j)
             aalpipl(j) = alpiipl(j) + dalpha(j)
             write(6,610) j, j+1, adi(j), aalpipl(j), aaiipl(j)
             write(7,610) j, j+1, adi(j), aalpipl(j), aaiipl(j)
610          format(/, 7x, 'Revolute', 2x, i1, '-', i1, 3x, f10.4,
     *       3x, f10.4, 3x, f10.4)
        else
2            athi(j) = thi(j) + dthi(j)
             aaiipl(j) = aiipl(j) + da(j)
             aalpipl(j) = alpiipl(j) + dalpha(j)
             write(6,620) j, j+1, athi(j), aalpipl(j), aaiipl(j)
             write(7,620) j, j+1, athi(j), aalpipl(j), aaiipl(j)
620          format(/, 7x, 'Prismatic', 1x, i1, '-', i1, 3x, f10.4,
     *       3x, f10.4, 3x, f10.4)
        endif
40      continue
        do 50 j = 1, numlink+2, numlink+1
             adi(j) = di(j) + dd(j)
             athi(j) = thi(j) + dthi(j)
             aaiipl(j) = aiipl(j) + da(j)
             aalpipl(j) = alpiipl(j) + dalpha(j)
50      continue
        write (6,615)
        write (7,615)
615     format(//,25x,'d         theta        alpha           a',/)
        write(6,617) adi(1), athi(1), aalpipl(1), aaiipl(1)
        write(7,617) adi(1), athi(1), aalpipl(1), aaiipl(1)
617     format(3x,'World - Base ',4(3x, f10.4), /)
        write(6,618) adi(numlink+2), athi(numlink+2), aalpipl(numlink+2),
     *            aaiipl(numlink+2)
        write(7,618) adi(numlink+2), athi(numlink+2), aalpipl(numlink+2),
     *            aaiipl(numlink+2)
```

```fortran
618   format(3x,'Hand - Cube  ',4(3x, f10.4))
      return
      end subroutine qactmes common/prnt/iprint
      common/qmat/qms(10,7), qct(10,7)
      common/tn/jtype(10), numlink, numpose
      common/change/dd(10), dthi(10), da(10), dalpha(10)
      do 10 i = 1, numpose
          read (4, *) (qms(j,i), j = 2, numlink+1)
      do 20 j = 2, numlink+1
          if (jtype(j) .eq. 0) qct(j,i) = qms(j,i) + dthi(j)
          if (jtype(j) .eq. 1) qct(j,i) = qms(j,i) + dd(j)
20    continue
10    continue
      write (6,399)
      write (7,399)
399   format(1h1, //, 16x, 'N O M I N A L  P A I R  V A R I A B L E S',
     * /, 20x, ' (Lengths in mm., angeles in degrees)')
      write(6,650)
      write(7,650)
650   format(//, 6x, 'Theta or d', 3x, 'Pose1', 6x, 'Pose2', 6x,
     * 'Pose3', 6x, 'Pose4', 6x, 'Pose5')
      do 60 j = 2, numlink+1
          write (6,660) j-1, (qms(j,i), i=1,numpose)
          write (7,660) j-1, (qms(j,i), i=1,numpose)
660       format(/, 11x, i1, 2x, 5(f10.4, 1x))
60    continue
      write(6,499)
      write(7,499)
499   format(1h1, //, 17x, 'A C T U A L  P A I R  V A R I A B L E S',
     * /, 20x, '(Lengths in mm., angeles in degrees)')
      write(6,750)
      write(7,750)
750   format(//, 6x, 'Theta or d', 3x, 'Pose1', 6x, 'Pose2', 6x,
     * 'Pose3', 6x, 'Pose4', 6x, 'Pose5')
      do 160 j = 2, numlink+1
          write (6,760) j-1, (qct(j,i), i=1,numpose)
          write (7,760) j-1, (qct(j,i), i=1,numpose)
760       format(/, 11x, i1, 2x, 5(f10.4, 1x))
160   continue
      return
      end subroutine tmesnom common/prnt/iprint
      dimension tf(3,4),atiipl(10,3,4),tiipl(3,4),tp(3,4),tipli(3,4)
      common/t/tnplimn(10,3,4), tnpliac(10,3,4), tnom(9,9,3,4)
      common/nom/thi(10), di(10), aiipl(10), alpiipl(10)
      common/tn/jtype(10), numlink, numpose
      common/qma/qmeas(10), qact(10)
```

```fortran
      if (iprint .eq. 1) write (6,100)
      if (iprint .eq. 1) write (7,100)
100   format(13x, 'Homogeneous Transformation Matrices',/, 4x,
     * 'Based on Nominal Parameters and Measured Pair Variables')
      do 8 i = 1, numlink+3
      do 11 k = 1, 3
      do 11 l = 1, 4
      tnom(i, i, k, l) = 0.0
11    continue
      do 12 l = 1, 3
      tnom(i, i, l, l) = 1.0
12    continue
8     continue
      do 20 i = 2, numlink+1
      if (jtype(i) .eq. 0) then
          thi(i) = qmeas(i)
      else
          di(i) = qmeas(i)
      endif
20    continue
      do 22 i = 1, numlink+2
      call ctiipl(thi(i), di(i), aiipl(i), alpiipl(i), tiipl)
      do 30 k = 1, 3
      do 30 l = 1, 4
      tnom(i, i+1, k, l) = tiipl(k, l)
30    continue
22    continue
      do 50 i = 1, numlink+1
      do 60 j = i+2, numlink+3
      call mprod(i, j-1, j-1, j)
60    continue
50    continue
      do 90 i = 1, numlink+3
      if (iprint .eq. 1) write (6,400) i
      if (iprint .eq. 1) write (7,400) i
400   format(/, 27x, 'T 1-', i1,/)
      if (iprint .eq. 1) write (6,300) ((tnom(1,i,k,l),l=1,4),k=1,3)
      if (iprint .eq. 1) write (7,300) ((tnom(1,i,k,l),l=1,4),k=1,3)
      if ((i .eq. 1) .or. (i .eq. numlink+3)) go to 90
      if ((i .eq. 5) .and. (iprint .eq. 1)) write (6,401)
      if ((i .eq. 5) .and. (iprint .eq. 1)) write (7,401)
401   format(1h1)
      if (iprint .eq. 1) write (6,200) i, i+1
      if (iprint .eq. 1) write (7,200) i, i+1
200   format(/, 27x, 'T ', i1, '-', i1,/)
      if(iprint .eq. 1) write(6,300) ((tnom(i,i+1,k,l),l=1,4), k=1,3)
      if(iprint .eq. 1) write(7,300) ((tnom(i,i+1,k,l),l=1,4), k=1,3)
300   format(3(1x, 4(f10.4,5x)/))
90    continue
      call paralel
      do 95 i = 1, 3
      do 95 j = 1, 4
      tiipl(i,j) = tnom(1, numlink+3, i, j)
95    continue
      call invmtrx(tiipl, tipli)
      do 96 i = 1, 3
      do 96 j = 1, 4
```

```
      tnplimn(1,i,j) = tipli(i,j)
96    continue
      call angle(tnplimn)
      return
      end subroutine tact common/prnt/iprint
      dimension tf(3,4), atiipl(10,3,4),tiipl(3,4),tp(3,4),tipli(3,4)
      common/t/tnplimn(10,3,4), tnpliac(10,3,4), tnom(9,9,3,4)
      common/act/athi(10), adi(10), aaiipl(10), aalpipl(10)
      common/tn/jtype(10), numlink, numpose
      common/qma/qmeas(10), qact(10)
      if (iprint .eq. 1) write (6,100)
      if (iprint .eq. 1) write (7,100)
100   format(13x, 'Homogeneous Transformation Matrices',/,8x,
     * 'Based on Actual Parameters and Pair Variables')
      do 11 k = 1, 3
      do 12 l = 1, 4
      tnpliac(numlink+3, k, l) = 0.0
      atiipl(numlink+3, k, l) = 0.0
12    continue
11    continue
      do 13 l = 1, 3
      tnpliac(numlink+3, l, l) = 1.0
      atiipl(numlink+3, l, l) = 1.0
13    continue
      do 10 i = 2, numlink+1
      if (jtype(i) .eq. 0) then
          athi(i) = qact(i)
      else
          adi(i) = qact(i)
      endif
10    continue
      do 40 n = 1, numlink+2
      i = numlink + 3 - n
      call ctiipl(athi(i), adi(i), aaiipl(i), aalpipl(i), tiipl)
      call invmtrx(tiipl, tipli)
      do 50 k = 1, 3
      do 60 l = 1, 4
      tf(k,l) = tnpliac(i+1, k, l)
      atiipl(i,k,l) = tiipl(k,l)
60    continue
50    continue
      call tmult(tf, tipli, tp)
      do 70 k = 1, 3
      do 80 l = 1, 4
      tnpliac(i,k,l) = tp(k,l)
80    continue
70    continue
40    continue
      do 90 n = 1, numlink+3
      i = numlink + 4 - n
      if (iprint .eq. 1) write(6,400) i
      if (iprint .eq. 1) write(7,400) i
```

```
400   format(/, 27x, 'T 9-', il,/)
      if(iprint .eq. 1) write(6,300) ((tnpliac(i,k,1), 1=1,4), k=1,3)
      if(iprint .eq. 1) write(7,300) ((tnpliac(i,k,1), 1=1,4), k=1,3)
      if (i .eq. 1) go to 90
      if ((i .eq. 5) .and. (iprint .eq. 1)) write(6,401)
      if ((i .eq. 5) .and. (iprint .eq. 1)) write(7,401)
401   format(1h1)
      if (iprint .eq. 1) write(6,200) i-1, i
      if (iprint .eq. 1) write(7,200) i-1, i
200   format(/, 27x, 'T ', il, '-', il,/)
      if(iprint .eq. 1) write(6,300) ((atiipl(i-1,k,1), 1=1,4), k=1,3)
      if(iprint .eq. 1) write(7,300) ((atiipl(i-1,k,1), 1=1,4), k=1,3)
300   format(3(1x, 4(f10.4, 5x)/))
90    continue
      call angle(tnpliac)
      return
      end subroutine paralel common/pn/npose, iter, itern
      common/t/tnplimn(10,3,4), tnpliac(10,3,4), tnom(9,9,3,4)
      common/tn/jtype(10), numlink, numpose
      common/paral/crosprd, jlpar, jlparpl
      dimension a(3), b(3), c(3)
      if (jlpar .eq. -1) return
      do 10 i = 1, 3
      a(i) = tnom(jlpar, numlink+3, 3, i)
      b(i) = tnom(jlparpl, numlink+3, 3, i)
10    continue
      call cross(a, b, c)
      crs = sqrt(c(1) ** 2 + c(2) ** 2 + c(3) ** 2)
      crosprd = crosprd + crs
      return
      end FILE  SLCAL1.FOR
This file is linked with file SLCALP.FOR. Used to do the Least Squares solution
for a manipulator with World - Base and Hand - Cube Transformations.

subroutine vecsoln common/prnt/iprint
      common/tn/jtype(10), numlink, numpose
      common/parax/jpar, jparpl
      common/fin/poserr(21), pab(20,20), dx(20), dy, pabl(20)
      common/change/dd(10), dthi(10), da(10), dalpha(10)
      common/fnl/roterr(21), oab(20,20), delx(20)
      common/sv/prod1(21), prod3(21)
      dimension oabinv(20,20), prod2(21), diff(21), check1(20,20),
     *          check2(20,20), prod8(20,20), prod4(21), parrtds(2,2),
     *          parout(2)

c     Rotation parameter and variable errors computation
```

```fortran
      if (iprint .eq. 1) call fsub2(0)
      do 10 i = 1, 2 * (numlink+2) - 1
      do 20 j = 1, 2 * (numlink+2) - 1
      oabinv(i,j) = oab(i,j)
   20 continue
   10 continue
      call inverse(2 * (numlink+2) - 1, oabinv)
      call matmult(oabinv, oab, 2*(numlink+2)-1, 2*(numlink+2)-1,
     *                         2*(numlink+2)-1, check1)
      if (iprint .eq. 1) write(6,400)
      if (iprint .eq. 1) write(7,400)
  400 format(1h1, 16x, ' oabinv   x   oab  = identity matrix ?')
      if (iprint .eq. 1) call prntsub(check1)
      call matmult(oabinv, delx, 2*(numlink+2)-1, 2*(numlink+2)-1, 1,
     *             prod1)
      if (jpar .eq. -1) go to 3 c     get part of simultaneous equations for parallel axis solution parrtds(1,1) = 1.0
      parrtds(1,2) = 1.0
      parout(1) = prod1(jpar)

3 write(6,500)
      write(7,500)
  500 format(1h1,/,1x,'R O T A T I O N   S O L U T I O N   V E C T O R',
     * /,1x, '(Predicted difference of actual-nominal values) ')
      cradtdeg = 180.0 / acos(-1.0)
      write(6,515)
      write(7,515)
  515 format(18x, '(in degrees)',/)

if (jpar .eq. -1) go to 1
      write(6,525) jpar, jpar, jpar1, jpar1
      write(7,525) jpar, jpar, jpar1, jpar1
  525 format(1x, 'Angle dz-',i2,' is actually angle  dz-',
     * i1, ' + angle dz-', i1,/, 8x, 'Angle dz-', i1,
     * ' is not determined here',/)

1 do 50 j = 1, numlink+2
      prod4(j) = prod1(j) * cradtdeg
      write(6,550) j-1, prod4(j)
      write(7,550) j-1, prod4(j)
  550 format(16x, 'dz', i1, 1x, f10.4)
   50 continue
      write(6,551)
      write(7,551)
  551 format(/)
      do 60 j = numlink + 3, 2 * (numlink+2) - 1
      prod4(j) = prod1(j) * cradtdeg
      write(6,600) j - numlink - 3, prod4(j)
      write(7,600) j - numlink - 3, prod4(j)
  600 format(16x, 'dx', i1, 1x, f10.4)
   60 continue if (jpar .eq. -1) go to 310
```

```
      call replace
      if (iprint .eq. 1) call pntdx
      if (iprint .eq. 1) write(6,320)
      if (iprint .eq. 1) write(7,320)
320   format(1h1,/,9x,'N E W  R O T A T I O N  12 X 12  M A T R I X',/)
      if (iprint .eq. 1) call prntsub(oab)
      do 311 i = 1, 2 * (numlink+2) - 1
      do 312 j = 1, 2 * (numlink+2) - 1
      oabinv(i,j) = oab(i,j)
312   continue
311   continue
      call inverse(2 * (numlink+2) - 1, oabinv)
      call matmult(oabinv, oab, 2*(numlink+2)-1, 2*(numlink+2)-1,
     *                          2*(numlink+2)-1, check1)
      if (iprint .eq. 1) write(6,330)
      if (iprint .eq. 1) write(7,330)
330   format(1h1,/,12x,'new oabinv  x   new oab  = identity matrix ?',/)
      if (iprint .eq. 1) call prntsub(check1)
310   continue c     Position parameters and variables error computation if (iprint .eq. 1) call fsub4(0)
4     if (iprint .eq. 1) write(6,445)
      if (iprint .eq. 1) write(7,445)
445   format(1h1,/, 16x, ' INV* TIMES POSITION 12 X 12 MATRIX',/)
      call matmult(oabinv, pab, 2*(numlink+2)-1, 2*(numlink+2)-1,
     *                          2*(numlink+2)-1, prod8)
      if (iprint .eq. 1) call prntsub(prod8)

c     parallel axis solution for rotational z pair values if (jpar .eq. -1) go to 13
      parrtds(2,1) = prod8(jparp1, jpar)
      parrtds(2,2) = prod8(jparp1, jparp1)
      parout(2) = 0.0
      do 6 i = 1, 2 * (numlink+2) - 1
      if ((i .eq. jpar) .or. (i .eq. jparp1)) go to 7
      parout(2) = parout(2) - prod8(jparp1, i) * prod1(i)
7     parout(2) = parout(2) + oabinv(jparp1, i) * dx(i)
6     continue
      den = parrtds(1,1) * parrtds(2,2) - parrtds(1,2) * parrtds(2,1)
      if (abs(den) .gt. 0.01) go to 111
      write(6,222) den
      write(7,222) den
222   format(1x,'den = ',f10.4,' We have a problem in pose selection')
111   prod1(jpar) = (parout(1)*parrtds(2,2) - parout(2)*parrtds(1,2))
     * / den
      prod1(jparp1)= (parout(2)*parrtds(1,1) - parout(1)*parrtds(2,1))
     * / den
      parout(1) = parout(1) * cradtdeg
      parout(2) = parout(2) * cradtdeg
      prod4(jpar) = prod1(jpar) * cradtdeg
      prod4(jparp1) = prod1(jparp1) * cradtdeg
      write(6,650) jpar, prod4(jpar), jparp1, prod4(jparp1)
      write(7,650) jpar, prod4(jpar), jparp1, prod4(jparp1)
```

```
650 format(1h1,/,7x, 'S O L U T I O N    F O R',
    * '     P A R A L L E L    A X I S',
    * /, 2(/, 20x, 'Angle dz-', i2, ' = ', f10.4))
      if (iprint .eq. 1) write(6,670)
    *        parout(1), parrtds(1,1), jpar, parrtds(1,2), jparpl,
    *        parout(2), parrtds(2,1), jpar, parrtds(2,2), jparpl
      if (iprint .eq. 1) write(7,670)
    *        parout(1), parrtds(1,1), jpar, parrtds(1,2), jparpl,
    *        parout(2), parrtds(2,1), jpar, parrtds(2,2), jparpl
670 format(///,5x,'The equations solved were',//,2x,f10.4,' = ',
    * f10.4,' Angle dz-', i1, ' + ',f10.4,' angle dz-',i1,//,2x,
    *                                         f10.4, ' = ',
    * f10.4, 'Angle dz-', i1,' + ', f10.4, ' angle dz-', i1)

13   continue
     if (iprint .eq. 1) write(6,700)
     if (iprint .eq. 1) write(7,700)
700 format(1h1,//,1x, ' Pab x Rotation solution vector',///)
     call matmult(pab, prod1, 2*(numlink+2)-1, 2*(numlink+2)-1, 1,
    *             prod2)
     if (iprint .eq. 1) write(6,601) (prod2(j), j= 1, 2*(numlink+2)-1)
     if (iprint .eq. 1) write(7,601) (prod2(j), j= 1, 2*(numlink+2)-1)

if (iprint .eq. 1) write(6,800)
     if (iprint .eq. 1) write(7,800)
800 format(1h1,/,1x, 'Position error vector - Pab x Rotation',
    * ' solution vector',///)
     call matsubt(dx, prod2, 2 * (numlink+2) - 1, 1, diff)
     if (iprint .eq. 1) write(6,601) (diff(j), j = 1, 2*(numlink+2)-1)
     if (iprint .eq. 1) write(7,601) (diff(j), j = 1, 2*(numlink+2)-1)
601 format(4x, e13.4)
     write(6,910)
     write(7,910)
910 format(1h1,/,1x,'P O S I T I O N    S O L U T I O N    V E C T O R',
    * /,1x,'(Predicted Difference in Actual - Nominal Values)')
     call matmult(oabinv, diff, 2*(numlink+2)-1, 2*(numlink+2)-1, 1,
    *             prod3)
     write(6,915)
     write(7,915)
915 format(20x,'(in mm.)',//)
     if (jpar .eq. -1) go to 9
     write(6,925) jpar, jpar, jparpl, jparpl
     write(7,925) jpar, jpar, jparpl, jparpl
925 format(9x, 'Displacement dz-', i1, ' is actualy',
    * /, 5x, 'displacement dz-', i1, ' + displacement dz-', i1,
    * /, 4x, 'displacement dz-', i1, ' is not determined here',/)
9    do 91 j = 1, numlink+2
     write(6,920) j-1, prod3(j)
     write(7,920) j-1, prod3(j)
920 format(17x, 'dz', i1, 1x, f10.4)
91   continue
     write(6,551)
     write(7,551)
     do 92 j = numlink+3, 2*(numlink+2)-1
     write(6,940) j - numlink - 3, prod3(j)
     write(7,940) j - numlink - 3, prod3(j)
940 format(17x, 'dx', i1, 1x, f10.4)
```

```fortran
92      continue
        return
        end subroutine algoerr common/qmat/qms(10,7), qct(10,7)
        common/nom/thi(10), di(10), aiipl(10), alpiipl(10)
        common/prnt/iprint
        common/pn/npose, iter, itern
        common/sv/prodl(21), prod3(21)
        common/s2/sum2(20), sum4(20)
        common/change/dd(10), dthi(10), da(10), dalpha(10)
        common/tn/jtype(10), numlink, numpose
        dimension u(21), v(21)
        cradtdeg = 180.0 / acos(-1.0)
        do 3 i = 1, 2 * (numlink+2) - 1
        prodl(i) = prodl(i) * cradtdeg
        sum2(i) = sum2(i) + prodl(i)
        sum4(i) = sum4(i) + prod3(i)
3       continue
        write(6,101) iter
        write(7,101) iter
101     format(1h1,/, 16x, 'T O T A L',
     *  '    P R E D I C T E D    E R R O R S',/, 21x,
     *  '(Nominal Values - Actual Values)',//,
     *  27x, 'I T E R A T I O N ', i3,/)
        write(6,201)
        write(7,201)
201     format(12x, 'link 1-2', 3x, 'link 2-3', 3x, 'link 3-4', 3x,
     *  'link 4-5', 3x, 'link 5-6', 3x, 'link 6-7',/)
        write(6,301) (sum2(i), i = 2, numlink+1)
        write(7,301) (sum2(i), i = 2, numlink+1)
301     format(1x, 'd theta', 1x, 6(1x, f10.4))
        write(6,401) (sum4(i), i = 2, numlink+1)
        write(7,401) (sum4(i), i = 2, numlink+1)
401     format(1x, 'd d    ', 1x, 6(1x, f10.4))
        write(6,501) (sum2(i), i = numlink+4, 2*(numlink+2)-1)
        write(7,501) (sum2(i), i = numlink+4, 2*(numlink+2)-1)
501     format(1x, 'd alpha', 1x, 6(1x, f10.4))
        write(6,601) (sum4(i), i = numlink+4, 2*(numlink+2)-1)
        write(7,601) (sum4(i), i = numlink+4, 2*(numlink+2)-1)
601     format(1x, 'd a    ', 1x, 6(1x, f10.4))
        write (6,10)
        write (7,10)
10      format(/, 11x, 'World-Base    Hand-Cube',/)
        write(6,350) sum2(1), sum2(numlink+2)
        write(7,350) sum2(1), sum2(numlink+2)
350     format(1x, 'd theta', 2(2x, f10.4))
        write(6,450) sum4(1), sum4(numlink+2)
        write(7,450) sum4(1), sum4(numlink+2)
450     format(1x, 'd d    ', 2(2x, f10.4))
        write(6,550) sum2(numlink+3)
        write(7,550) sum2(numlink+3)
550     format(1x, 'd alpha', 2x, f10.4)
        write(6,650) sum4(numlink+3)
```

```
      write(7,650) sum4(numlink+3)
  650 format(1x, 'd a     ', 2x, f10.4)
      write(6,100) iter
      write(7,100) iter
  100 format(1h1,/, 8x, 'A D J U S T M E N T S   I N ',
     * '  P R E D I C T E D   E R R O R S',/,
     * 22x, '(Nominal Values - Actual Values)',//,
     * 29x, 'I T E R A T I O N ', i3,/)
      write(6,200)
      write(7,200)
  200 format(13x, 'link 1-2', 3x, 'link 2-3', 3x, 'link 3-4', 3x,
     * 'link 4-5', 3x, 'link 5-6', 3x, 'link 6-7',/)
      write(6,300) (prod1(i), i = 2, numlink+1)
      write(7,300) (prod1(i), i = 2, numlink+1)
  300 format(2x, 'd theta', 1x, 6(1x, f10.4))
      write(6,400) (prod3(i), i = 2, numlink+1)
      write(7,400) (prod3(i), i = 2, numlink+1)
  400 format(2x, 'd d    ', 1x, 6(1x, f10.4))
      write(6,500) (prod1(i), i = numlink+4, 2*(numlink+2)-1)
      write(7,500) (prod1(i), i = numlink+4, 2*(numlink+2)-1)
  500 format(2x, 'd alpha', 1x, 6(1x, f10.4))
      write(6,600) (prod3(i), i = numlink+4, 2*(numlink+2)-1)
      write(7,600) (prod3(i), i = numlink+4, 2*(numlink+2)-1)
  600 format(2x, 'd a    ', 1x, 6(1x, f10.4))
      write(6,10)
      write(7,10)
      write(6,350) prod1(1), prod1(numlink+2)
      write(7,350) prod1(1), prod1(numlink+2)
      write(6,450) prod3(1), prod3(numlink+2)
      write(7,450) prod3(1), prod3(numlink+2)
      write(6,550) prod1(numlink+3)
      write(7,550) prod1(numlink+3)
      write(6,650) prod3(numlink+3)
      write(7,650) prod3(numlink+3)
      do 11 j = 1, numpose
      do 20 i = 2, numlink+1
      if (jtype(i) .eq. 0) then
          qms(i,j) = qms(i,j) + prod1(i)
      else
          qms(i,j) = qms(i,j) + prod3(i)
      endif
   20 continue
   11 continue
      do 30 j = 2, numlink+1
      if (jtype(j) .eq. 0) then
          di(j)     = di(j) + prod3(j)
          alpiipl(j) = alpiipl(j) + prod1(j+numlink+2)
          aiipl(j)  = aiipl(j) + prod3(j+numlink+2)
      else
          thi(j)    = thi(j) + prod1(j)
          alpiipl(j) = alpiipl(j) + prod1(j+numlink+2)
          aiipl(j)  = aiipl(j) + prod3(j+numlink+2)
      endif
   30 continue
      do 35 j = 1, numlink+2, numlink+1
          di(j) = di(j) + prod3(j)
```

```
          thi(j) = thi(j) + prod1(j)
          if (j .eq. numlink+2) go to 35
          alpiipl(j) = alpiipl(j) + prod1(j+numlink+2)
          aiipl(j) = aiipl(j) + prod3(j+numlink+2)
35     continue
       write(6,605) iter
       write(7,605) iter
605    format(1h1, 2x, 'P R E D I C T E D   K I N E M A T I C', 3x,
      * 'P A R A M E T E R S', /, 14x,
      * '(Nominal Parameters + Predicted Errors)',//,
      * 22x, 'I T E R A T I O N ', i3,//, 7x, 'Joint',
      * 4x, ' Link', 4x, 'theta or d', 4x, ' alpha    ', 4x,
      * '    a     ')
       do 40 j = 2, numlink+1
       if (jtype(j) .eq. 0) then
           write(6,610) j-1, j, di(j), alpiipl(j), aiipl(j)
           write(7,610) j-1, j, di(j), alpiipl(j), aiipl(j)
610        format(/,7x, 'Revolute', 2x, i1, '-', i1, 3x, f10.4,
      *    3x, f10.4, 3x, f10.4)
       else
           write(6,620) j-1, j, thi(j), alpiipl(j), aiipl(j)
           write(7,620) j-1, j, thi(j), alpiipl(j), aiipl(j)
620        format(/,7x, 'Prismatic', 1x, i1, '-', i1, 3x, f10.4,
      *    3x, f10.4, 3x, f10.4)
       endif
40     continue
       write(6,615)
       write(7,615)
615    format(//,24x, 'd          theta        alpha          a', /)
       write(6,617) di(1), thi(1), aiipl(1), alpiipl(1)
       write(7,617) di(1), thi(1), aiipl(1), alpiipl(1)
617    format(3x, 'World - Base ', 4(3x, f10.4), /)
       write(6,618) di(numlink+2), thi(numlink+2), aiipl(numlink+2),
      *             alpiipl(numlink+2)
       write(7,618) di(numlink+2), thi(numlink+2), aiipl(numlink+2),
      *             alpiipl(numlink+2)
618    format(3x, 'Hand - Cube  ', 4(3x, f10.4))
       write(6,640) iter
       write(7,640) iter
640    format(1h1, 15x, 'P R E D I C T E D',
      * '   P A I R   V A R I A B L E S',/, 16x,
      * '(Nominal Pair Variable - Predicted Error)',//,
      * 29x, 'I T E R A T I O N ', i3)
       write(6,652)
       write(7,652)
652    format(//, 6x, 'Theta or d', 3x, 'Pose1', 6x, 'Pose2', 6x,
      * 'Pose3', 6x, 'Pose4', 6x, 'Pose5')
       do 60 i = 2, numlink+1
       write(6,660) i-1, (qms(i,j), j = 1, numpose)
       write(7,660) i-1, (qms(i,j), j = 1, numpose)
660    format(/, 17x, i1, 2x, 5(f10.4, 1x))
60     continue
       do 17 i = 1, numlink+2
       dthi(i) = dthi(i) - prod1(i)
       dd(i) = dd(i) - prod3(i)
       if (i .eq. numlink+2) go to 17
       dalpha(i) = dalpha(i) - prod1(i+numlink+2)
```

```
      da(i) = da(i) - prod3(i+numlink+2)
17    continue
      write(6,700) iter
      write(7,700) iter
700   format(1h1, //, 21x, 'A L G O R I T H M   E R R O R S',
     * /, 27x, '(Actual - Predicted error)',//,28x,
     * 'I T E R A T I O N ',i3,/)
      write(6,800)
      write(7,800)
800   format(11x, 'link 1-2', 3x, 'link 2-3', 3x, 'link 3-4', 3x,
     * 'link 4-5', 3x, 'link 5-6', 3x, 'link 6-7',/)
      write(6,900) (dthi(i), i = 2, numlink+1)
      write(7,900) (dthi(i), i = 2, numlink+1)
900   format(1x,'d theta', 6(1x, f10.4))
      write(6,910) (dd(i), i = 2, numlink+1)
      write(7,910) (dd(i), i = 2, numlink+1)
910   format(1x,'d d     ', 6(1x, f10.4))
      write(6,920) (dalpha(i), i = 2, numlink+1)
      write(7,920) (dalpha(i), i = 2, numlink+1)
920   format(1x, 'd alpha', 6(1x, f10.4))
      write(6,940) (da(i), i = 2, numlink+1)
      write(7,940) (da(i), i = 2, numlink+1)
940   format(1x, 'd a    ', 6(1x, f10.4))
      write(6,10)
      write(7,10)
      write(6,350) dthi(1), dthi(numlink+2)
      write(7,350) dthi(1), dthi(numlink+2)
      write(6,450) dd(1), dd(numlink+2)
      write(7,450) dd(1), dd(numlink+2)
      write(6,550) dalpha(1)
      write(7,550) dalpha(1)
      write(6,650) da(1)
      write(7,650) da(1)
      return
      end FILE  SLCAL2.FOR
This file is linked with file SLCALP.FOR.  Used to do the Least Squares solution
for a manipulator with World - Base and Hand - Cube Transformations.

subroutine inverse(n,a)

common/prnt/iprint
      dimension a(20,20)
      common/parax/jpar, jparp1
      eps = 0.0000000001
      deter = simul(n, a, eps, jpar)
      if (iprint .eq. 1) write(6,202) deter
      if (iprint .eq. 1) write(7,202) deter
202   format(/, 5x, 'deter =',e13.4)
      return
      end function simul(n, a, eps, jpar)
```

```
      common/prnt/iprint
      common/tn/jtype(10), numlink, numpose
      dimension irow(20), jcol(20), jord(20), y(20), a(20,20),
     * aug(20,20), yy(20)
      nn = n
      if (jpar .ne. -1) nn = n - 1
      jparpl = jpar + 1
      do 19 i = 1,n
      do 19 j = 1,n
      aug(i,j) = 0.0
      if (i .eq. j) aug(i,j) = 1.0
   19 continue
      deter = 1.0
      do 18 k = 1, nn
      km1 = k - 1
      pivot = 0.0
      do 11 i = 1, n
      do 11 j = 1, n
      if (k .eq. 1) go to 9
      do 8 iscan = 1, km1
      do 8 jscan = 1, km1
      if (i .eq. irow(iscan)) go to 11
      if (j .eq. jcol(jscan)) go to 11
    8 continue
      if ((jpar .ne. -1) .and. (j .eq. jparpl)) go to 11
    9 if (abs(a(i,j)) .le. abs(pivot)) go to 11
      pivot = a(i,j)
      irow(k) = i
      jcol(k) = j
   11 continue
      if (abs(pivot) .gt. eps) go to 13
      simul = 0.0
      return
   13 irowk = irow(k)
      jcolk = jcol(k)
      deter = deter * pivot
      do 14 j = 1, n
      aug(irowk, j) = aug(irowk, j) / pivot
   14 a(irowk, j) = a(irowk, j) / pivot
      do 99 i = 1, n
      aijck = a(i, jcolk)
      if (i .eq. irowk) go to 99
      do 17 j = 1,n
      a(i,j) = a(i,j) - aijck * a(irowk, j)
   17 aug(i,j) = aug(i,j) - aijck * aug(irowk, j)
   99 continue
   18 continue
      if (jpar .eq. -1) go to 193
      jcol(n) = jparpl
      isum = 0.0
      do 50 kk = 1, n-1
   50 isum = isum + irow(kk)
      irow(n) = (n + 1) * n / 2 - isum
  193 do 21 j = 1,n
      do 22 i = 1,n
      irowi = irow(i)
```

```
        jcoli = jcol(i)
        yy(jcoli) = a(irowi, j)
 22     y(jcoli) = aug(irowi, j)
        do 23 i = 1,n
        a(i,j) = yy(i)
 23     aug(i,j) = y(i)
 21     continue
        if (iprint .eq. 1) write(6,200)
        if (iprint .eq. 1) write(7,200)
200     format(1h1, 11x, 'THE INVERSE* OF THE ROTATION',
       *  ' 12 X 12 MATRIX IS'/)
        if (iprint .eq. 1) call prntsub(aug)
        do 24 i = 1,n
        do 24 j = 1,n
        a(i,j) = aug(i,j)
 24     continue
        simul = deter
        return
        end subroutine angle(tnpli)

common/prnt/iprint
        dimension tnpli(10,3,4)

common/tn/jtype(10), numlink, numpose
        real nz
        ax = tnpli(1,3,1)
        ay = tnpli(1,3,2)
        az = tnpli(1,3,3)
        sz = tnpli(1,2,3)
        nz = tnpli(1,1,3)
        den = sqrt(ax  2 + ay  2)
        call arctan(ax, -ay, argo)
        call arctan(sz, -nz, argt)
        call arctan(-az, den, arga)
        if (iprint .eq. 1) write(6,100) argo, arga, argt
        if (iprint .eq. 1) write(7,100) argo, arga, argt
100     format(1h1, //,1x, 'TOOL ORIENTATION ANGLES',/, 6x,
       * '(in degrees)',//,5x,
       * 'o - = ', f8.3,/, 5x, 'a - = ', f8.3,/, 5x,
       * 't - = ', f8.3)
        return
        end subroutine arctan(y, x, angle)

common/prnt/iprint
        if (abs(x) .gt. 0.00000000001) go to 4
        if (abs(y) .lt. 0.00000000001) go to 5
        if (y .lt. 0.0) go to 6
        angle = 90.0
        go to 2
  6     angle = -90.0
        go to 2
```

```
  5     angle = 0.0
        go to 2
  4     angle = atand(y / x)
        if (x .gt. 0.0) go to 2
        angle = angle + 180.0
  2     return
        end subroutine vector(del)

common/prnt/iprint
        dimension del(3,4), derrthe(3)
        common/err/errthe(3), errpos(3)
        cradtdeg = 180. / acos(-1.0)
        do 50 i = 1, 3
        if (abs(del(i,i)) .lt. 0.001) go to 50
        if (iprint .eq. 1) write(6,800)
        if (iprint .eq. 1) write(7,800)
800     format(/,1x, 'We have an infinitesimal angle ',
       * 'approximation problem')
        if (iprint .eq. 1) write(6,900) i, i, del(i,i)
        if (iprint .eq. 1) write(7,900) i, i, del(i,i)
900     format(14x, 'element(', i2, ',', i2,')=', f10.4)
50      continue
        if (abs(del(1,1)) .lt. 0.001) go to 1
        if (iprint .eq. 1) write(6,910)
        if (iprint .eq. 1) write(7,910)
910     format(14x, 'The problem is in angle x')
1       if (abs(del(2,2)) .lt. 0.001) go to 2
        if (iprint .eq. 1) write(6,920)
        if (iprint .eq. 1) write(7,920)
920     format(14x, 'The problem is in angle y')
2       if (abs(del(3,3)) .lt. 0.001) go to 3
        if (iprint .eq. 1) write(6,930)
        if (iprint .eq. 1) write(7,930)
930     format(14x, 'The problem is in angle z')
3       errthe(1) = (del(3,2) - del(2,3)) / 2.0
        errthe(2) = (del(1,3) - del(3,1)) / 2.0
        errthe(3) = (del(2,1) - del(1,2)) / 2.0
        do 20 i = 1,3
        derrthe(i) = errthe(i) * cradtdeg
20      continue
        if (iprint .eq. 1) write(6,940)
        if (iprint .eq. 1) write(7,940)
940     format(/,10x, 'Rotation error vector in radians:')
        if (iprint .eq. 1) write(6,950) (errthe(i), i = 1,3)
        if (iprint .eq. 1) write(7,950) (errthe(i), i = 1,3)
950     format(20x, f10.4)
        if (iprint .eq. 1) write(6,941)
        if (iprint .eq. 1) write(7,941)
941     format(/,10x, 'Rotation error vector in degrees:')
        if (iprint .eq. 1) write(6,950) (derrthe(i), i = 1,3)
        if (iprint .eq. 1) write(7,950) (derrthe(i), i = 1,3)
        errpos(1) = del(1,4)
        errpos(2) = del(2,4)
```

```
      errpos(3) = del(3,4)
      if (iprint .eq. 1) write(6,960)
      if (iprint .eq. 1) write(7,960)
  960 format(/,10x, 'Position error vector in mm.:')
      if (iprint .eq. 1) write(6,950) (errpos(i), i = 1,3)
      if (iprint .eq. 1) write(7,950) (errpos(i), i = 1,3)
      return
      end subroutine fsub2(i)

common/prnt/iprint
      common/fn1/roterr(21), oab(20,20), delx(20)
      common/tn/jtype(10), numlink, numpose
      if (i .ne. 0) go to 10
      write(6,100)
      write(7,100)
  100 format(1h1,//,15x,'R O T A T I O N    E R R O R',/)
      call pnterr(roterr)
      write(6,111)
      write(7,111)
  111 format(1h1,/,15x,'R O T A T I O N    1 2 X 1 2    M A T R I X',/)
   10 write(6,200)
      write(7,200)
  200 format(/,26x, 'Submatrix    o A',/)
      call submtx(oab, 1, numlink+2, 1, numlink+2)
      write(6,300)
      write(7,300)
  300 format(/, 26x, 'Submatrix    o C',/)
      call submtx(oab, 1, numlink+2, numlink+3, 2*(numlink+2)-1)
      write(6,500)
      write(7,500)
  500 format(//, 26x, 'Submatrix    o B',/)
      call submtx(oab, numlink+3, 2*(numlink+2)-1, 1, numlink+2)
      write(6,600)
      write(7,600)
  600 format(/, 26x, 'Submatrix    o D',/)
      call submtx(oab, numlink+3, 2*(numlink+2)-1, numlink+3,
     *                                             2*(numlink+2)-1)
      return
      end subroutine fsub4(i)

common/prnt/iprint
      common/fin/poserr(21), pab(20,20), dx(20), dy, pab1(20)
      common/tn/jtype(10), numlink, numpose
      if (i .ne. 0) go to 10
      write(6,100)
      write(7,100)
  100 format(1h1,//,15x,'P O S I T I O N    E R R O R',/)
      call pnterr(poserr)
      write(6,150)
      write(7,150)
```

```
 150 format(1h1,/,14x, 'P O S I T I O N   1 2 X 1 2   M A T R I X')
  10 write(6,200)
     write(7,200)
 200 format(/,26x, 'Submatrix     p A',/)
     call submty(pab, 1, numlink+2, 1, numlink+2)
     write(6,300)
     write(7,300)
 300 format(/,26x, 'Submatrix     p C',/)
     call submty(pab, 1, numlink+2, numlink+3, 2*(numlink+2)-1)
     write(6,500)
     write(7,500)
 500 format(//, 26x, 'Submatrix     p B',/)
     call submty(pab, numlink+3, 2*(numlink+2)-1, 1, numlink+2)
     write(6,600)
     write(7,600)
 600 format(/,26x, 'Submatrix     p D',/)
     call submty(pab, numlink+3, 2*(numlink+2)-1, numlink+3,
    *                                             2*(numlink+2)-1)
     return
     end subroutine prntsub(check1)

common/prnt/iprint
     dimension check1(20,20)
     common/tn/jtype(10), numlink, numpose
     write(6,401)
     write(7,401)
 401 format(/, 28x, 'Submatrix  1-1',/)
     call submtx(check1, 1, numlink+2, 1, numlink+2)
     write(6,402)
     write(7,402)
 402 format(/, 28x, 'Submatrix  2-1',/)
     call submtx(check1, 1, numlink+2, numlink+3, 2*(numlink+2)-1)
     write(6,404)
     write(7,404)
 404 format(/, 28x, 'Submatrix  1-2',/)
     call submtx(check1, numlink+3, 2*(numlink+2)-1, 1, numlink+2)
     write(6,405)
     write(7,405)
 405 format(/, 28x, 'Submatrix  2-2',/)
     call submtx(check1, numlink+3, 2*(numlink+2)-1, numlink+3,
    *                                             2*(numlink+2)-1)
     return
     end subroutine ctiipl(a, b, c, d, tiipl)

common/prnt/iprint
     dimension tiipl(3,4)
     tiipl(1,1) = cosd(a)
     tiipl(1,2) = - sind(a) * cosd(d)
     tiipl(1,3) = sind(a) * sind(d)
     tiipl(1,4) = c * cosd(a)
```

```fortran
      tiipl(2,1) = sind(a)
      tiipl(2,2) = cosd(a) * cosd(d)
      tiipl(2,3) = - cosd(a) * sind(d)
      tiipl(2,4) = c * sind(a)
      tiipl(3,1) = 0.0
      tiipl(3,2) = sind(d)
      tiipl(3,3) = cosd(d)
      tiipl(3,4) = b
      return
      end subroutine tmult(tf, ts, tp)

common/prnt/iprint
      dimension tf(3,4), ts(3,4), tp(3,4)
      do 10 i = 1,3
      do 20 j = 1,4
      tp(i,j) = 0.0
20    continue
10    continue
      do 30 i = 1,3
      do 40 j = 1,4
      do 50 k = 1,3
      tp(i,j) = tp(i,j) + tf(i,k) * ts(k,j)
50    continue
40    continue
      tp(i,4) = tp(i,4) + tf(i,4)
30    continue
      return
      end subroutine matmult(a, b, nra, ncarb, ncb, c)

common/prnt/iprint
      dimension a(20,20), b(20,20), c(20,20)
      do 10 i = 1, nra
      do 20 j = 1, ncb
      c(i,j) = 0.0
      do 30 k = 1, ncarb
      c(i,j) = c(i,j) + a(i,k) * b(k,j)
30    continue
20    continue
10    continue
      return
      end subroutine invmtrx(a, b)

common/prnt/iprint
      dimension a(3,4), b(3,4)
      do 10 i = 1,3
      do 20 j = 1,3
      b(j,i) = a(i,j)
```

```
20   continue
10   continue
     b(1,4) = - (a(1,4) * a(1,1) + a(2,4) * a(2,1) + a(3,4) * a(3,1))
     b(2,4) = - (a(1,4) * a(1,2) + a(2,4) * a(2,2) + a(3,4) * a(3,2))
     b(3,4) = - (a(1,4) * a(1,3) + a(2,4) * a(2,3) + a(3,4) * a(3,3))
     return
     end subroutine dot(a, b, c)

dimension a(3), b(3)
     c = 0.0
     do 10 i = 1,3
     c = c + a(i) * b(i)
10   continue
     return
     end subroutine matsubt(a, b, nrab, ncab, c)

common/prnt/iprint
     dimension a(20,20), b(20,20), c(20,20)
     do 10 i = 1, nrab
     do 20 j = 1, ncab
     c(i,j) = a(i,j) - b(i,j)
20   continue
10   continue
     return
     end subroutine cross(a, b, c)

dimension a(3), b(3), c(3)
     c(1) = a(2) * b(3) - a(3) * b(2)
     c(2) = a(3) * b(1) - a(1) * b(3)
     c(3) = a(1) * b(2) - a(2) * b(1)
     return
     end subroutine submtx(f, jstart, jend, istart, iend)

common/prnt/iprint
     common/tn/jtype(10), numlink, numpose
     dimension f(20,20)
     do 10 i = istart, iend
     write(6,100) (f(i,j), j = jstart, jend)
     write(7,100) (f(i,j), j = jstart, jend)
10   continue
100  format(8(1x, f9.4))
     return
     end subroutine submty(f, jstart, jend, istart, iend)
```

```
      common/prnt/iprint
      common/tn/jtype(10), numlink, numpose
      dimension f(20,20)
      do 10 i = istart, iend
      write(6,100) (f(i,j), j = jstart, jend)
      write(7,100) (f(i,j), j = jstart, jend)
10    continue
100   format(8(1x, e9.3))
      return
      end subroutine label(roterr)

common/prnt/iprint
      common/tn/jtype(10), numlink, numpose
      dimension roterr(21)
      do 10 i = 1, numpose
      write(6,100) i, roterr(i)
      write(7,100) i, roterr(i)
100   format(22x, 'x', i2, 2x, f10.4)
10    continue
      write(6,200)
      write(7,200)
200   format(/)
      do 20 i = 1, numpose
      write(6,300) i, roterr(i + numpose)
      write(7,300) i, roterr(i + numpose)
300   format(22x, 'y', i2, 2x, f10.4)
20    continue
      write(6,200)
      write(7,200)
      do 30 i = 1, numpose
      write(6,400) i, roterr(i + 2 * numpose)
      write(7,400) i, roterr(i + 2 * numpose)
400   format(22x, 'z', i2, 2x, f10.4)
30    continue
      write(6,500)
      write(7,500)
500   format(///, 1x, 'comes from.....',/)
      write(6,600) (roterr(i), i = 1, numpose)
      write(7,600) (roterr(i), i = 1, numpose)
600   format(1x, 'x1 =', f10.4, 2x, 'x2 =', f10.4, 2x, 'x3 =', f10.4,
     * 2x, 'x4 =', f10.4)
      write(6,700) (roterr(i), i = numpose+1, 2*numpose)
      write(7,700) (roterr(i), i = numpose+1, 2*numpose)
700   format(1x, 'y1 =', f10.4, 2x, 'y2 =', f10.4, 2x, 'y3 =', f10.4,
     * 2x, 'y4 =', f10.4)
      write(6,800) (roterr(i), i = 2*numpose+1, 3*numpose)
      write(7,800) (roterr(i), i = 2*numpose+1, 3*numpose)
800   format(1x, 'z1 =', f10.4, 2x, 'z2 =', f10.4, 2x, 'z3 =', f10.4,
     * 2x, 'z4 =', f10.4)
      return
      end function sind(x)
      pi=acos(-1.)
```

```fortran
      sind=sin(x*pi/180.)
      return
      end function cosd(x)
      pi=acos(-1.)
      cosd=cos(x*pi/180.)
      return
      end function atand(x)
      pi=acos(-1.)
      atand=180.*atan(x)/pi
      return
      end
```

FILE SLCAL3.FOR
This file is linked with file SLCALP.FOR. Used to do the Least Squares solution for a manipulator with World - Base and Hand - Cube Transformations.

```fortran
      subroutine fsub1 common/prnt/iprint
      common/pn/npose, iter, itern
      common/t/tnplimn(10,3,4), tnpliac(10,3,4), tnom(9,9,3,4)
      common/tn/jtype(10), numlink, numpose
      common/err/errthe(3), errpos(3)
      common/fn1/roterr(21), oab(20,20), delx(20)
      dimension ra(10,10), rb(10,10), rd(10,10)
      roterr(     npose) = errthe(1)
      roterr(numpose + npose) = errthe(2)
      roterr(2 * numpose + npose) = errthe(3)
      n = numlink + 2
      do 10 i = 1,n
      delx(i) = delx(i) + errthe(1) * tnom(i, n+1, 3, 1)
     *                  + errthe(2) * tnom(i, n+1, 3, 2)
     *                  + errthe(3) * tnom(i, n+1, 3, 3)
      delx(n+i) = delx(n+i)
     *                  + errthe(1) * tnom(i+1, n+1, 1, 1)
     *                  + errthe(2) * tnom(i+1, n+1, 1, 2)
     *                  + errthe(3) * tnom(i+1, n+1, 1, 3)
   10 continue
      do 20 i = 1, n
      do 30 j = 1, n
      if (i .eq. j) then
          ra(i,j) = 1.0
          rd(i,j) = 1.0
      elseif (i .lt. j) then
          ra(i,j) = tnom(i, j, 3, 3)
          rd(i,j) = tnom(i+1, j+1, 1, 1)
      else
      endif
      if (i .eq. j+1) then
          rb(i,j) = 0.0
      elseif (i .lt. j+1) then
```

```
          rb(i,j) = tnom(i, j+1, 3, 1)
       else
          rb(i,j) = tnom(j+1, i, 1, 3)
       endif
30  continue
20  continue
    do 40 i = 1, n
    do 50 j = 1, n
    if (i .le. j) then
       oab(i,j) = oab(i,j) + ra(i,j)
       oab(i+n, j+n) = oab(i+n, j+n) + rd(i,j)
       oab(i, j+n) = oab(i, j+n) + rb(i,j)
    else
       oab(i,j) = oab(j,i)
       oab(i+n, j+n) = oab(j+n, i+n)
       oab(i, j+n) = oab(i, j+n) + rb(i,j)
    endif
50  continue
40  continue
    do 60 i = 1, n
    do 60 j = 1, n
    oab(i+n, j) = oab(j, i+n)
60  continue
    return
    end subroutine fsub3 common/prnt/iprint
    common/pn/npose, iter, itern
    common/t/tnplimn(10,3,4), tnpliac(10,3,4), tnom(9,9,3,4)
    common/err/errthe(3), errpos(3)
    common/fin/poserr(21), pab(20,20), dx(20), dy, pab1(20)
    common/tn/jtype(10), numlink, numpose
    common/parax/jpar, jparp1
    dimension pa(10,10), pb(10,10), pc(10,10), pd(10,10)
    dimension pm(10), pn(10)
    n = numlink + 2
    poserr(      npose) = errpos(1)
    poserr(numpose + npose) = errpos(2)
    poserr(2 * numpose + npose) = errpos(3)
    do 10 i = 1,n
    dx(i) = dx(i) + errpos(1) * tnom(i, n+1, 3, 1)
   *              + errpos(2) * tnom(i, n+1, 3, 2)
   *              + errpos(3) * tnom(i, n+1, 3, 3)
    dx(i+n) = dx(i+n)
   *              + errpos(1) * tnom(i+1, n+1, 1, 1)
   *              + errpos(2) * tnom(i+1, n+1, 1, 2)
   *              + errpos(3) * tnom(i+1, n+1, 1, 3)
10  continue
    i = jpar p1
    dy = dy + errpos(1) * ( tnom(i,n+1,1,4) * tnom(i,n+1,2,1)
   *                      - tnom(i,n+1,2,4) * tnom(i,n+1,1,1))
   *        + errpos(2) * ( tnom(i,n+1,1,4) * tnom(i,n+1,2,2)
   *                      - tnom(i,n+1,2,4) * tnom(i,n+1,1,2))
```

```
*           + errpos(3) * ( tnom(i,n+1,1,4) * tnom(i,n+1,2,3)
*                         - tnom(i,n+1,2,4) * tnom(i,n+1,1,3))
      do 20 i = 1, n
      do 30 j = 1, n
      if (i .eq. j) then
          pa(i,j) = 0.0
          pd(i,j) = 0.0
      elseif (i .lt. j) then
          pa(i,j) = tnom(j, n+1, 1, 4) * tnom(i, j, 3, 2)
*                 - tnom(j, n+1, 2, 4) * tnom(i, j, 3, 1)
          pd(i,j) = tnom(j+1, n+1, 2, 4) * tnom(i+1, j+1, 1, 3)
*                 - tnom(j+1, n+1, 3, 4) * tnom(i+1, j+1, 1, 2)
      else
          pa(i,j) = tnom(j, n+1, 1, 4) * tnom(j, i, 2, 3)
*                 - tnom(j, n+1, 2, 4) * tnom(j, i, 1, 3)
          pd(i,j) = tnom(j+1, n+1, 2, 4) * tnom(j+1, i+1, 3, 1)
*                 - tnom(j+1, n+1, 3, 4) * tnom(j+1, i+1, 2, 1)
      endif
      if (j+1 .eq. i) then
          pb(i,j) = tnom(j+1, n+1, 2, 4)
      elseif (j+1 .lt. i) then
          pb(i,j) = tnom(j+1, n+1, 2, 4) * tnom(j+1, i, 3, 3)
*                 - tnom(j+1, n+1, 3, 4) * tnom(j+1, i, 2, 3)
      else
          pb(i,j) = tnom(j+1, n+1, 2, 4) * tnom(i, j+1, 3, 3)
*                 - tnom(j+1, n+1, 3, 4) * tnom(i, j+1, 3, 2)
      endif
      if (j .eq. i+1) then
          pc(i,j) = - tnom(j, n+1, 2, 4)
      elseif (j .lt. i+1) then
          pc(i,j) = tnom(j, n+1, 1, 4) * tnom(j, i+1, 2, 1)
*                 - tnom(j, n+1, 2, 4) * tnom(j, i+1, 1, 1)
      else
          pc(i,j) = tnom(j, n+1, 1, 4) * tnom(i+1, j, 1, 2)
*                 - tnom(j, n+1, 2, 4) * tnom(i+1, j, 1, 1)
      endif
   30 continue
   20 continue
      i = jparp1
      do 100 j = 1, n
      if (i .eq. j) then
         pm(j) = tnom(j,n+1,2,4) * tnom(i,n+1,2,4)
*              + tnom(j,n+1,1,4) * tnom(i,n+1,1,4)
      elseif(i .lt. j) then
         pm(j) =
*      tnom(j,n+1,2,4) * (tnom(i,n+1,2,4) * tnom(i,j,1,1)
*                       - tnom(i,n+1,1,4) * tnom(i,j,2,1))
*    - tnom(j,n+1,1,4) * (tnom(i,n+1,2,4) * tnom(i,j,1,2)
*                       - tnom(i,n+1,1,4) * tnom(i,j,2,2))
      else
         pm(j) =
*      tnom(j,n+1,2,4) * (tnom(i,n+1,2,4) * tnom(j,i,1,1)
*                       - tnom(i,n+1,1,4) * tnom(j,i,1,2))
*    - tnom(j,n+1,1,4) * (tnom(i,n+1,2,4) * tnom(j,i,2,1)
*                       - tnom(i,n+1,1,4) * tnom(j,i,2,2))
      endif
      if (i .eq. j+1) then
```

```
        pn(j) = - tnom(j+1,n+1,3,4) * tnom(i,n+1,1,4)
      elseif (i .lt. j+1) then
        pn(j) =
   *       tnom(j+1,n+1,3,4) * (tnom(i,n+1,2,4) * tnom(i,j+1,1,2)
   *                          - tnom(i,n+1,1,4) * tnom(i,j+1,2,2))
   *    - tnom(j+1,n+1,2,4) * (tnom(i,n+1,2,4) * tnom(i,j+1,1,3)
   *                          - tnom(i,n+1,1,4) * tnom(i,j+1,2,3))
      else
        pn(j) =
   *       tnom(j+1,n+1,3,4) * (tnom(i,n+1,2,4) * tnom(j+1,i,2,1)
   *                          - tnom(i,n+1,1,4) * tnom(j+1,i,2,2))
   *    - tnom(j+1,n+1,2,4) * (tnom(i,n+1,2,4) * tnom(j+1,i,3,1)
   *                          - tnom(i,n+1,1,4) * tnom(j+1,i,3,2))
      endif
100 continue
      do 40 i = 1, n
      do 50 j = 1, n
      pab(i,j)     = pab(i,j)     + pa(i,j)
      pab(i, j+n)  = pab(i, j+n)  + pb(i,j)
      pab(i+n, j)  = pab(i+n, j)  + pc(i,j)
      pab(i+n, j+n) = pab(i+n, j+n) + pd(i,j)
50  continue
40  continue
      do 60 j = 1, n
      pab1(j)   = pab1(j)   + pm(j)
      pab1(j+n) = pab1(j+n) + pn(j)
60  continue
      return
      end subroutine delvec common/prnt/iprint
      dimension tnp1lmn(3,4), tlnp1mn(3,4)
      dimension tnp1lac(3,4), tlnp1ac(3,4)
      dimension del(3,4)
      common/t/tnp1imn(10,3,4), tnp1iac(10,3,4), tnom(9,9,3,4)
      common/tn/jtype(10), numlink, numpose
      common/dt/dtmes(3,4)
      common/pn/npose,iter,itern
      dimension sn(3), sa(3), an(3), aa(3), pn(3), pa(3), apmnp(3)
      real nn(3), na(3)
      if (iprint .ne. 1) go to 3
      write(6,200)
      write(7,200)
200 format(1h1, 8x, 'P O S E    E R R O R    V E C T O R S')
      write(6,700)
      write(7,700)
700 format(13x, '(With respect to hand frame)')
      write(6,100) npose
      write(7,100) npose
100 format(//, 12x, 'Measurement Pose Number ',i2, //)
      write(6,750)
      write(7,750)
750 format(3x, 'Del Matrix   = ',
   * '(Tlnp1)nom-1 x (Tlnp1)act  -  I ',/)
```

```
3    do 10 i=1, 3
     do 10 j=1, 4
     tlnplmn(i,j) = tnom(1, numlink+3, i, j)
     tnpllac(i,j) = tnpliac(1,i,j)
10   continue
     call invmtrx(tnpllac, tlnplac)
     do 20 i = 1, 3
     nn(i) = tlnplmn(i,1)
     na(i) = tlnplac(i,1)
     sn(i) = tlnplmn(i,2)
     sa(i) = tlnplac(i,2)
     an(i) = tlnplmn(i,3)
     aa(i) = tlnplac(i,3)
     pn(i) = tlnplmn(i,4)
     pa(i) = tlnplac(i,4)
     apmnp(i) = pa(i) - pn(i)
20   continue
     call dot(nn, na, con)
     del(1,1) = con - 1.0
     call dot(nn, sa, con)
     del(1,2) = con
     call dot(nn,aa,con)
     del(1,3) = con
     call dot(nn, apmnp, con)
     del(1,4) = con
     call dot(sn, na, con)
     del(2,1) = con
     call dot(sn, sa, con)
     del(2,2) = con - 1.0
     call dot(sn, aa, con)
     del(2,3) = con
     call dot(sn, apmnp, con)
     del(2,4) = con
     call dot(an, na, con)
     del(3,1) = con
     call dot(an, sa, con)
     del(3,2) = con
     call dot(an, aa, con)
     del(3,3) = con - 1.0
     call dot(an, apmnp, con)
     del(3,4) = con
     if (iprint .eq. 1) write(6,400) ((del(i,j), j=1,4), i=1,3)
     if (iprint .eq. 1) write(7,400) ((del(i,j), j=1,4), i=1,3)
400  format(3(1x,4(f10.4,2x)/))
     call vector(del)
     return
     end subroutine initial common/fnl/roterr(21), oab(20,20), delx(20)
     common/fin/poserr(21), pab(20,20), dx(20), dy, pabl(20)
     common/tn/jtype(10), numlink, numpose
     do 10 i = 1, 2*(numlink+2)-1
     do 20 j = 1, 2*(numlink+2)-1
     oab(i,j) = 0.0
     pab(i,j) = 0.0
```

```fortran
20      continue
        dx(i) = 0.0
        delx(i) = 0.0
        pabl(i) = 0.0
10      continue
        dy = 0.0
        return
        end subroutine mprod(i1, j1, i2, j2)

common/t/tnplimn(10,3,4), tnpliac(10,3,4), tnom(9,9,3,4)
        do 10 i = 1, 3
        do 20 j = 1, 4
        tnom(i1, j2, i, j) = 0.0
20      continue
10      continue
        do 30 i = 1, 3
        do 40 j = 1, 4
        do 50 k = 1, 3
        tnom(i1, j2, i, j) = tnom(i1, j2, i, j)
     *                       + tnom(i1, j1, i, k) * tnom(i2, j2, k, j)
50      continue
40      continue
        tnom(i1, j2, i, 4) = tnom(i1, j2, i, 4) + tnom(i1, j1, i, 4)
30      continue
        return
        end subroutine replace common/tn/jtype(10), numlink, numpose
        common/fnl/roterr(21), oab(20,20), delx(20)
        common/fin/poserr(21), pab(20,20), dx(20), dy, pabl(20)
        common/parax/jpar, jparp1
        do 10 i = 1, 2*(numlink+2)-1
        oab(jparp1, i) = pab(i, jparp1)
        pab(jparp1, i) = pabl(i)
10      continue
        dx(jparp1) = dy
        return
        end subroutine pntdx common/tn/jtype(10), numlink, numpose
        common/fin/poserr(21), pab(20,20), dx(20), dy, pabl(20)
        common/fnl/roterr(21), oab(20,20), delx(20)
        write(6,10)
        write(7,10)
10      format(1h1,//,6x,'delz & delx vectors',19x,'dz & dx  vectors',/)
        do 20 i = 1, numlink+2
        write(6,30) i, delx(i), i, dx(i)
        write(7,30) i, delx(i), i, dx(i)
30      format(5x,'delz - ',i1,' = ', e11.4, 16x,'dz - ',i1,' = ',e11.4)
```

```
 20   continue
      do 40 i = numlink + 3, 2 * (numlink+2) - 1
      write(6,50) i - numlink, delx(i), i - numlink, dx(i)
      write(7,50) i - numlink, delx(i), i - numlink, dx(i)
 50   format(5x,'delx - ',i1,' = ', e11.4, 16x,'dx - ',i1,' = ',e11.4)
 40   continue
      return
      end subroutine pnterr(xerr)

common/tn/jtype(10), numlink, numpose
      dimension xerr(21)
      write(6,10)
      write(7,10)
 10   format(1h1,3x,'POSE #',11x,'X',14x,'Y',14x,'Z',12x,'Magn.',/)
      do 100 i = 1, numpose
      xmag = sqrt(xerr(i) ** 2 + xerr(i + numpose) ** 2
     *                         + xerr(i + 2*numpose) ** 2)
      write(6,20) i, xerr(i), xerr(i+numpose), xerr(i+2*numpose), xmag
      write(7,20) i, xerr(i), xerr(i+numpose), xerr(i+2*numpose), xmag
 20   format(6x, i1, 8x, 4(e11.4, 4x), /)
100   continue
      return
      end subroutine pserror common/fn1/roterr(21), oab(20,20), delx(20)
      common/fin/poserr(21), pab(20,20), dx(20), dy, pab1(20)
      write(6,210)
      write(7,210)
210   format(//, 22x, 'R O T A T I O N    E R R O R',/)
      call pnterr(roterr)
      write(6,220)
      write(7,220)
220   format(//, 22x, 'P O S I T I O N    E R R O R',/)
      call pnterr(poserr)
      return
      end program scalp FILE  SCALP.FOR
This program does the deterministic solution for a manipulator with World - Base
and Hand - Cube Transformations.  Checks for parallelness only between two
specified axes, and does the modified inverse or the regular inverse
accordingly.  Linked with files SCAL1.FOR, SCAL2.FOR, and SCAL3.FOR common/prnt/iprint
      common/pn/npose,iter,itern
      common/s2/sum2(20),sum4(20)
      common/qma/qmeas(10), qact(10)
      common/qmat/qms(10,7), qct(10,7)
      common/tn/jtype(10), numlink, numpose
```

```fortran
      common/parax/jpar, jparpl
      common/paral/crosprd, jlpar, jlparpl
      open (4,file='puma.dat',status='old')
      open (5,file='con')
      open (6,file='con')
      open (7,file='puma.out',status='new')
      iter = 1
      theta = 0.5589425e-03
      eps = 40.0 * theta
      call specs
      call nomknpr
      call error
      call actknpr
      call qactmes
      do 20 i =1, 2 * (numlink+2) - 1
      sum2(i) = 0.0
      sum4(i) = 0.0
   20 continue
      jlpar = jpar
      jlparpl = jparpl
    6 crosprd = 0.0
      do 10 npose =1, numpose
      do 11 jj = 2, numlink+1
      qmeas(jj) = qms(jj,npose)
      qact(jj) = qct(jj,npose)
   11 continue
      if (iprint .eq. 1) write (6,100) npose
      if (iprint .eq. 1) write (7,100) npose
  100 format(1h1, //, 18x, 'P O S E   N U M B E R ', i1,/)
      call tmesnom
      if (iprint .eq. 1) write(6,100) npose
      if (iprint .eq. 1) write(7,100) npose
      call tact
      call delvec
      call fsub1
      call fsub3
   10 continue
      crosprd = crosprd/ float(numpose)
      if (crosprd .ge. eps) then
         jpar = -1
      else
         jpar = jlpar
      endif
      write(6,200) iter, crosprd, jpar-1
      write(7,200) iter, crosprd, jpar-1
  200 format(/,2x,'Iteration # : ',i2,8x,'(z2 x z3) = ',e14.7,8x,
     * 'jpar-1 = ',i2)
      call vecsoln
      call algoerr
      if (iter .eq. itern) go to 1
      iter = iter + 1
      go to 6
    1 close(4)
      close(7)
      stop
      end
```

```
      subroutine specs common/prnt/iprint
      common/pn/npose,iter,itern
      common/parax/jpar,jparp1
      character*20 a
89    write(6,90)
      write(7,90)
90    format(' do you want print outs of everything 1=yes, 0=no ? ')
      read (5,91) iprint
91    format(i1)
      if ((iprint .ne. 1) .and. (iprint .ne. 0)) go to 89
      write (6,92)
      write (7,92)
92    format(' how many iterations do you want?  enter 000-999 .. ')
      read (5,93) itern
93    format(i3)
      write (6,100)
      write (7,100)
100   format(/, ' specify name of robot ... ')
      read (5,110) a
110   format(a20)
      write (6,200) a
      write (7,200) a
200   format(//, ' robot name : ', a20)
      write (6,300)
      write (7,300)
300   format(/, ' specify parallel axes numbers ... ')
      read (5,*) jpar, jparp1
      write(6,400) jpar, jparp1
      write(7,400) jpar,jparp1
400   format(/,30x, 'z - ', i2,5x, 'z - ', i2)
      if (jpar .eq. -1) return
      jpar = jpar + 1
      jparp1 = jparp1 + 1
      return
      end subroutine error common/prnt/iprint
      common/change/dd(10), dthi(10), da(10), dalpha(10)
      common/tn/jtype(10), numlink, numpose
      write (6,100)
      write (7,100)
100   format(1h1,//, 1x, 'A C T U A L  E R R O R S  I N  P A R A M E',
     * 'T E R S  A N D  V A R I A B L E S',/, 25x,
     * '(Lengths in mm.  Angeles in degrees)',/)
      write (6,200)
      write (7,200)
200   format(17x, 'link 1-2', 3x, 'link 2-3', 3x, 'link 3-4', 3x,
     * 'link 4-5', 3x, 'link 5-6', 3x, 'link 6-7',/)
      do 30 i = 1, numlink+1
      read (4,*) dd(i), dthi(i), da(i), dalpha(i)
30    continue
      read (4,*) dd(numlink+2), dthi(numlink+2)
```

```
      da(numlink+2) = 0.0
      dalpha(numlink+2) = 0.0
      write (6,300) (dthi(i), i=2,numlink+1)
      write (7,300) (dthi(i), i=2,numlink+1)
  300 format(5x, 'd theta', 1x, 6(1x, f10.4))
      write(6,400) (dd(i), i=2,numlink+1)
      write(7,400) (dd(i), i=2,numlink+1)
  400 format(5x, 'd d    ',1x, 6(1x, f10.4))
      write (6,500) (dalpha(i), i=2,numlink+1)
      write (7,500) (dalpha(i), i=2,numlink+1)
  500 format(5x, 'd alpha' 1x, 6(1x, f10.4))
      write (6,600) (da(i), i=2,numlink+1)
      write (7,600) (da(i), i=2,numlink+1)
  600 format(5x, 'd a    ', 1x, 6(1x, f10.4))
      write (6,10)
      write (7,10)
   10 format(/,16x,'World-Base  Hand-Cube',/)
      write (6,350) dthi(1), dthi(numlink+2)
      write (7,350) dthi(1), dthi(numlink+2)
  350 format(5x,'d theta', 1x, 2(1x, f10.4))
      write (6,450) dd(1), dd(numlink+2)
      write (7,450) dd(1), dd(numlink+2)
  450 format(5x,'d d    ', 1x, 2(1x, f10.4))
      write (6,550) dalpha(1), dalpha(numlink+2)
      write (7,550) dalpha(1), dalpha(numlink+2)
  550 format(5x,'d alpha', 1x, 2(1x, f10.4))
      write (6,650) da(1), da(numlink+2)
      write (7,650) da(1), da(numlink+2)
  650 format(5x,'d a    ', 1x, 2(1x, f10.4))
      return
      end subroutine nomknpr common/prnt/iprint
      common/pn/npose,iter,itern
      common/nom/thi(10), di(10), aiipl(10), alpiipl(10)
      common/tn/jtype(10), numlink, numpose
      write (6,100)
      write (7,100)
  100 format(1h1, //, 5x, 'N O M I N A L   K I N E M A T I C  ',
     * 'P A R A M E T E R S',/,16x,'(lengths in mm.,',
     * ' angles in degrees)',//
     * 8x, 'Joint',
     * 3x, ' Link', 4x, 'theta or d', 4x, ' alpha    ', 4x,
     * '  a     ')
c     input number of links
      read (4,*) numlink
c     input number of pose measurements
      read (4,*) numpose
c
      read (4,*) di(1), thi(1), aiipl(1), alpiipl(1)
      do 40 j = 2, numlink+1
c     input joint type
      read(4,*) jtype(j)
      if (jtype(j) .eq. 0) then
```

```
c       input di(j), aiip1(j), alpiip1(j)
            read (4,*) di(j), aiip1(j), alpiip1(j)
            write (6,610) j-1, j, di(j), alpiip1(j), aiip1(j)
            write (7,610) j-1, j, di(j), alpiip1(j), aiip1(j)
 610        format(/,7x, 'Revolute', 2x, i1,'-',i1,3x, f10.4,
        *   3x, f10.4, 3x, f10.4)
        else
c       input thi(j), aiip1(j), alpiip1(j)
            read (4,*) thi(j), aiip1(j), alpiip1(j)
            write (6,620) j-1, j, thi(j), alpiip1(j), aiip1(j)
            write (7,620) j-1, j, thi(j), alpiip1(j), aiip1(j)
 620        format(/,7x, 'Prismatic', 1x, i1, '-', i1, 3x, f10.4,
        *   3x, f10.4, 3x, f10.4)
        endif
 40     continue
        read (4,*) di(numlink+2), thi(numlink+2)
        aiip1(numlink+2) = 0.0
        alpiip1(numlink+2) = 0.0
        write (6,615)
        write (7,615)
 615    format(//,25x,'d          theta         alpha           a',/)
        write(6,617) di(1), thi(1), alpiip1(1), aiip1(1)
        write(7,617) di(1), thi(1), alpiip1(1), aiip1(1)
 617    format(3x,'World - Base ',4(3x, f10.4), /)
        write(6,618) di(numlink+2), thi(numlink+2), aiip1(numlink+2),
        *            alpiip1(numlink+2)
        write(7,618) di(numlink+2), thi(numlink+2), aiip1(numlink+2),
        *            alpiip1(numlink+2)
 618    format(3x,'Hand - Cube  ',4(3x, f10.4))
        return
        end subroutine actknpr common/prntr/iprint
        common/pn/npose, iter, itern
        common/act/ athi(10), adi(10), aaiip1(10), aalpip1(10)
        common/nom/ thi(10), di(10), aiip1(10), alpiip1(10)
        common/tn/ jtype(10), numlink, numpose
        common/change/ dd(10), dthi(10), da(10), dalpha(10)
        write (6,100)
        write (7,100)
 100    format(1h1, //, 6x, 'A C T U A L   K I N E M A T I C  ',
        * 'P A R A M E T E R S',/,16x, '(lengths in mm.,',
        * ' angeles in degrees)',//, 8x, 'Joint',
        * 3x, ' Link', 4x, 'theta or d', 4x, ' alpha     ', 4x,
        * '     a     ')
        do 40 j = 2, numlink+1
        if (jtype(j) .eq. 0) then
            adi(j) = di(j) + dd(j)
            aaiip1(j) = aiip1(j) + da(j)
            aalpip1(j) = alpiip1(j) + dalpha(j)
            write(6,610) j, j+1, adi(j), aalpip1(j), aaiip1(j)
            write(7,610) j, j+1, adi(j), aalpip1(j), aaiip1(j)
 610        format(/, 7x, 'Revolute', 2x, i1, '-', i1, 3x, f10.4,
        *   3x, f10.4, 3x, f10.4)
        else
```

```
2       athi(j) = thi(j) + dthi(j)
        aaiip1(j) = aiip1(j) + da(j)
        aalpip1(j) = alpiip1(j) + dalpha(j)
        write(6,620) j, j+1, athi(j), aalpip1(j), aaiip1(j)
        write(7,620) j, j+1, athi(j), aalpip1(j), aaiip1(j)
620     format(/, 7x, 'Prismatic', 1x, i1, '-', i1, 3x, f10.4,
     *      3x, f10.4, 3x, f10.4)
        endif
40  continue
    do 50 j = 1, numlink+2, numlink+1
        adi(j) = di(j) + dd(j)
        athi(j) = thi(j) + dthi(j)
        aaiip1(j) = aiip1(j) + da(j)
        aalpip1(j) = alpiip1(j) + dalpha(j)
50  continue
    write (6,615)
    write (7,615)
615 format(//,25x,'d        theta        alpha        a',/)
    write(6,617) adi(1), athi(1), aalpip1(1), aaiip1(1)
    write(7,617) adi(1), athi(1), aalpip1(1), aaiip1(1)
617 format(3x,'World - Base ',4(3x, f10.4), /)
    write(6,618) adi(numlink+2), athi(numlink+2), aalpip1(numlink+2),
     *              aaiip1(numlink+2)
    write(7,618) adi(numlink+2), athi(numlink+2), aalpip1(numlink+2),
     *              aaiip1(numlink+2)
618 format(3x,'Hand - Cube  ',4(3x, f10.4))
    return
    end subroutine qactmes common/prnt/iprint
    common/qmat/qms(10,7), qct(10,7)
    common/tn/jtype(10), numlink, numpose
    common/change/dd(10), dthi(10), da(10), dalpha(10)
    do 10 i = 1, numpose
        read (4, *) (qms(j,i), j = 2, numlink+1)
        do 20 j = 2, numlink+1
            if (jtype(j) .eq. 0) qct(j,i) = qms(j,i) + dthi(j)
            if (jtype(j) .eq. 1) qct(j,i) = qms(j,i) + dd(j)
20      continue
10  continue
    write (6,399)
    write (7,399)
399 format(1h1, //, 16x, 'N O M I N A L   P A I R   V A R I A B L E S',
     * /, 20x, ' (Lengths in mm., angeles in degrees)')
    write(6,650)
    write(7,650)
650 format(//, 6x, 'Theta or d', 3x, 'Pose1', 6x, 'Pose2', 6x,
     * 'Pose3', 6x, 'Pose4', 6x, 'Pose5')
    do 60 j = 2, numlink+1
        write (6,660) j-1, (qms(j,i), i=1,numpose)
        write (7,660) j-1, (qms(j,i), i=1,numpose)
660     format(/, 11x, i1, 2x, 5(f10.4, 1x))
60  continue
    write(6,499)
    write(7,499)
```

```
  499 format(1h1, //, 17x, 'A C T U A L  P A I R  V A R I A B L E S',
     * /, 20x,'(Lengths in mm., angeles in degrees)')
      write(6,750)
      write(7,750)
  750 format(//, 6x, 'Theta or d', 2x, 'Pose1', 6x, 'Pose2', 6x,
     * 'Pose3', 6x, 'Pose4', 6x, 'Pose5')
      do 160 j = 2, numlink+1
          write (6,760) j-1, (qct(j,i), i=1,numpose)
          write (7,760) j-1, (qct(j,i), i=1,numpose)
  760     format(/, 11x, i1, 2x, 5(f10.4, 1x))
  160 continue
      return
      end subroutine tmesnom common/prnt/iprint
      dimension tf(3,4),atiipl(10,3,4),tiipl(3,4),tp(3,4),tipli(3,4)
      common/t/tnplimn(10,3,4), tnpliac(10,3,4)
      common/nom/thi(10), di(10), aiipl(10), alpiipl(10)
      common/tn/jtype(10), numlink, numpose
      common/qma/qmeas(10), qact(10)
      if (iprint .eq. 1) write (6,100)
      if (iprint .eq. 1) write (7,100)
  100 format(13x, 'Homogeneous Transformation Matrices',/, 4x,
     * 'Based on Nominal Parameters and Measured Pair Variables')
      do 11 k = 1,3
      do 12 l = 1,4
      tnplimn(numlink+3, k, l) = 0.0
      atiipl(numlink+3, k,l) = 0.0
   12 continue
   11 continue
      do 13 l = 1,3
      tnplimn(numlink+3, l, l) = 1.0
      atiipl(numlink+3, l, l) = 1.0
   13 continue
      do 10 i = 2, numlink+1
      if (jtype(i) .eq. 0) then
          thi(i) = qmeas(i)
      else
          di(i) = qmeas(i)
      endif
   10 continue
      do 40 n = 1, numlink+2
      i = numlink + 3 - n
      call ctiipl(thi(i), di(i), aiipl(i), alpiipl(i), tiipl)
      call invmtrx(tiipl, tipli)
      do 60 l = 1, 4
      do 50 k = 1, 3
      tf(k,l) = tnplimn(i+1, k, l)
      atiipl(i, k, l) = tiipl(k, l)
   50 continue
   60 continue
      call tmult(tf, tipli, tp)
      do 70 k = 1, 3
      do 80 l = 1, 4
      tnplimn(i, k, l) = tp(k, l)
```

```
  80  continue
  70  continue
  40  continue
      do 90 n = 1, numlink+3
      i = numlink + 4 - n
      if (iprint .eq. 1) write (6,400) i
      if (iprint .eq. 1) write (7,400) i
 400  format(/, 27x, 'T 9-', i1,/)
      if (iprint .eq. 1) write (6,300) ((tnplimn(i,k,l),l=1,4),k=1,3)
      if (iprint .eq. 1) write (7,300) ((tnplimn(i,k,l),l=1,4),k=1,3)
      if (i .eq. 1) go to 90
      if ((i .eq. 5) .and. (iprint .eq. 1)) write (6,401)
      if ((i .eq. 5) .and. (iprint .eq. 1)) write (7,401)
 401  format(1h1)
      if (iprint .eq. 1) write (6,200) i-1, i
      if (iprint .eq. 1) write (7,200) i-1, i
 200  format(/, 27x, 'T ', i1, '-', i1,/)
      if(iprint .eq. 1) write(6,300) ((atiipl(i-1,k,l),l=1,4), k=1,3)
      if(iprint .eq. 1) write(7,300) ((atiipl(i-1,k,l),l=1,4), k=1,3)
 300  format(3(1x, 4(f10.4,5x)/))
  90  continue
      call paralel
      call angle(tnplimn)
      return
      end subroutine tact common/prnt/iprint
      dimension tf(3,4), atiipl(10,3,4),tiipl(3,4),tp(3,4),tipli(3,4)
      common/t/tnplimn(10,3,4), tnpliac(10,3,4)
      common/act/athi(10), adi(10), aaiipl(10), aalpipl(10)
      common/tn/jtype(10), numlink, numpose
      common/qma/qmeas(10), qact(10)
      if (iprint .eq. 1) write (6,100)
      if (iprint .eq. 1) write (7,100)
 100  format(13x, 'Homogeneous Transformation Matrices',/,8x,
     * 'Based on Actual Parameters and Pair Variables')
      do 11 k = 1, 3
      do 12 l = 1, 4
      tnpliac(numlink+3, k, l) = 0.0
      atiipl(numlink+3, k, l) = 0.0
  12  continue
  11  continue
      do 13 l = 1, 3
      tnpliac(numlink+3, l, l) = 1.0
      atiipl(numlink+3, l, l) = 1.0
  13  continue
      do 10 i = 2, numlink+1
      if (jtype(i) .eq. 0) then
          athi(i) = qact(i)
      else
          adi(i) = qact(i)
      endif
  10  continue
      do 40 n = 1, numlink+2
      i = numlink + 3 - n
```

```
      call ctiipl(athi(i), adi(i), aaiipl(i), aalpipl(i), tiipl)
      call invmtrx(tiipl, tipli)
      do 50 k = 1, 3
      do 60 l = 1, 4
      tf(k,l) = tnpliac(i+1, k, l)
      atiipl(i,k,l) = tiipl(k,l)
60    continue
50    continue
      call tmult(tf, tipli, tp)
      do 70 k = 1, 3
      do 80 l = 1, 4
      tnpliac(i,k,l) = tp(k,l)
80    continue
70    continue
40    continue
      do 90 n = 1, numlink+3
      i = numlink + 4 - n
      if (iprint .eq. 1) write(6,400) i
      if (iprint .eq. 1) write(7,400) i
400   format(/, 27x, 'T 9-', i1,/)
      if(iprint .eq. 1) write(6,300) ((tnpliac(i,k,l), l=1,4), k=1,3)
      if(iprint .eq. 1) write(7,300) ((tnpliac(i,k,l), l=1,4), k=1,3)
      if (i .eq. 1) go to 90
      if ((i .eq. 5) .and. (iprint .eq. 1)) write(6,401)
      if ((i .eq. 5) .and. (iprint .eq. 1)) write(7,401)
401   format(1h1)
      if (iprint .eq. 1) write(6,200) i-1, i
      if (iprint .eq. 1) write(7,200) i-1, i
200   format(/, 27x, 'T ', i1, '-', i1,/)
      if(iprint .eq. 1) write(6,300) ((atiipl(i-1,k,l), l=1,4), k=1,3)
      if(iprint .eq. 1) write(7,300) ((atiipl(i-1,k,l), l=1,4), k=1,3)
300   format(3(1x, 4(f10.4, 5x)/))
90    continue
      call angle(tnpliac)
      return
      end subroutine paralel common/t/tnplimn(10,3,4), tnpliac(10,3,4)
      common/tn/jtype(10), numlink, numpose
      common/pn/npose, iter, itern
      common/paral/crosprd, jlpar, jlparpl
      dimension a(3), b(3), c(3)
      if (jlpar .eq. -1) return
      do 10 i = 1, 3
      a(i) = tnplimn(jlpar, i, 3)
      b(i) = tnplimn(jlparpl, i, 3)
10    continue
      call cross(a, b, c)
      crs = sqrt(c(1) ** 2 + c(2) ** 2 + c(3) ** 2)
      crosprd = crosprd + crs
      return
      end
```

FILE SCAL1.FOR
This file is linked with file SCALP.FOR. Used to do the deterministic solution
for a manipulator with World - Base and Hand - Cube Transformations.

```fortran
      subroutine vecsoln common/prnt/iprint
      common/tn/jtype(10), numlink, numpose
      common/parax/jpar, jparpl
      common/fin/poserr(21), pab(20,20)
      common/change/dd(10), dthi(10), da(10), dalpha(10)
      common/fnl/roterr(21), oab(20,20)
      common/sv/prod1(21), prod3(21)
      dimension oabinv(20,20), prod2(21), diff(21), check1(20,20),
     *          check2(20,20), prod8(20,20), prod4(21), parrtds(2,2),
     *          parout(2)

c     Rotation parameter and variable errors computation if (iprint .eq. 1) call fsub2
      do 10 i = 1, 3 * numpose
      do 20 j = 1, 2 *(numlink+2) - 1
      oabinv(i,j) = oab(i,j)
   20 continue
   10 continue
      call inverse(2 *(numlink+2) - 1, oabinv)
      call matmult(oabinv, oab, 3*numpose, 2*(numlink+2)-1, 3*numpose,
     *             check1)
      if (iprint .eq. 1) write(6,400)
      if (iprint .eq. 1) write(7,400)
  400 format(1h1, 16x, //, ' oabinv  x  oab  = identity matrix ?')
      if (iprint .eq. 1) call prntsub(check1)
      call matmult(oabinv, roterr,3*numpose, 2*(numlink+2)-1, 1, prod1)
      if (jpar .eq. -1) go to 3 c     get part of simultaneous equations for parallel axis solution parrtds(1,1) = 1.0
      parrtds(1,2) = 1.0
      parout(1) = prod1(jpar)

3 write(6,500)
      write(7,500)
  500 format(1h1,//,1x,'R O T A T I O N    S O L U T I O N    V E C T O R',
     * /,1x, '(Predicted difference of actual-nominal values) ')
      cradtdeg = 180.0 / acos(-1.0)
      write(6,515)
      write(7,515)
  515 format(18x, '(in degrees)',/)
      if (jpar .eq. -1) go to 1
      write(6,525) jpar-1, jpar-1, jparpl-1, jparpl-1
      write(7,525) jpar-1, jpar-1, jparpl-1, jparpl-1
  525 format(1x, 'Angle dz-',i2;' is actually angle  dz-',
     * i1, ' + angle dz-', i1,/, 8x, 'Angle dz-', i1,
     * ' is not determined here',/)
```

```
    1   do 50 j = 1, numlink+2
        prod4(j) = prod1(j) * cradtdeg
        write(6,550) j-1, prod4(j)
        write(7,550) j-1, prod4(j)
  550   format(16x, 'dz', i1, 1x, f10.4)
   50   continue
        write(6,551)
        write(7,551)
  551   format(/)
        do 60 j = numlink + 3, 2 *(numlink+2) - 1
        prod4(j) = prod1(j) * cradtdeg
        write(6,600) j - numlink - 3, prod4(j)
        write(7,600) j - numlink - 3, prod4(j)
  600   format(16x, 'dx', i1, 1x, f10.4)
   60   continue c   Position parameters and variables error computation if (iprint .eq. 1) call fsub4
    4   if (iprint .eq. 1) write(6,445)
        if (iprint .eq. 1) write(7,445)
  445   format(1h1,//, 16x, ' INV* TIMES POSITION 12 X 12 MATRIX')
        call matmult(oabinv,pab,3*numpose,2*(numlink+2)-1,2*(numlink+2)-1,
      *             prod8)
        if (iprint .eq. 1) call prntsub(prod8)

c   parallel axis solution for rotational z pair values if (jpar .eq. -1) go to 13
        parrtds(2,1) = prod8(jparp1, jpar)
        parrtds(2,2) = prod8(jparp1, jparp1)
        parout(2) = 0.0
        do 6 i = 1, 2 *(numlink+2) - 1
        if ((i .eq. jpar) .or. (i .eq. jparp1)) go to 7
        parout(2) = parout(2) - prod8(jparp1, i) * prod1(i)
    7   parout(2) = parout(2) + oabinv(jparp1, i) * poserr(i)
    6   continue
        den = parrtds(1,1) * parrtds(2,2) - parrtds(1,2) * parrtds(2,1)

if (iprint .eq. 1) write(6,670)
      * cradtdeg*parout(1), parrtds(1,1),jpar-1, parrtds(1,2),jparp1-1,
      * cradtdeg*parout(2), parrtds(2,1),jpar-1, parrtds(2,2),jparp1-1
        if (iprint .eq. 1) write(7,670)
      * cradtdeg*parout(1), parrtds(1,1),jpar-1, parrtds(1,2),jparp1-1,
      * cradtdeg*parout(2), parrtds(2,1),jpar-1, parrtds(2,2),jparp1-1
  670   format(///,5x,'The equations solved were',//,2x,f10.4,' = ',
      * f10.4,' Angle dz-', i1, ' + ',f10.4,' angle dz-',i1,//,2x,
      *                                             f10.4,' = ',
      * f10.4, 'Angle dz-', i1,' + ', f10.4, ' angle dz-', i1)

if (abs(den) .gt. 0.01) go to 111
        write(6,222) den
        write(7,222) den
  222   format(1x,'den = ',f10.4,' We have a problem in pose selection')
  111   prod1(jpar) = (parout(1)*parrtds(2,2) - parout(2)*parrtds(1,2))
      * / den
```

```
      prod1(jparp1)= (parout(2)*parrtds(1,1) - parout(1)*parrtds(2,1))
     * / den
      parout(1) = parout(1) * cradtdeg
      parout(2) = parout(2) * cradtdeg
      prod4(jpar) = prod1(jpar) * cradtdeg
      prod4(jparp1) = prod1(jparp1) * cradtdeg
      write(6,650) jpar-1, prod4(jpar), jparp1-1, prod4(jparp1)
      write(7,650) jpar-1, prod4(jpar), jparp1-1, prod4(jparp1)
 650  format(1h1,//,7x,'S O L U T I O N    F O R',
     * '    P A R A L L E L    A X I S',
     * /, 2(/, 20x, 'Angle dz-', i2, ' = ', f10.4))

13   continue
      if (iprint .eq. 1) write(6,700)
      if (iprint .eq. 1) write(7,700)
 700  format(1h1,//,1x, ' Pab x Rotation solution vector',/)
      call matmult(pab, prod1, 3*numpose, 2*(numlink+2)-1, 1, prod2)
      if (iprint .eq. 1) write(6,601) (prod2(j), j = 1, 3 * numpose)
      if (iprint .eq. 1) write(7,601) (prod2(j), j = 1, 3 * numpose)
      if (iprint .eq. 1) write(6,800)
      if (iprint .eq. 1) write(7,800)
 800  format(1h1,//,1x, 'Position error vector - Pab x Rotation',
     * ' solution vector',/)
      call matsubt(poserr, prod2, 3 * numpose, 1, diff)
      if (iprint .eq. 1) write(6,601) (diff(j), j = 1, 3 * numpose)
      if (iprint .eq. 1) write(7,601) (diff(j), j = 1, 3 * numpose)
 601  format(4x, e13.4)
      write(6,910)
      write(7,910)
 910  format(1h1,//,1x,'P O S I T I O N    S O L U T I O N    V E C T O R',
     * /,1x,'(Predicted Difference in Actual - Nominal Values)')
      call matmult(oabinv, diff, 3*numpose, 2*(numlink+2)-1, 1, prod3)
      write(6,915)
      write(7,915)
 915  format(20x,'(in mm.)',/)
      if (jpar .eq. -1) go to 9
      write(6,925) jpar-1, jpar-1, jparp1-1, jparp1-1
      write(7,925) jpar-1, jpar-1, jparp1-1, jparp1-1
 925  format(9x, 'Displacement dz-', i1, ' is actualy',
     * /, 5x, 'displacement dz-', i1, ' + displacement dz-', i1,
     * /, 4x, 'displacement dz-', i1, ' is not determined here',/)
 9    do 91 j = 1, numlink+2
      write(6,920) j-1, prod3(j)
      write(7,920) j-1, prod3(j)
 920  format(17x, 'dz', i1, 1x, f10.4)
 91   continue
      write(6,551)
      write(7,551)
      do 92 j = numlink+3, 2*(numlink+2)-1
      write(6,940) j - numlink - 3, prod3(j)
      write(7,940) j - numlink - 3, prod3(j)
 940  format(17x, 'dx', i1, 1x, f10.4)
 92   continue
      return
      end
```

```
      subroutine algoerr common/qmat/qms(10,7), qct(10,7)
      common/nom/thi(10), di(10), aiipl(10), alpiipl(10)
      common/prnt/iprint
      common/pn/npose, iter, itern
      common/sv/prod1(21), prod3(21)
      common/s2/sum2(20), sum4(20)
      common/change/dd(10), dthi(10), da(10), dalpha(10)
      common/tn/jtype(10), numlink, numpose
      dimension u(21), v(21)
      cradtdeg = 180.0 / acos(-1.0)
      do 3 i = 1, 2*(numlink+2)-1
      prod1(i) = prod1(i) * cradtdeg
      sum2(i) = sum2(i) + prod1(i)
      sum4(i) = sum4(i) + prod3(i)
3     continue
      write(6,101) iter
      write(7,101) iter
101   format(1h1,//, 16x, 'T O T A L',
     *'   P R E D I C T E D   E R R O R S',/, 21x,
     *'(Nominal Values - Actual Values)',//,
     *27x, 'I T E R A T I O N ', i3,/)
      write(6,201)
      write(7,201)
201   format(12x, 'link 1-2', 3x, 'link 2-3', 3x, 'link 3-4', 3x,
     *'link 4-5', 3x, 'link 5-6', 3x, 'link 6-7',/)
      write(6,301) (sum2(i), i = 2, numlink+1)
      write(7,301) (sum2(i), i = 2, numlink+1)
301   format(1x, 'd theta', 1x, 6(1x, f10.4))
      write(6,401) (sum4(i), i = 2, numlink+1)
      write(7,401) (sum4(i), i = 2, numlink+1)
401   format(1x, 'd d    ', 1x, 6(1x, f10.4))
      write(6,501) (sum2(i), i = numlink+4, 2*(numlink+2)-1)
      write(7,501) (sum2(i), i = numlink+4, 2*(numlink+2)-1)
501   format(1x, 'd alpha', 1x, 6(1x, f10.4))
      write(6,601) (sum4(i), i = numlink+4, 2*(numlink+2)-1)
      write(7,601) (sum4(i), i = numlink+4, 2*(numlink+2)-1)
601   format(1x, 'd a    ', 1x, 6(1x, f10.4))
      write (6,10)
      write (7,10)
10    format(/, 11x, 'World-Base   Hand-Cube',/)
      write(6,350) sum2(1), sum2(numlink+2)
      write(7,350) sum2(1), sum2(numlink+2)
350   format(1x, 'd theta', 2(2x, f10.4))
      write(6,450) sum4(1), sum4(numlink+2)
      write(7,450) sum4(1), sum4(numlink+2)
450   format(1x, 'd d    ', 2(2x, f10.4))
      write(6,550) sum2(numlink+3)
      write(7,550) sum2(numlink+3)
550   format(1x, 'd alpha', 2x, f10.4)
      write(6,650) sum4(numlink+3)
      write(7,650) sum4(numlink+3)
650   format(1x, 'd a    ', 2x, f10.4)
      write(6,100) iter
      write(7,100) iter
```

```fortran
100   format(1h1,//, 8x, 'A D J U S T M E N T S   I N ',
     * '  P R E D I C T E D   E R R O R S',/,
     * 22x, '(Nominal Values - Actual Values)',//,
     * 29x, 'I T E R A T I O N ', i3,/)
      write(6,200)
      write(7,200)
200   format(13x, 'link 1-2', 3x, 'link 2-3', 3x, 'link 3-4', 3x,
     * 'link 4-5', 3x, 'link 5-6', 3x, 'link 6-7',/)
      write(6,300) (prodl(i), i = 2, numlink+1)
      write(7,300) (prodl(i), i = 2, numlink+1)
300   format(2x, 'd theta', 1x, 6(1x, f10.4))
      write(6,400) (prod3(i), i = 2, numlink+1)
      write(7,400) (prod3(i), i = 2, numlink+1)
400   format(2x, 'd d    ', 1x, 6(1x, f10.4))
      write(6,500) (prodl(i), i = numlink+4, 2*(numlink+2)-1)
      write(7,500) (prodl(i), i = numlink+4, 2*(numlink+2)-1)
500   format(2x, 'd alpha', 1x, 6(1x, f10.4))
      write(6,600) (prod3(i), i = numlink+4, 2*(numlink+2)-1)
      write(7,600) (prod3(i), i = numlink+4, 2*(numlink+2)-1)
600   format(2x, 'd a    ', 1x, 6(1x, f10.4))
      write(6,10)
      write(7,10)
      write(6,350) prodl(1), prodl(numlink+2)
      write(7,350) prodl(1), prodl(numlink+2)
      write(6,450) prod3(1), prod3(numlink+2)
      write(7,450) prod3(1), prod3(numlink+2)
      write(6,550) prodl(numlink+3)
      write(7,550) prodl(numlink+3)
      write(6,650) prod3(numlink+3)
      write(7,650) prod3(numlink+3)
      do 11 j = 1, numpose
      do 20 i = 2, numlink+1
      if (jtype(i) .eq. 0) then
          qms(i,j) = qms(i,j) + prodl(i)
      else
          qms(i,j) = qms(i,j) + prod3(i)
      endif
20    continue
11    continue
      do 30 j = 2, numlink+1
      if (jtype(j) .eq. 0) then
          di(j)     = di(j) + prod3(j)
          alpiipl(j) = alpiipl(j) + prodl(j+numlink+2)
          aiipl(j)   = aiipl(j) + prod3(j+numlink+2)
      else
          thi(j)    = thi(j) + prodl(j)
          alpiipl(j) = alpiipl(j) + prodl(j+numlink+2)
          aiipl(j)   = aiipl(j) + prod3(j+numlink+2)
      endif
30    continue
      do 35 j = 1, numlink+2, numlink+1
         di(j) = di(j) + prod3(j)
         thi(j) = thi(j) + prodl(j)
         if (j .eq. numlink+2) go to 35
         alpiipl(j) = alpiipl(j) + prodl(j+numlink+2)
         aiipl(j)   = aiipl(j) + prod3(j+numlink+2)
```

```
 35   continue
      write(6,605) iter
      write(7,605) iter
605   format(1h1, //, 2x, 'P R E D I C T E D   K I N E M A T I C', 3x,
     *  'P A R A M E T E R S', /, 14x,
     *  '(Nominal Parameters + Predicted Errors)',//,
     *  22x, 'I T E R A T I O N ', i3,//, 7x, 'Joint',
     *  4x, ' Link', 4x, 'theta or d', 4x, ' alpha    ', 4x,
     *  '    a      ')
      do 40 j = 2, numlink+1
      if (jtype(j) .eq. 0) then
          write(6,610) j-1, j, di(j), alpiipl(j), aiipl(j)
          write(7,610) j-1, j, di(j), alpiipl(j), aiipl(j)
610       format(/,7x, 'Revolute', 2x, i1, '-', i1, 3x, f10.4,
     *    3x, f10.4, 3x, f10.4)
      else
          write(6,620) j-1, j, thi(j), alpiipl(j), aiipl(j)
          write(7,620) j-1, j, thi(j), alpiipl(j), aiipl(j)
620       format(/,7x, 'Prismatic', 1x, i1, '-', i1, 3x, f10.4,
     *    3x, f10.4, 3x, f10.4)
      endif
 40   continue
      write(6,615)
      write(7,615)
615   format(//,24x, 'd           theta        alpha          a', /)
      write(6,617) di(1), thi(1), aiipl(1), alpiipl(1)
      write(7,617) di(1), thi(1), aiipl(1), alpiipl(1)
617   format(3x, 'World - Base ', 4(3x, f10.4), /)
      write(6,618) di(numlink+2), thi(numlink+2), aiipl(numlink+2),
     *             alpiipl(numlink+2)
      write(7,618) di(numlink+2), thi(numlink+2), aiipl(numlink+2),
     *             alpiipl(numlink+2)
618   format(3x, 'Hand - Cube  ', 4(3x, f10.4))
      write(6,640) iter
      write(7,640) iter
640   format(1h1,//, 15x, 'P R E D I C T E D',
     *  '  P A I R   V A R I A B L E S',/, 16x,
     *  '(Nominal Pair Variable - Predicted Error)',//,
     *  29x, 'I T E R A T I O N ', i3)
      write(6,652)
      write(7,652)
652   format(//, 6x, 'Theta or d', 3x, 'Pose1', 6x, 'Pose2', 6x,
     *  'Pose3', 6x, 'Pose4', 6x, 'Pose5')
      do 60 i = 2, numlink+1
      write(6,660) i-1, (qms(i,j), j = 1, numpose)
      write(7,660) i-1, (qms(i,j), j = 1, numpose)
660   format(/, 11x, i1, 2x, 5(f10.4, 1x))
 60   continue
      do 17 i = 1, numlink+2
      dthi(i) = dthi(i) - prod1(i)
      dd(i) = dd(i) - prod3(i)
      if (i .eq. numlink+2) go to 17
      dalpha(i) = dalpha(i) - prod1(i+numlink+2)
      da(i) = da(i) - prod3(i+numlink+2)
 17   continue
      write(6,700) iter
      write(7,700) iter
```

```
700 format(1h1, //, 21x, 'A L G O R I T H M    E R R O R S',
   * /, 27x, '(Actual - Predicted error)',//,28x,
   * 'I T E R A T I O N ',i3,/)
     write(6,800)
     write(7,800)
800 format(11x, 'link 1-2', 3x, 'link 2-3', 3x, 'link 3-4', 3x,
   * 'link 4-5', 3x, 'link 5-6', 3x, 'link 6-7',/)
     write(6,900) (dthi(i), i = 2, numlink+1)
     write(7,900) (dthi(i), i = 2, numlink+1)
900 format(1x,'d theta', 6(1x, f10.4))
     write(6,910) (dd(i), i = 2, numlink+1)
     write(7,910) (dd(i), i = 2, numlink+1)
910 format(1x,'d d    ', 6(1x, f10.4))
     write(6,920) (dalpha(i), i = 2, numlink+1)
     write(7,920) (dalpha(i), i = 2, numlink+1)
920 format(1x, 'd alpha', 6(1x, f10.4))
     write(6,940) (da(i), i = 2, numlink+1)
     write(7,940) (da(i), i = 2, numlink+1)
940 format(1x, 'd a    ', 6(1x, f10.4))
     write(6,10)
     write(7,10)
     write(6,350) dthi(1), dthi(numlink+2)
     write(7,350) dthi(1), dthi(numlink+2)
     write(6,450) dd(1), dd(numlink+2)
     write(7,450) dd(1), dd(numlink+2)
     write(6,550) dalpha(1)
     write(7,550) dalpha(1)
     write(6,650) da(1)
     write(7,650) da(1)
     return
     end FILE  SCAL2.FOR
This file is linked with file  SCALP.FOR.  Used to do the deterministic solution
for a manipulator with World - Base and Hand - Cube Transformations.

subroutine inverse(n,a)

common/prnt/iprint
     dimension a(20,20)
     common/parax/jpar, jparp1
     eps = 0.0000000001
     deter = simul(n, a, eps, jpar)
     if (iprint .eq. 1) write(6,202) deter
     if (iprint .eq. 1) write(7,202) deter
202 format(/, 5x, 'deter  =',e13.4)
     return
     end function simul(n, a, eps, jpar)

common/prnt/iprint
     common/tn/jtype(10), numlink, numpose
     dimension irow(20), jcol(20), jord(20), y(20), a(20,20),
   * aug(20,20), yy(20)
     nn = n
```

```
        if (jpar .ne. -1) nn = n - 1
        jparp1 = jpar + 1
        do 19 i = 1,n
        do 19 j = 1,n
        aug(i,j) = 0.0
        if (i .eq. j) aug(i,j) = 1.0
 19     continue
        deter = 1.0
        do 18 k = 1, nn
        km1 = k - 1
        pivot = 0.0
        do 11 i = 1, n
        do 11 j = 1, n
        if (k .eq. 1) go to 9
        do 8 iscan = 1, km1
        do 8 jscan = 1, km1
        if (i .eq. irow(iscan)) go to 11
        if (j .eq. jcol(jscan)) go to 11
 8      continue
        if ((jpar .ne. -1) .and. (j .eq. jparp1)) go to 11
 9      if (abs(a(i,j)) .le. abs(pivot)) go to 11
        pivot = a(i,j)
        irow(k) = i
        jcol(k) = j
 11     continue
        if (abs(pivot) .gt. eps) go to 13
        simul = 0.0
        return
 13     irowk = irow(k)
        jcolk = jcol(k)
        deter = deter * pivot
        do 14 j = 1, n
        aug(irowk, j) = aug(irowk, j) / pivot
 14     a(irowk, j) = a(irowk, j) / pivot
        do 99 i = 1, n
        aijck = a(i, jcolk)
        if (i .eq. irowk) go to 99
        do 17 j = 1,n
        a(i,j) = a(i,j) - aijck * a(irowk, j)
 17     aug(i,j) = aug(i,j) - aijck * aug(irowk, j)
 99     continue
 18     continue
        if (jpar .eq. -1) go to 193
        jcol(n) = jparp1
        isum = 0.0
        do 50 kk = 1, n-1
 50     isum = isum + irow(kk)
        irow(n) = (n + 1) * n / 2 - isum
 193    do 21 j = 1,n
        do 22 i = 1,n
        irowi = irow(i)
        jcoli = jcol(i)
        yy(jcoli) = a(irowi, j)
 22     y(jcoli) = aug(irowi, j)
        do 23 i = 1,n
        a(i,j) = yy(i)
 23     aug(i,j) = y(i)
```

```
21  continue
    if (iprint .eq. 1) write(6,200)
    if (iprint .eq. 1) write(7,200)
200 format(1h1,//, 11x, 'THE INVERSE* OF THE ROTATION',
   * ' 12 X 12 MATRIX IS'/)
    if (iprint .eq. 1) call prntsub(aug)
    do 24 i = 1,n
    do 24 j = 1,n
    a(i,j) = aug(i,j)
24  continue
    simul = deter
    return
    end subroutine angle(tnpli)

common/prnt/iprint
    dimension tnpli(10,3,4)
    common/tn/jtype(10), numlink, numpose
    real nz
    ax = tnpli(1,3,1)
    ay = tnpli(1,3,2)
    az = tnpli(1,3,3)
    sz = tnpli(1,2,3)
    nz = tnpli(1,1,3)
    den = sqrt(ax  2 + ay  2)
    call arctan(ax, -ay, argo)
    call arctan(sz, -nz, argt)
    call arctan(-az, den, arga)
    if (iprint .eq. 1) write(6,100) argo, arga, argt
    if (iprint .eq. 1) write(7,100) argo, arga, argt
100 format(1h1, //,1x, 'TOOL ORIENTATION ANGLES',/, 6x,
   * '(in degrees)',//,5x,
   * 'o - = ', f8.3,/, 5x, 'a - = ', f8.3,/, 5x,
   * 't - = ', f8.3)
    return
    end subroutine arctan(y, x, angle)

common/prnt/iprint
    if (abs(x) .gt. 0.00000000001) go to 4
    if (abs(y) .lt. 0.00000000001) go to 5
    if (y .lt. 0.0) go to 6
    angle = 90.0
    go to 2
6   angle = -90.0
    go to 2
5   angle = 0.0
    go to 2
4   angle = atand(y / x)
    if (x .gt. 0.0) go to 2
    angle = angle + 180.0
2   return
    end
```

```
      subroutine vector(del)

common/prnt/iprint
      dimension del(3,4), derrthe(3)
      common/err/errthe(3), errpos(3)
      cradtdeg = 180. / acos(-1.0)
      do 50 i = 1, 3
      if (abs(del(i,i)) .lt. 0.001) go to 50
      if (iprint .eq. 1) write(6,800)
      if (iprint .eq. 1) write(7,800)
800   format(/,1x, 'We have an infinitesimal angle ',
     * 'approximation problem')
      if (iprint .eq. 1) write(6,900) i, i, del(i,i)
      if (iprint .eq. 1) write(7,900) i, i, del(i,i)
900   format(14x, 'element(', i2, ',', i2,')=', f10.4)
50    continue
      if (abs(del(1,1)) .lt. 0.001) go to 1
      if (iprint .eq. 1) write(6,910)
      if (iprint .eq. 1) write(7,910)
910   format(14x, 'The problem is in angle x')
1     if (abs(del(2,2)) .lt. 0.001) go to 2
      if (iprint .eq. 1) write(6,920)
      if (iprint .eq. 1) write(7,920)
920   format(14x, 'The problem is in angle y')
2     if (abs(del(3,3)) .lt. 0.001) go to 3
      if (iprint .eq. 1) write(6,930)
      if (iprint .eq. 1) write(7,930)
930   format(14x, 'The problem is in angle z')
3     errthe(1) = (del(3,2) - del(2,3)) / 2.0
      errthe(2) = (del(1,3) - del(3,1)) / 2.0
      errthe(3) = (del(2,1) - del(1,2)) / 2.0
      do 20 i = 1,3
      derrthe(i) = errthe(i) * cradtdeg
20    continue
      if (iprint .eq. 1) write(6,940)
      if (iprint .eq. 1) write(7,940)
940   format(/,10x, 'Rotation error vector in radians:')
      if (iprint .eq. 1) write(6,950) (errthe(i), i = 1,3)
      if (iprint .eq. 1) write(7,950) (errthe(i), i = 1,3)
950   format(20x, f10.4)
      if (iprint .eq. 1) write(6,941)
      if (iprint .eq. 1) write(7,941)
941   format(/,10x, 'Rotation error vector in degrees:')
      if (iprint .eq. 1) write(6,950) (derrthe(i), i = 1,3)
      if (iprint .eq. 1) write(7,950) (derrthe(i), i = 1,3)
      errpos(1) = del(1,4)
      errpos(2) = del(2,4)
      errpos(3) = del(3,4)
      if (iprint .eq. 1) write(6,960)
      if (iprint .eq. 1) write(7,960)
960   format(/,10x, 'Position error vector in mm.:')
      if (iprint .eq. 1) write(6,950) (errpos(i), i = 1,3)
      if (iprint .eq. 1) write(7,950) (errpos(i), i = 1,3)
      return
      end
```

```
      subroutine fsub2 common/prnt/iprint
      common/fn1/roterr(21), oab(20,20)
      common/tn/jtype(10), numlink, numpose
      write(6,100)
      write(7,100)
100   format(1h1,//,9x,'R O T A T I O N    E R R O R    V E C T O R',//)
      call label(roterr)
      write(6,111)
      write(7,111)
111   format(1h1,//,15x,'R O T A T I O N    1 2 X 1 2    M A T R I X',/)
      write(6,200)
      write(7,200)
200   format(/,26x, 'Submatrix       o A x',/)
      call submtx(oab, 1, numlink+2, 1, numpose)
      write(6,300)
      write(7,300)
300   format(/, 26x, 'Submatrix       o A y',/)
      call submtx(oab, 1, numlink+2, numpose + 1, 2 * numpose)
      write(6,400)
      write(7,400)
400   format(/, 26x, 'Submatrix       o A z',/)
      call submtx(oab, 1, numlink+2, 2 * numpose + 1, 3 * numpose)
      write(6,500)
      write(7,500)
500   format(//, 26x, 'Submatrix       o B x',/)
      call submtx(oab, numlink + 3, 2*(numlink+2) - 1, 1, numpose)
      write(6,600)
      write(7,600)
600   format(/, 26x, 'Submatrix       o B y',/)
      call submtx(oab, numlink+3,2*(numlink+2)-1, numpose+1,2*numpose)
      write(6,700)
      write(7,700)
700   format(/, 26x, 'Submatrix       o B z',/)
      call submtx(oab, numlink+3,2*(numlink+2)-1,2*numpose+1,3*numpose)
      return
      end subroutine fsub4 common/prnt/iprint
      common/fin/poserr(21), pab(20,20)
      common/tn/jtype(10), numlink, numpose
      write(6,100)
      write(7,100)
100   format(1h1,//,9x,'P O S I T I O N    E R R O R    V E C T O R',//)
      call label(poserr)
      write(6,150)
      write(7,150)
150   format(1h1,//,14x, 'P O S I T I O N    1 2 X 1 2    M A T R I X')
      write(6,200)
      write(7,200)
200   format(/,26x, 'Submatrix       p A x',/)
      call submtx(pab, 1, numlink+2, 1, numpose)
      write(6,300)
```

```
      write(7,300)
300   format(/,26x, 'Submatrix    p A y',/)
      call submtx(pab, 1, numlink+2, numpose+1, 2*numpose)
      write(6,400)
      write(7,400)
400   format(/,26x, 'Submatrix    p A z',/)
      call submtx(pab, 1, numlink+2, 2*numpose+1, 3*numpose)
      write(6,500)
      write(7,500)
500   format(//, 26x, 'Submatrix    p B x',/)
      call submtx(pab, numlink+3, 2*(numlink+2)-1, 1, numpose)
      write(6,600)
      write(7,600)
600   format(/,26x, 'Submatrix    p B y',/)
      call submtx(pab, numlink+3,2*(numlink+2)-1, numpose+1,2*numpose)
      write(6,700)
      write(7,700)
700   format(/,26x, 'Submatrix    p B z'/)
      call submtx(pab, numlink+3,2*(numlink+2)-1,2*numpose+1,3*numpose)
      return
      end subroutine prntsub(check1)

common/prnt/iprint
      dimension check1(20,20)
      common/tn/jtype(10), numlink, numpose
      write(6,401)
      write(7,401)
401   format(/, 28x, 'Submatrix  1-1',/)
      call submtx(check1, 1, numlink+2, 1, numpose)
      write(6,402)
      write(7,402)
402   format(/, 28x, 'Submatrix  2-1',/)
      call submtx(check1, 1, numlink+2, numpose + 1, 2 * numpose)
      write(6,403)
      write(7,403)
403   format(/,28x, 'Submatrix  3-1',/)
      call submtx(check1, 1, numlink+2, 2 * numpose + 1, 3 * numpose)
      write(6,404)
      write(7,404)
404   format(/, 28x, 'Submatrix  1-2',/)
      call submtx(check1, numlink + 3, 2*(numlink+2)-1, 1, numpose)
      write(6,405)
      write(7,405)
405   format(/, 28x, 'Submatrix  2-2',/)
      call submtx(check1,numlink+3,2*(numlink+2)-1,numpose+1,2*numpose)
      write(6,406)
      write(7,406)
406   format(/, 28x, 'Submatrix  3-2',/)
      call submtx(check1, numlink+3, 2*(numlink+2)-1, 2*numpose+1,
     *              3*numpose)
      return
      end
```

```
      subroutine ctiipl(a, b, c, d, tiipl)

common/prnt/iprint
      dimension tiipl(3,4)
      tiipl(1,1) = cosd(a)
      tiipl(1,2) = - sind(a) * cosd(d)
      tiipl(1,3) = sind(a) * sind(d)
      tiipl(1,4) = c * cosd(a)
      tiipl(2,1) = sind(a)
      tiipl(2,2) = cosd(a) * cosd(d)
      tiipl(2,3) = - cosd(a) * sind(d)
      tiipl(2,4) = c * sind(a)
      tiipl(3,1) = 0.0
      tiipl(3,2) = sind(d)
      tiipl(3,3) = cosd(d)
      tiipl(3,4) = b
      return
      end subroutine tmult(tf, ts, tp)

common/prnt/iprint
      dimension tf(3,4), ts(3,4), tp(3,4)
      do 10 i = 1,3
      do 20 j = 1,4
      tp(i,j) = 0.0
20    continue
10    continue
      do 30 i = 1,3
      do 40 j = 1,4
      do 50 k = 1,3
      tp(i,j) = tp(i,j) + tf(i,k) * ts(k,j)
50    continue
40    continue
      tp(i,4) = tp(i,4) + tf(i,4)
30    continue
      return
      end subroutine matmult(a, b, nra, ncarb, ncb, c)

common/prnt/iprint
      dimension a(20,20), b(20,20), c(20,20)
      do 10 i = 1, nra
      do 20 j = 1, ncb
      c(i,j) = 0.0
      do 30 k = 1, ncarb
      c(i,j) = c(i,j) + a(i,k) * b(k,j)
30    continue
20    continue
10    continue
      return
      end
```

```
      subroutine invmtrx(a, b)

common/prnt/iprint
      dimension a(3,4), b(3,4)
      do 10 i = 1,3
      do 20 j = 1,3
      b(j,i) = a(i,j)
20    continue
10    continue
      b(1,4) = - (a(1,4) * a(1,1) + a(2,4) * a(2,1) + a(3,4) * a(3,1))
      b(2,4) = - (a(1,4) * a(1,2) + a(2,4) * a(2,2) + a(3,4) * a(3,2))
      b(3,4) = - (a(1,4) * a(1,3) + a(2,4) * a(2,3) + a(3,4) * a(3,3))
      return
      end subroutine dot(a, b, c)

dimension a(3), b(3)
      c = 0.0
      do 10 i = 1,3
      c = c + a(i) * b(i)
10    continue
      return
      end subroutine matsubt(a, b, nrab, ncab, c)

common/prnt/iprint
      dimension a(20,20), b(20,20), c(20,20)
      do 10 i = 1, nrab
      do 20 j = 1, ncab
      c(i,j) = a(i,j) - b(i,j)
20    continue
10    continue
      return
      end subroutine cross(a, b, c)

dimension a(3), b(3), c(3)
      c(1) = a(2) * b(3) - a(3) * b(2)
      c(2) = a(3) * b(1) - a(1) * b(3)
      c(3) = a(1) * b(2) - a(2) * b(1)
      return
      end subroutine submtx(f, jstart, jend, istart, iend)

common/prnt/iprint
      common/tn/jtype(10), numlink, numpose
      dimension f(20,20)
      do 10 i = istart, iend
      write(6,100) (f(i,j), j = jstart, jend)
```

```
      write(7,100) (f(i,j), j = jstart, jend)
10    continue
100   format(8(1x, f9.4))
      return
      end subroutine label(roterr)

common/prnt/iprint
      common/tn/jtype(10), numlink, numpose
      dimension roterr(21)
      do 10 i = 1, numpose
      write(6,100) i, roterr(i)
      write(7,100) i, roterr(i)
100   format(22x, 'x', i2, 2x, f10.4)
10    continue
      write(6,200)
      write(7,200)
200   format(/)
      do 20 i = 1, numpose
      write(6,300) i, roterr(i + numpose)
      write(7,300) i, roterr(i + numpose)
300   format(22x, 'y', i2, 2x, f10.4)
20    continue
      write(6,200)
      write(7,200)
      do 30 i = 1, numpose
      write(6,400) i, roterr(i + 2 * numpose)
      write(7,400) i, roterr(i + 2 * numpose)
400   format(22x, 'z', i2, 2x, f10.4)
30    continue
      write(6,500)
      write(7,500)
500   format(//, 1x, 'comes from.....',/)
      write(6,600) (roterr(i), i = 1, numpose)
      write(7,600) (roterr(i), i = 1, numpose)
600   format(1x, 'x1 =', f10.4, 2x, 'x2 =', f10.4, 2x, 'x3 =', f10.4,
     * 2x, 'x4 =', f10.4, 2x, 'x5 =', f10.4)
      write(6,700) (roterr(i), i = numpose+1, 2*numpose)
      write(7,700) (roterr(i), i = numpose+1, 2*numpose)
700   format(1x, 'y1 =', f10.4, 2x, 'y2 =', f10.4, 2x, 'y3 =', f10.4,
     * 2x, 'y4 =', f10.4, 2x, 'y5 =', f10.4)
      write(6,800) (roterr(i), i = 2*numpose+1, 3*numpose)
      write(7,800) (roterr(i), i = 2*numpose+1, 3*numpose)
800   format(1x, 'z1 =', f10.4, 2x, 'z2 =', f10.4, 2x, 'z3 =', f10.4,
     * 2x, 'z4 =', f10.4, 2x, 'z5 =', f10.4)
      return
      end function sind(x)
      pi=acos(-1.)
      sind=sin(x*pi/180.)
      return
      end
```

```
function cosd(x)
pi=acos(-1.)
cosd=cos(x*pi/180.)
return
end function atand(x)
pi=acos(-1.)
atand=180.*atan(x)/pi
return
end FILE  SCAL3.FOR
This file is linked with file  SCALP.FOR.  Used to do the deterministic solution
for a manipulator with World - Base  and  Hand - Cube  Transformations.

subroutine fsub1 common/prnt/iprint
    common/pn/npose, iter, itern
    common/t/tnplimn(10,3,4), tnpliac(10,3,4)
    common/tn/jtype(10), numlink, numpose
    common/err/errthe(3), errpos(3)
    common/fn1/roterr(21), oab(20,20)
    roterr(      npose) = errthe(1)
    roterr(numpose + npose) = errthe(2)
    roterr(2 * numpose + npose) = errthe(3)
    do 10 i = 1, numlink+2
    oab(npose      , i) = tnplimn(i,1,3)
    oab(npose + numpose , i) = tnplimn(i,2,3)
    oab(npose + 2 * numpose , i) = tnplimn(i,3,3)
10  continue
    do 20 i = 1, numlink+1
    oab(npose      , i+numlink+2) = tnplimn(i+1, 1, 1)
    oab(npose + numpose , i+numlink+2) = tnplimn(i+1, 2, 1)
    oab(npose + 2 * numpose , i+numlink+2) = tnplimn(i+1, 3, 1)
20  continue
    return
    end subroutine fsub3 common/prnt/iprint
    common/pn/npose, iter, itern
    common/t/tnplimn(10,3,4), tnpliac(10,3,4)
    common/err/errthe(3), errpos(3)
    common/fin/poserr(21), pab(20,20)
    common/tn/jtype(10), numlink, numpose
    dimension pn(3), an(3), pabs(3)
    real nn(3)
    poserr(      npose) = errpos(1)
    poserr(numpose + npose) = errpos(2)
    poserr(2 * numpose + npose) = errpos(3)
```

```
      do 10 i = 1, numlink+2
      do 21 j = 1, 3
      pn(j) = tnplimn(i,j,4)
      an(j) = tnplimn(i,j,3)
21    continue
      call cross(pn, an, pabs)
      pab(npose         , i) = pabs(1)
      pab(npose + numpose   , i) = pabs(2)
      pab(npose + 2 * numpose , i) = pabs(3)
10    continue
      do 20 i = 1, numlink+1
      do 22 j = 1,3
      pn(j) = tnplimn(i+1, j, 4)
      nn(j) = tnplimn(i+1, j, 1)
22    continue
      call cross(pn, nn, pabs)
      pab(npose         , i + numlink+2) = pabs(1)
      pab(npose + numpose , i + numlink+2) = pabs(2)
      pab(npose + 2 * numpose , i + numlink+2) = pabs(3)
20    continue
      return
      end subroutine delvec common/prnt/iprint
      dimension tnpl1mn(3,4), tlnplmn(3,4)
      dimension tnpl1ac(3,4), tlnplac(3,4)
      dimension del(3,4)
      common/t/tnplimn(10,3,4), tnpliac(10,3,4)
      common/tn/jtype(10), numlink, numpose
      common/dt/dtmes(3,4)
      common/pn/npose,iter,itern
      dimension sn(3), sa(3), an(3), aa(3), pn(3), pa(3), apmnp(3)
      real nn(3), na(3)
      if (iprint .ne. 1) go to 3
      write(6,200)
      write(7,200)
200   format(1h1,//, 8x, 'P O S E    E R R O R    V E C T O R S')
      write(6,700)
      write(7,700)
700   format(13x, '(With respect to hand frame)')
      write(6,100) npose
      write(7,100) npose
100   format(//, 12x, 'Measurement Pose Number ',i2, //)
      write(6,750)
      write(7,750)
750   format(3x, 'Del Matrix    =    ',
     *  '(Tlnpl)nom-1 x (Tlnpl)act   -   I  ',/)
3     do 10 i=1, 3
      do 10 j=1, 4
      tnpl1mn(i,j) = tnplimn(1,i,j)
      tnpl1ac(i,j) = tnpliac(1,i,j)
10    continue
      call invmtrx(tnpl1mn, tlnplmn)
      call invmtrx(tnpl1ac, tlnplac)
      do 20 i = 1, 3
      nn(i) = tlnplmn(i,1)
```

```
        na(i) = tlnplac(i,1)
        sn(i) = tlnplmn(i,2)
        sa(i) = tlnplac(i,2)
        an(i) = tlnplmn(i,3)
        aa(i) = tlnplac(i,3)
        pn(i) = tlnplmn(i,4)
        pa(i) = tlnplac(i,4)
        apmnp(i) = pa(i) - pn(i)

20      continue
        call dot(nn, na, con)
        del(1,1) = con - 1.0
        call dot(nn, sa, con)
        del(1,2) = con
        call dot(nn,aa,con)
        del(1,3) = con
        call dot(nn, apmnp, con)
        del(1,4) = con
        call dot(sn, na, con)
        del(2,1) = con
        call dot(sn, sa, con)
        del(2,2) = con - 1.0
        call dot(sn, aa, con)
        del(2,3) = con
        call dot(sn, apmnp, con)
        del(2,4) = con
        call dot(an, na, con)
        del(3,1) = con
        call dot(an, sa, con)
        del(3,2) = con
        call dot(an, aa, con)
        del(3,3) = con - 1.0
        call dot(an, apmnp, con)
        del(3,4) = con
        if (iprint .eq. 1) write(6,400)
            ((del(i,j), j=1,4), i=1,3)
        if (iprint .eq. 1) write(7,400)
            ((del(i,j), j=1,4), i=1,3)

400     format(3(1x,4(f10.4,2x)/))
        call vector(del)
        return
        end
```

We claim:

1. A method for refining original command signals which are intended, by conversion to corresponding pair variable signals, to place, in response to said pair variable signals, a robot having mechanical linkage and joint actuators at a desired position and orientation (pose), comprising the steps of:

a. identifying actual system parameters of said robot which describe said mechanical linkage and joint actuators of said robot;
   b. predicting, through the utilization of said actual system parameters and said original command signals, a predicted anticipated pose of said robot which would actually be obtained as a result of said original command signals;
   c. calculating, as a function of the difference between said desired pose and said predicted anticipated pose, corrected command signals required to minimize the difference between said desired pose and said predicted anticipated pose; and
   d. employing said corrected command signals to place said robot in said desired pose.

2. A method of claim 1 wherein said step of predicting includes utilizing forward kinematics of said robot based upon said actual system parameters.

3. A method of claim 1 wherein said actual system parameters include parameters which locate placement of said robot.

4. A method for refining original command signals which are intended, by conversion to corresponding pair variable signals, to place, in response to said pair variable signals, a robot having mechanical linkage and joint actuators at a desired position and orientation (pose), comprising the steps of:

a. identifying actual system parameters of said robot, which describe said mechanical linkage and joint actuators of said robot, by:
      i. employing a plurality of calibration pose command signals which, based upon nominal system parameters of said robot, would place said robot in a plurality of desired calibration poses, to place said robot in a plurality of corresponding, actual calibration poses, each of which desired and actual calibration poses is within the measuring range of at least one pose sensor;
      ii. measuring said actual calibration poses of said robot by operation of said pose sensors;
      iii. calculating the differences between said plurality of said desired calibration poses and said corresponding measured actual calibration poses;
      iv. solving a set of equations which relate said differences to said actual system parameters of said robot to obtain said actual system parameters of said robot;
   b. predicting, through utilization of said actual system parameters and said original command signal, a predicted anticipated pose of said robot which would actually be obtained as a result of said original command signals;
   c. calculating, as a function of the difference between said desired pose and said predicted anticipated pose, corrected command signals required to minimize said difference between said desired, pose and said predicted anticipated pose; and
   d. employing said corrected command signals to place said robot in said desired pose.

5. A method of claim 4 wherein said step of identifying the actual system parameters includes the substep of positioning a plurality of said pose sensors and said robot adjacent to each other.

6. A method of claim 5 wherein said step of identifying the actual system parameters includes the substep of locating said robot in a plurality of desired calibration poses, with each of said desired calibration poses falling within the measuring range of at least one of said plurality of pose sensors.

7. A method of claim 4 wherein said substep of solving said set of equations includes the sub-substeps of:
   A. employing said set of equations to determine pairs, if any, of said actual system parameters which cause said set of equations to be singular;
   replacing selective ones of said actual system parameters in said set of equations with new actual system parameters which are each the sum of a respective one of said pairs;
   C. partially solving said set of equations to thereby obtain said actual system parameters, except for said pairs, and to thereby obtain said sums of said pairs.

8. A method of claim 7 wherein said substep of solving said set of equations includes the further sub-substeps of:
   D. employing previously solved sets of said equations for actual system parameters and related sums of said pairs to determine said sets of equations which remain singular; and
   E. repeating said substep of solving said set of equations using previously obtained actual system parameters and said pairs and thereafter solving said set of equations to obtain all of said actual system parameters at times when said equations become non-singular.

9. A method of claim 4 wherein said robot remains within the measurement range of said pose sensors during said step of employing said corrected command signals to place said robot, and wherein said pose sensors during said step of employing provide additional measurement of the difference between the actual pose of said robot and the desired pose of said robot in the form of additional difference signals, and wherein said step of calculating corrected command signals required to minimize the difference between said predicted anticipated pose and said desired pose includes utilization of said additional difference signals.

10. A method of claim 4 wherein said actual system parameters include parameters which locate placement of said robot relative to said at least one pose sensor.

11. A method of claim 1, 4 or 5 wherein said step of identifying the actual system parameters includes locating said robot at a plurality of desired calibration poses as a function of nominal system parameters of said robot.

12. A method of claim 1 or 4 wherein said step of calculating corrected command signals includes employing an actual inverse Jacobian of said robot, while using the difference between said desired pose and/said predicted anticipated pose.

13. A method of claim 1 or 4 wherein said step of identifying the actual system parameters includes use of a least squares technique.

14. A method of claim 13 wherein said least squares technique comprises the substeps of:

i. employing a plurality of calibration pose command signals which, based upon nominal system parameters of said robot, would place said robot in a plurality of desired calibration poses, to place said robot in a plurality of corresponding actual calibration poses, each of which desired and actual calibration poses is within the measuring range of at least one pose sensor;

ii. measuring said actual calibration poses of said robot by operation of said pose sensors;

iii. calculating differences between said plurality of said desired calibration poses and said corresponding measured actual calibration poses and summing the squares of said differences over all said poses to obtain resultant sums;

iv. solving a set of equations which relate said resultant sums to said actual system parameters of said robot to obtain said actual system parameters of said robot.

15. The method of claim 14 wherein said substep of solving said set of equations includes the sub-substeps of:
   A. employing said set of equations to determine pairs, if any, of said actual system parameters which cause said set of equations to be singular;
   replacing selective ones of said actual system parameters in said set of equations with new actual systems parameters which are each the sum of a respective one of said pairs; and
   C. partially solving said set of equations to thereby obtain said actual system parameters, except for said pairs, and to thereby obtain said sums of said pairs.

16. A method of claim 15 wherein said substep of solving said set of equations includes the further sub-substeps of:
   D. employing previously solved sets of equations for actual system parameters and related sums of said pairs to determine said sets of equations which remain singular; and
   E. repeating said substep of solving said set of equations using previously obtained actual system parameters and said pairs and thereafter solving said set of equations to obtain all of said actual system parameters at times when said equations become non-singular.

17. A method of claims 1 or 4 wherein said step of calculating corrected command signals comprises calculating corrections required of said original command signals and combining said corrections and said original command signals to obtain said corrected command signals.

18. A method of claim 1 or 4 wherein said step of employing includes converting said corrected command signals to corresponding pair variable signals without any alteration of said step of converting based upon said actual system parameters.

* * * * *